US012068529B2

(12) United States Patent
Hsu et al.

(10) Patent No.: US 12,068,529 B2
(45) Date of Patent: Aug. 20, 2024

(54) ELECTRONIC DEVICE HAVING ANTENNA FEED MODULE

(71) Applicant: FIH CO., LTD., New Taipei (TW)

(72) Inventors: Cho-Kang Hsu, New Taipei (TW); Min-Hui Ho, New Taipei (TW); Yen-Hui Lin, New Taipei (TW); Wei-Cheng Su, New Taipei (TW)

(73) Assignee: FIH CO., LTD., New Taipei (TW)

( * ) Notice: Subject to any disclaimer, the term of this patent is extended or adjusted under 35 U.S.C. 154(b) by 184 days.

(21) Appl. No.: 17/828,306

(22) Filed: May 31, 2022

(65) Prior Publication Data

US 2023/0361449 A1 Nov. 9, 2023

(30) Foreign Application Priority Data

May 7, 2022 (CN) ......................... 202210490818.0

(51) Int. Cl.
*H01Q 1/24* (2006.01)
*H01Q 5/335* (2015.01)

(52) U.S. Cl.
CPC ............. *H01Q 1/243* (2013.01); *H01Q 5/335* (2015.01)

(58) Field of Classification Search
USPC ........................................................... 343/702
See application file for complete search history.

(56) References Cited

U.S. PATENT DOCUMENTS

| | | | | |
|---|---|---|---|---|
| 9,711,841 | B2 * | 7/2017 | Yong | H01Q 1/243 |
| 9,728,854 | B2 * | 8/2017 | Kim | H01Q 9/045 |
| 10,320,069 | B2 * | 6/2019 | Zhou | H01Q 1/20 |
| 10,819,014 | B2 * | 10/2020 | Gu | H01Q 5/328 |
| 10,862,216 | B1 * | 12/2020 | Ayala Vazquez | H01Q 21/28 |
| 10,978,783 | B2 * | 4/2021 | Zhu | H01Q 3/38 |
| 10,998,632 | B2 * | 5/2021 | Gu | H01Q 1/243 |
| 11,024,948 | B2 * | 6/2021 | Ganeshan | H01Q 21/064 |
| 11,791,540 | B2 * | 10/2023 | Hsu | H01Q 25/04<br>455/82 |
| 2018/0191882 | A1 * | 7/2018 | Kim | H04B 1/3827 |

FOREIGN PATENT DOCUMENTS

| | | |
|---|---|---|
| CN | 113972465 A | 1/2022 |
| TW | 201947814 A | 12/2019 |

* cited by examiner

*Primary Examiner* — Hoang V Nguyen
*Assistant Examiner* — Brandon Sean Woods
(74) *Attorney, Agent, or Firm* — ScienBiziP, P.C.

(57) ABSTRACT

An electronic device includes a metal frame, a middle frame, and at least one antenna feed module. The metal frame includes an upper metal frame, a first side metal frame, a bottom metal frame, and a second side metal frame sequentially connected. The middle frame, spaced apart from the first side metal frame and the second side metal frame, forms a slit, the at least one antenna feed module is received in the slit.

20 Claims, 39 Drawing Sheets

ELECTRONIC DEVICE HAVING ANTENNA FEED MODULE

CROSS-REFERENCE TO RELATED APPLICATIONS

This application claims priority to Chinese Patent Application No. 202210490818.0 filed on May 7, 2022, in China National Intellectual Property Administration, the contents of which are incorporated by reference herein.

TECHNICAL FIELD

The present disclosure relates to the field of wireless communications technology, in particular to an electronic device having an antenna feed module.

BACKGROUND

With the advancement of wireless communication technology, electronic devices such as mobile phones continue to develop more functions, are thinner and lighter, and have faster and more efficient data transmission. The space that can receive antennas is getting smaller and smaller, and with the continuous development of wireless communication technology, the demand for antenna bandwidth continues to increase. Designing an antenna with a wider bandwidth and better efficiency in a limited space is problematic.

Therefore, there is a room for improvement.

DETAILED DESCRIPTION

Figure 1:
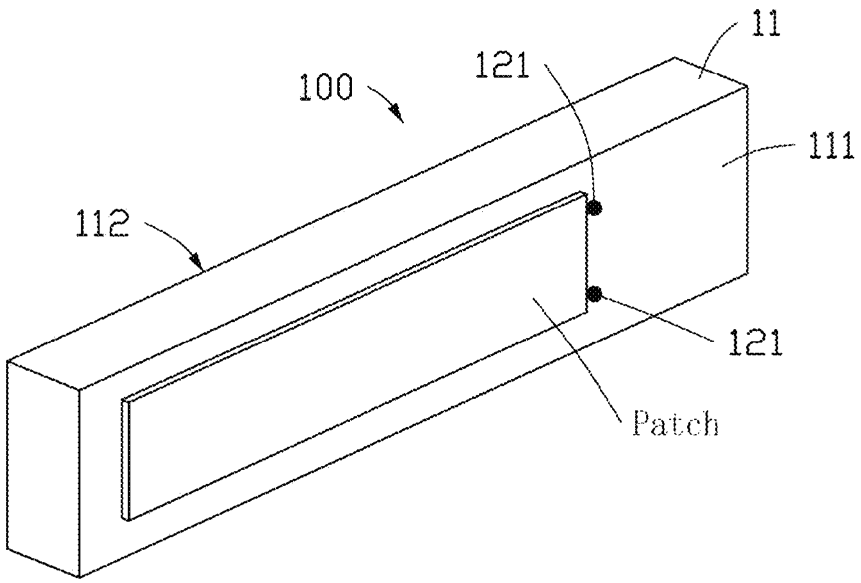
FIG. 1 is a schematic diagram of an antenna coupled feed module of a first embodiment of the present disclosure.

In order to make the purpose, technical solutions and advantages of the embodiments of the present disclosure clearer, the technical solutions in the embodiments of the present disclosure will be described clearly and completely in conjunction with the drawings in the embodiments of the present disclosure. Based on the embodiments of the present disclosure, all other embodiments obtained by those of ordinary skill in the art without creative work shall fall within the scope of protection of the present disclosure.

Those skilled in the art should understand that, in the disclosure of the present disclosure, "at least one" refers to one or more, and "multiple" refers to two or more. Unless otherwise defined, all technical and scientific terms used herein have the same meaning as commonly understood by those skilled in the technical field in the present disclosure. The terminology used in the specification of present disclosure is only for the purpose of describing specific embodiments, and is not intended to limit the present disclosure.

It can be understood that, unless otherwise specified in the present disclosure, "/" means "or". For example, "A/B" can mean A or B. "A and/or B" in the present disclosure is only an association relationship describing the associated objects, which means that there can be three relationships: only A, only B, and A and B.

It can be understood that, in the disclosure of the present disclosure, the words such as "first" and "second" are only used for the purpose of distinguishing description, and cannot be understood as indicating or implying relative importance, nor as indicating or implying order. The features defined as "first" and "second" may explicitly or implicitly include one or more of the features. In the description of the embodiments of the present disclosure, the words such as "exemplary" or "for example" are used as examples, illustrations, or illustrations. Any embodiment or design solution described as "exemplary" or "for example" in the embodiments of the present disclosure should not be construed as being more preferable or advantageous than other embodiments or design solutions. To be precise, words such as "exemplary" or "for example" are used to present related concepts in a specific manner.

Those skilled in the art should understand that, in the disclosure of the present disclosure, the terms "longitudinal", "lateral", "upper", "lower", "front", "rear", "left", "right", the orientation or positional relationship indicated by "vertical", "horizontal", "top", "bottom", "inner", "outer", etc. are based on the orientation or positional relationship shown in the drawings, which is only for the convenience of describing the present disclosure and to simplify the description, rather than indicating or implying that the device or element referred to must have a specific orientation, or be constructed and operated in a specific orientation, so the above terms should not be understood as limiting the present disclosure.

A First Embodiment

Figure 2:
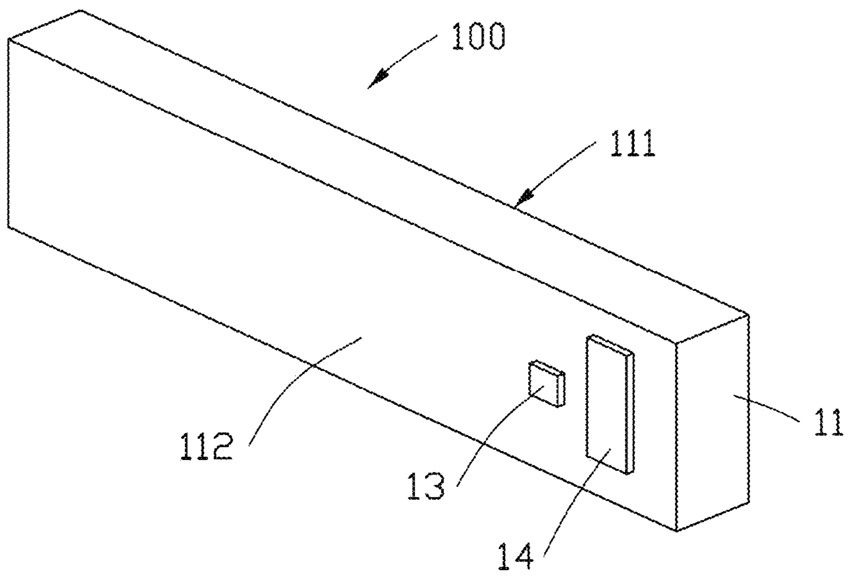
FIG. 2 is a schematic diagram of the antenna coupled feed module shown in FIG. 1 from another angle.
Figure 3A:
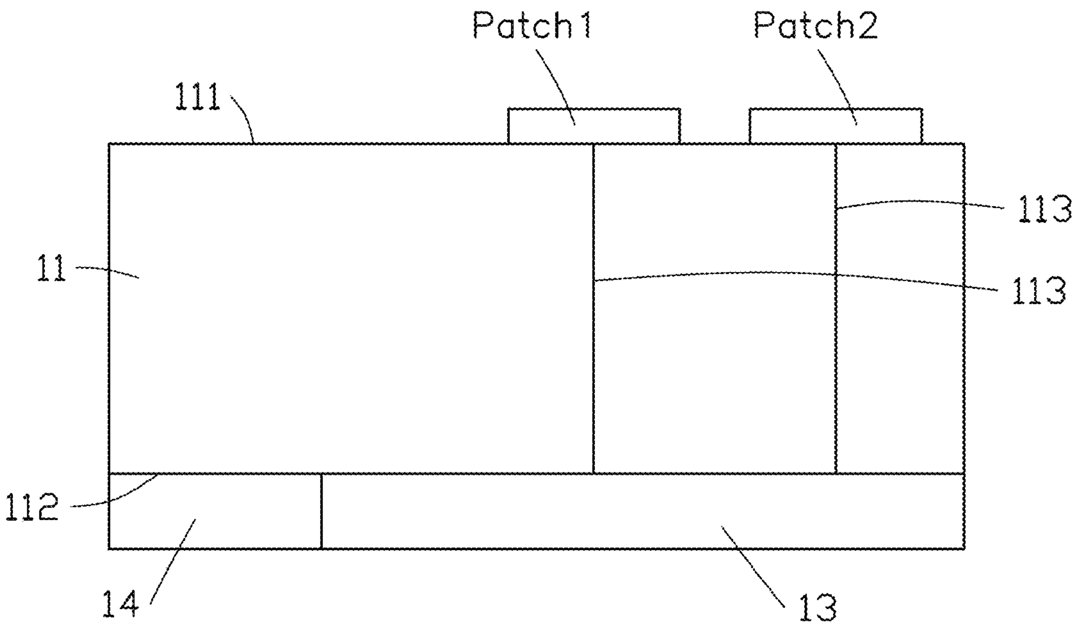
FIGS. 3A, 3B, and 3C are schematic diagrams of the antenna coupled feed module from another angle according to the first embodiment of the present disclosure.
Figure 3B:
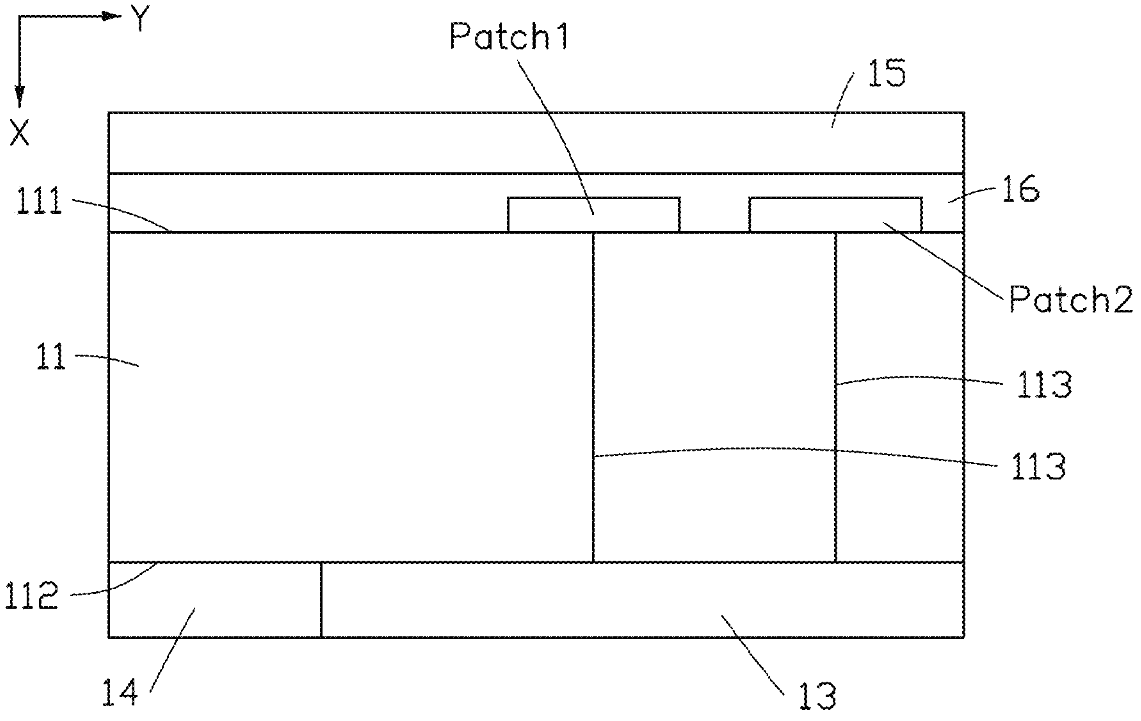

FIGS. 1, 2, and 3B illustrate an antenna coupled feed module 100 in accordance with an embodiment of the present disclosure. The antenna coupled feed module 100 includes a substrate 11, at least one coupled feed portion Patch, an active circuit 13 (shown in FIG. 2), a connector 14 (shown in FIG. 2), a metal layer 15, and a non-conductive layer 16 (shown in FIG. 3B).

The substrate 11 may be a dielectric substrate, for example, a printed circuit board (PCB), a ceramic (ceramics) substrate or other dielectric substrate, which is not specifically limited herein. The substrate 11 includes a first surface 111 and a second surface 112, and the second surface 112 is disposed opposite to the first surface 111.

Figure 3C:
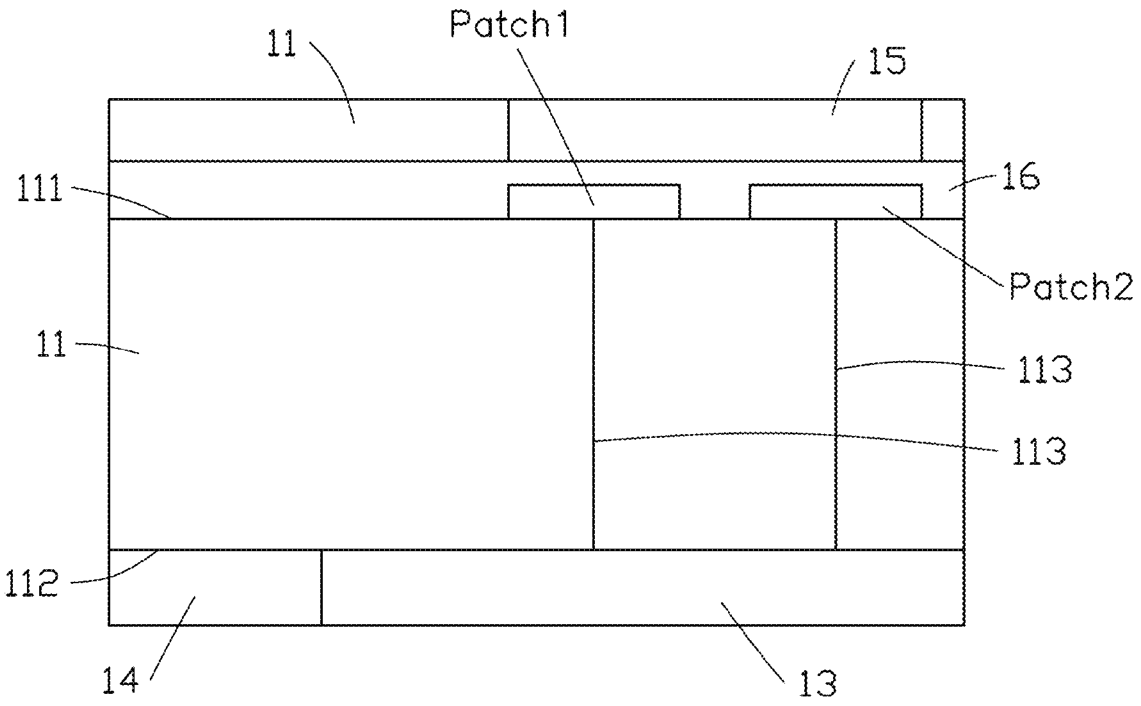

Referring to FIG. 3A, in the embodiment of the present disclosure, the antenna coupled feed module 100 includes a first coupled feed portion, as shown Patch 1 in FIG. 3A, FIG. 3B and FIG. 3C, and a second coupled feed portion, as shown Patch 2 in FIG. 3A, FIG. 3B and FIG. 3C, which overall are in a form of a metal sheet. The first coupled feed portion Patch 1 and the second coupled feed portion Patch 2 are disposed on the first surface 111 of the substrate 11. The first coupled feed portion Patch 1 and the second coupled feed portion Patch 2 may be connected to the second surface 112 of the substrate 11 through holes (vias) 113. It should be known that, Patch 1 and Patch 2 may be reference numbers for the first coupled portion and the second coupled portion in the description.

FIG. 3A, in one of the embodiments, shows the first coupled feed portion Patch 1 and the second coupled feed portion Patch 2; both are generally rectangular-shaped patches, and their surfaces do not have gaps, slots, or breakpoints, etc. At least one (for example, two are shown in the figures) signal feed points 121 is provided on one side of each of the first coupled feed portion Patch 1 and the second coupled feed portion Patch 2. The signal feed points 121 are used to electrically connect to a corresponding feeding source (not shown in the figures, see undermentioned details) through a matching circuit (not shown in the figures, see detailed later) and the holes (vias) 113, and electrical signals being thereby fed to the first coupled feed portion Patch 1 and the second coupled feed portion Patch 2.

The first coupled feed portion Patch 1 and the second coupled feed portion Patch 2 are spaced from each other. The embodiment of the present disclosure does not limit the specific shape and structure of the first coupled feed portion Patch 1 and the second coupled feed portion Patch 2. Shapes, structures, sizes, and a size ratio of the first coupled feed portion Patch 1 and the second coupled feed portion Patch 2 may be adjusted for different radiation frequencies, so as to provide wide frequency coupling effect through greater sizes of radiator. For example, the first coupled feed portion Patch 1 and the second coupled feed portion Patch 2 are close to but apart from a radiation body (the radiation body can be any conductor, such as iron, copper foil of a Flexible Printed Circuit on a PCB, a conductor in a laser direct structuring (LDS) process, etc., which are not specifically limited here), and are configured to couple electrical signals to the radiation body, so the radiation body may transmit and receive wireless signals. The greater the size of the coupled feed portion is, the greater the frequency range will be, so as to provide wider radiation frequencies.

FIGS. 2 and 3A, in the embodiment of the present disclosure, show that the active circuit 13 is disposed on the second surface 112 of the substrate 11. The second surface 112 of the substrate 11 is provided with connection lines (not shown). The connection lines are connected to the active circuit 13. The active circuit 13 may include a switch, and/or other adjustable elements that can change or switch impedances (not shown in the figures, see details below). The active circuit 13 may be electrically connected to the first coupled feed portion Patch 1 and the second coupled feed portion Patch 2 and the connector 14 through the connection line. For example, in one of the embodiments, the substrate 11 is further provided with the holes (vias) 113, and the first coupled feed portion Patch 1 and the second coupled feed portion Patch 2 may be connected to the second surface 112 of the substrate 11 through the holes (vias) 113, and connected to the active circuit 13 through the connection lines on the second surface 112.

The connector 14 is arranged on the second surface 112 of the substrate 11, that is, the connector 14 is arranged on the surface where the active circuit 13 is located. In some embodiments, the connector 14 and the active circuit 13 may be spaced apart and electrically connected to each other. In the embodiment of the present disclosure, the specific positional relationship and connection relationship between the connector 14 and the active circuit 13 are not limited. For example, in one of the embodiments, the active circuit 13 can be disposed in the connector 14, the connector 14 can be used to accommodate the active circuit 13. The connector 14 is electrically connected to the active circuit 13 and connected to a corresponding transmission line, to realize signal transmission of the antenna coupled feed module 100 through the transmission lines, for example, for signal sending or receiving.

It can be understood that the transmission line can be, but is not limited to, a coaxial cable, a flexible printed circuit board (FPCB) or other transmission lines.

FIG. 3B and FIG. 3C show that the non-conductive layer 16 is arranged between the metal layer 15 and the at least one coupled feed portion Patch, and the non-conductive layer 16 covers the at least one coupled feed portion Patch. In detail, the non-conductive layer 16 covers the first surface 111 of the substrate 11 and the first coupled feed portion Patch 1 and the second coupled feed portion Patch 2. In one of the embodiments, the non-conductive layer 16 is made of non-conductive materials, such as one or more materials from fire resistant materials FR4, aluminum oxide (AL2O3), Arlon materials, and ceramics, etc.

The metal layer 15 is arranged at a side of the non-conductive layer 16 that is away from the substrate 11. A shape and a size of the metal layer 15 may be adjusted according to different radiation requirements. In one of the embodiments, referring to FIG. 3B, an area of the metal layer 15 corresponds to an area of the non-conductive layer 16. That is, a projection area of the metal layer 15 along a first direction is substantially same as a projection area of the non-conductive layer 16 along the first direction, and the projection area of the metal layer 15 along the first direction is greater than a projection area of the first coupled feed portion Patch 1 and a second coupled feed portion Patch 2 along the first direction. The first direction may be a direction of the metal layer 15 and the non-conductive layer 16 facing the substrate 11, or can be a direction along a thickness of the substrate 11, such as the X direction shown in FIG. 3B. In another embodiment, referring to FIG. 3C, the area of the metal layer 15 corresponds to an area of the first coupled feed portion Patch 1 and the second coupled feed portion Patch 2. That is, the projection area of the metal layer 15 along the first direction is substantially same as a projection area of the first coupled feed portion Patch 1 and the second coupled feed portion Patch 2 along the first direction, a projection position of the first coupled feed portion Patch 1 and the second coupled feed portion Patch 2 corresponding to a projection position of the metal layer 15. The first coupled feed portion Patch 1 and the second coupled feed portion Patch 2 are positioned within a projected range of the metal layer 15 along the first direction. The projection area of the metal layer 15 along the first direction is smaller than the projection area of the non-conductive layer 16 along the first direction, and the metal layer 15 is positioned within a projected range of the non-conductive layer 16 along the first direction.

The first coupled feed portion Patch 1 and the second coupled feed portion Patch 2 respectively supply electrical signals from the active circuit 13 through signal feed points 121, and further couple the electrical signals to the metal layer 15. The metal layer 15 conducts the electrical signals to the radiation body (the radiation body can be any conductor, such as iron, copper foil of a Flexible Printed Circuit on a PCB, a conductor in a laser direct structuring (LDS) process, etc., which are not specifically limited here). In addition, the antenna coupled feed module 100 allows the switch of the active circuit 13 to switch between multiple modes, thereby realizing multiple broadband operations.

For example, in one of the embodiments, when the first coupled feed portion Patch 1 and the second coupled feed portion Patch 2 are spaced from each other, and arranged to resist the radiation body through the metal layer 15, the radiation body may receive 4G/5G intermediate frequency signals (frequency range of 1.7 GHz-2.2 GHz), high frequency signals (frequency range of 2.3 GHz-2.7 GHz), ultra high band (UHB) signals (frequency range of 3.3 GHz-5 GHz), GPS signals (frequency range of 1.5 GHz-1.6 GHz), and WI-FI signals (frequency range of 2.4 GHz, 5 GHz).

In the embodiment of the present disclosure, the radiation frequencies of the antenna coupled feed module 100 are not limited. For example, the shape, length, width and other characteristics of the antenna coupled feed module 100 can be adjusted to achieve a required frequency or frequencies. The shape, length, width and other characteristics of the coupled feed portion Patch can also be adjusted according to the required frequency or frequencies.

Figure 4:
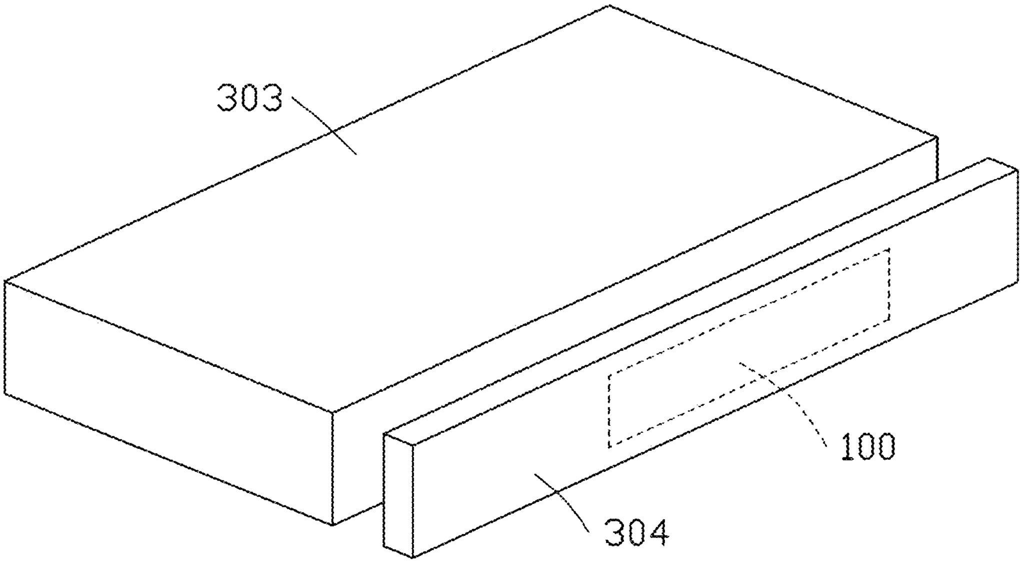
FIG. 4 is a schematic diagram of the antenna coupled feed module arranged on one side of a metal frame of an electronic device according to the first embodiment of the present disclosure.
Figure 5:
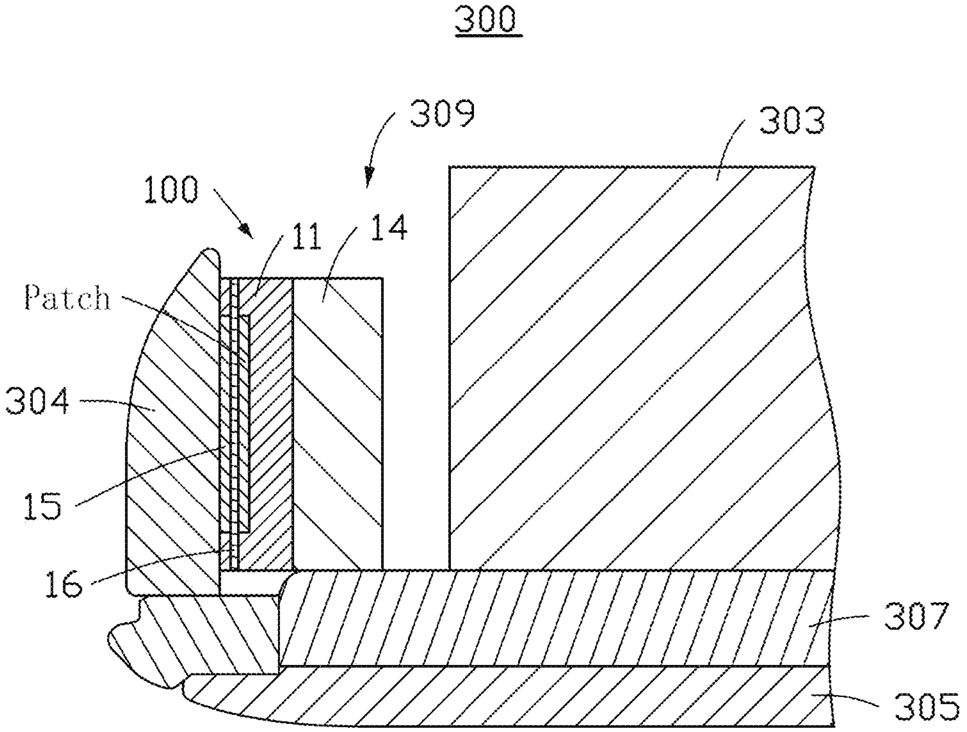
FIG. 5 is a schematic diagram of the antenna coupled feed module and the metal frame shown in FIG. 4 at another angle.

In the embodiment of the present disclosure, referring to FIGS. 4 and 5, the antenna coupled feed module 100 may be applied in an electronic device 300 having a metal frame 304 and at least one electronic component 303. The metal frame 304 and the at least one electronic component 303 are spaced from each other and a slit 309 is formed therebetween. The antenna coupled feed module 100 may be arranged in the slit 309. The metal layer 15 faces and is in contact with the metal frame 304, meanwhile, the at least one coupled feed portion Patch (such as the first coupled feed portion Patch 1 and the second coupled feed portion Patch 2, as shown in FIGS. 3A and 3B) faces the metal frame 304. A side of the substrate 11 carrying the active circuit 13 and the connector 14 is spaced from the at least one electronic component 303.

In the embodiments of the present disclosure, the specific structure of the metal frame 304, and/or its connection relationship with other components are not limited. For example, the side of the metal frame 304 may be connected to ground (the metal frame 304 is grounded), or not connected to ground. For another example, the metal frame 304 may be provided with or without breakpoints, gaps and slots.

Figure 6:
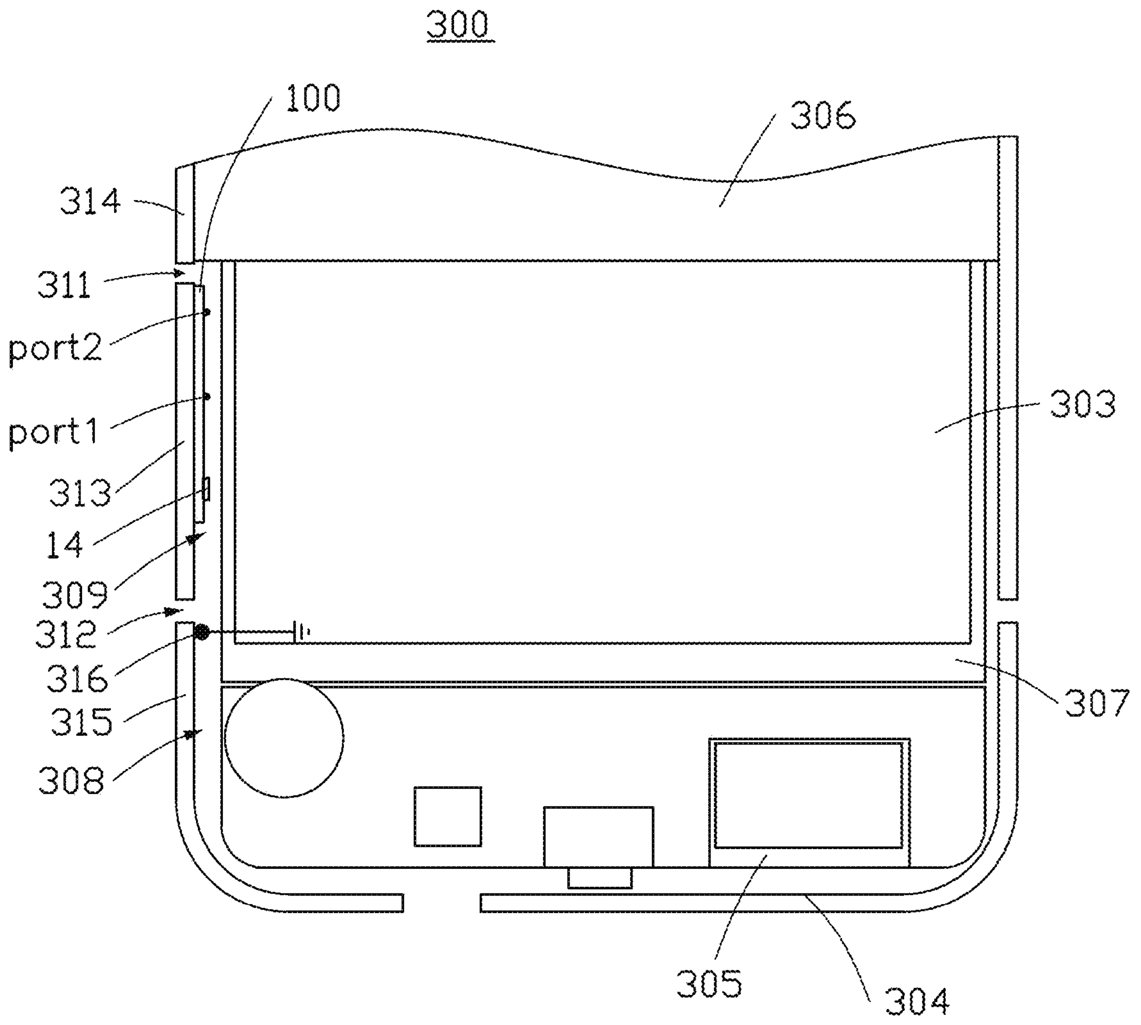
FIG. 6 is a schematic diagram of the antenna coupled feed module applied to the electronic device of the first embodiment of the present disclosure.

FIG. 6, in an embodiment of the present disclosure, shows that the antenna coupled feed module 100 can be applied to the electronic device 300 to transmit and receive radio waves. The electronic device 300 may be a handheld communication device (such as a mobile phone), a foldable phone, a smart wearable device (such as a watch, earphone, etc.), a tablet computer, a personal digital assistant (personal digital assistant, PDA), not specifically limited here.

The electronic device 300 may adopt one or more of the following communication technologies: BLUETOOTH (BT) communication technology, global positioning system (GPS) communication technology, WI-FI communication technology, global system for mobile communications (GSM) communication technology, wideband code division multiple access (WCDMA) communication technology, long term evolution (LTE) communication technology, 5G communication technology, SUB-6G communication technology and other future communication technologies.

In the embodiment of the present disclosure, the electronic device 300 is a mobile phone.

FIG. 6, in one embodiment, shows that the electronic device 300 includes an electronic component 303, the metal frame 304, a backplane 305, a ground plane 306, and a middle frame 307 (shown in FIG. 5). The metal frame 304 is made of metal or other conductive material. The backplane 305 may be made of metal or other conductive material. The metal frame 304 is disposed on the edge of the backplane 305 and forms an accommodating space 308 together with the backplane 305. An opening (not shown in the figures) is provided on the side of the metal frame 304 opposite to the backplane 305, for accommodating a display unit (not shown).

The display unit has a display plane, and the display plane is exposed at the opening. It can be understood that the display unit can be combined with a touch sensor to form a touch screen. The touch sensor can also be called touch panel or touch sensitive panel.

In the embodiment of the present disclosure, the display unit has a high screen-to-body ratio. That is, the area of the display plane of the display unit is greater than 70% of the front area of the electronic device, and even a full front screen can be achieved. Specifically, in the embodiment of the present disclosure, full screen means that, except for the necessary slots opened on the electronic device 300, the left, right, and lower sides of the display unit are seamlessly connected to the metal frame 304.

The ground plane 306 may be made of metal or other conductive material. The ground plane 306 can be disposed in the accommodating space 308 enclosed by the metal frame 304 and the backplane 305, and is connected to the backplane 305.

The middle frame 307 is made of metal or other conductive material. The shape and size of the middle frame 307 can be smaller than those of the ground plane 306. The middle frame 307 is stacked on the ground plane 306. In this embodiment, the middle frame 307 is a metal sheet disposed between the display unit and the ground plane 306. The middle frame 307 is used to support the display unit, provide electromagnetic shielding, and improve the mechanical strength of the electronic device 300.

In the embodiment, the metal frame 304, the backplane 305, the ground plane 306, and the middle frame 307 may form an integral metal frame. The backplane 305, the ground plane 306, and the middle frame 307 are made of metal with large surface areas, so they can jointly form the system ground plane (not shown in the figures) of the electronic device 300.

The electronic component 303 is arranged on the middle frame 307 to provide electrical energy for the electronic components, modules, circuits of the electronic device 300. The electronic component 303 and the metal frame 304 are spaced apart, and the slit 309 is formed between the electronic component 303 and the metal frame 304. In the embodiment, the electronic component 303 can be but is not limited to a battery.

In other embodiment, the electronic device 300 may also include one or more electronic components, for example, a processor, a circuit board, a memory, an input and output circuit, an audio component (such as a microphone and a speaker), and a multimedia component (such as a front camera and/or a rear camera), and a sensory component (such as a proximity sensor, a distance sensor, an ambient light sensor, an acceleration sensor, a gyroscope, a magnetic sensor, a pressure sensor and/or a temperature sensor).

When the antenna coupled feed module 100 is applied to the electronic device 300, the antenna coupled feed module 100 can be arranged in the slit 309 and arranged to be substantially perpendicular to the plane of the ground plane 306. A part of the metal frame 304 constitutes the radiation body, and a first gap 311 and a second gap 312 are defined on the metal frame 304. The first gap 311 and the second gap 312 cut through the metal frame 304, and divide the metal frame 304 into a first part 313, a second part 314, and a third part 315, arranged at intervals. The first part 313, the second part 314, and the third part 315 may each radiate wireless signals. The second part 314 may be electrically connected to the system ground, such as the ground plane 306.

The first part 313, the second part 314, and the third part 315 may be connected to the slit 309 and be filled with insulating materials, such as plastic, rubber, glass, wood, ceramics, but not limited to this.

In one embodiment, a ground point 316 is provided on the side of the third part 315 close to the second gap 312. One end of the ground point 316 is electrically connected to the third part 315, and the other end is electrically connected to the middle frame 307, that is, grounded. The antenna coupled feed module 100 is disposed in the slit 309 between the first part 313 and the ground point 316, and is disposed substantially perpendicular to the plane of the ground plane 306.

When the antenna coupled feed module 100 is disposed in the slit 309, the first coupled feed portion Patch 1 and the second coupled feed portion Patch 2 on the antenna coupled feed module 100 face and are spaced apart from the first part 313, the metal layer 15 faces and contacts the first part 313. The connector 14 is arranged on the other surface of the substrate 11, that is, it is arranged away from the first part 313. One end of the connector 14 is electrically connected to the middle frame 307, and the other end is electrically connected to the substrate 11.

In another embodiment, the antenna coupled feed module 100 corresponds to the first part 313, the second gap 312, and the third part 315. The metal layer 15 faces and contacts the first part 313 and the third part 315, the first coupled feed portion Patch 1 faces and is spaced apart from the third part 315, and the second coupled feed portion Patch 2 faces and is spaced apart from the first part 313. Thus, the antenna coupled feed module 100 may feed electrical signals into the first part 313 and the third part 315.

Figure 7:
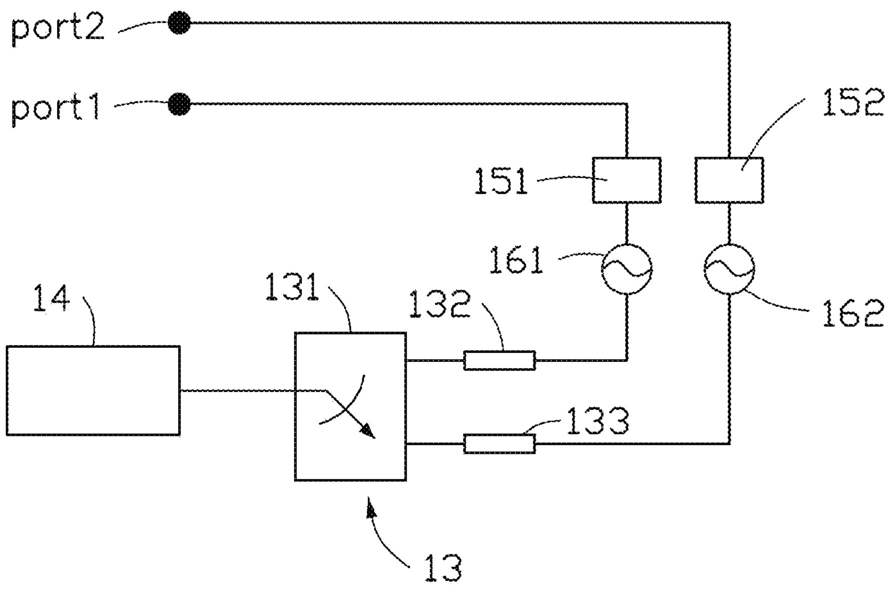
FIG. 7 is a schematic diagram of the circuit connections of the active circuit of the antenna coupled feed module shown in FIG. 6.

FIG. 6 and FIG. 7 shows that each of the first coupled feed portion Patch 1 and the second coupled feed portion Patch 2 includes a signal feed point (for example, a first signal feed point port 1 and a second signal feed point port 2, the aforementioned signal feed point 121). Each signal feed point 121 is electrically connected to the feed source through the matching unit. For example, the first signal feed point port 1 of the first coupled feed portion Patch 1 is electrically connected to a first feeding source 161 through a first matching unit 151. The signal feed point port 2 of the second coupled feed portion Patch 2 is electrically connected to a second feeding source 162 through a second matching unit 152.

The active circuit 13 in the antenna coupled feed module 100 is disposed in the connector 14. As shown in FIG. 7, the active circuit 13 includes a switch 131 and a first adjustable element 132 and a second adjustable element 133. One end of the switch 131 is electrically connected to the connector 14, and the other end of the switch 131 is electrically connected to a feed source through first adjustable element 132 and second adjustable element 133. For example, the switch 131 is electrically connected to the first feeding source 161 through the first adjustable element 132, the switch 131 is electrically connected to the second feeding source 162 through the second adjustable element 133. That is, the matching circuit includes at least a first matching unit 151 and a second matching unit 152.

The first coupled feed portion Patch 1 and the second coupled feed portion Patch 2 feed in electrical signals and are coupled to the metal layer 15, the metal layer 15 conducts the electrical signals to the first part 313, the first part 313 further couples the electrical signals to the second part 314 and the third part 315. The coupling among the first coupled feed portion Patch 1, the second coupled feed portion Patch 2, first part 313, the second part 314 and the third part 315 resonates adjustable radiation modes. The coupling state between the first coupled feed portion Patch 1 and the second coupled feed portion Patch 2 can be controlled, and independent modes with tunability and good antenna efficiency can be generated through coupling. The switching of the switch 131 in the active circuit 13 can switch between multiple modes, and use multiple adjustable elements (for example, the first adjustable element 132 and second adjustable element 133) to achieve multiple frequency bands.

Figure 8:
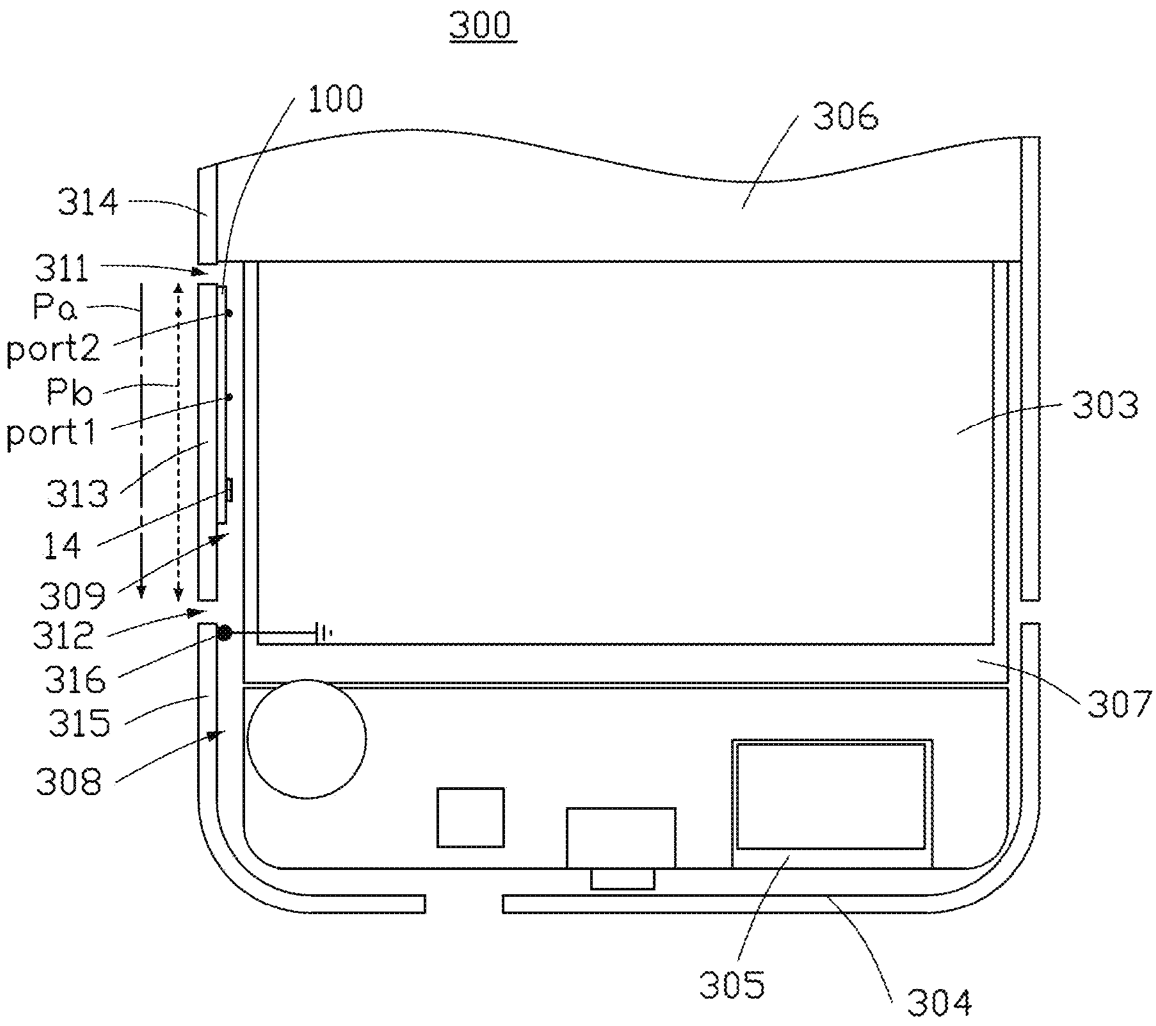
FIG. 8 is a schematic diagram of current paths of the antenna coupled feed module shown in FIG. 6.

FIG. 8 is a schematic diagram of the current path of the electronic device 300. The first coupled feed portion Patch 1 with the first signal feed point port 1 can excite middle frequency and high frequency (such as path Pa) modes. The middle frequency and high frequency modes can be achieved with the best antenna efficiency by using the slit 309, and the operation frequency range of the first coupled feed portion Patch 1 can cover the middle frequency band (1.71 GHz-2.17 GHz) and high frequency band (2.3 GHz-2.69 GHz).

The second coupled feed portion Patch 2 with the second signal feed point port 2 can excite an ultra-high bandwidth (UHB) mode and a 5G Sub 6 NR mode (such as path Pb). UHB band and 5G Sub6 NR modes can be achieved with best antenna efficiency by using slit 309. The operation frequency range of the second coupled feed portion Patch 2 can cover the UHF frequency band (3.3 GHz-5 GHz) and 5G Sub 6 NR frequency band (for example, 5G Sub 6 N77 frequency band (3.3 GHz-4.2 GHz), 5G Sub 6 N78 frequency band (3.3 GHz-3.8 GHz), and 5G Sub 6 N79 frequency band (4.4 GHz-5 GHz)).

The switch 131 is a middle frequency band, high frequency band, UHB and 5G Sub 6NR frequency band switch, used to switch to middle frequency band, high frequency band, UHB frequency band and 5G Sub 6 NR frequency band.

The antenna coupled feed module 100 can be applied to the electronic device 300, to increase the antenna efficiency bandwidth and have the best antenna efficiency, and the switching of the switch 131 can effectively improve the antenna frequency coverage. In one embodiment, the applicable operation frequency range of the antenna coupled feed module 100 can cover the middle frequency of 1.7 GHz to 2.17 GHz, the high frequency of 2.3 GHz-2.69 GHz, UHF 3.3 GHz-5 GHz, and can support 5G Sub 6 N77/N78/N79 frequency bands.

The first coupled feed portion Patch 1 and the second coupled feed portion Patch 2 of the antenna coupled feed module 100 may be set as independent sheet bodies, and signal feed points at appropriate positions of the first coupled feed portion Patch 1 and the second coupled feed portion Patch 2 may be correspondingly set. The metal layer 15 and the metal frame 304 (for example, the first part 313) are used as metal radiators, the metal layer 15, the metal frame 304. the first coupled feed portion Patch 1 and the second coupled feed portion Patch 2 in the slit 309, couple the energy to resonate the radiation mode covering middle frequency band, high frequency band, UHB frequency band, 5G Sub 6 N77, 5G Sub 6 N78, and 5G Sub 6 N79 frequency bands, so as to greatly increase bandwidth and antenna efficiency, and cover the world's commonly used 5G which is the application of communication frequency bands and meet the requirements of Carrier Aggregation (CA) supporting LTE-A (abbreviation for LTE-Advanced, which is the subsequent evolution of LTE technology).

Figure 9A:
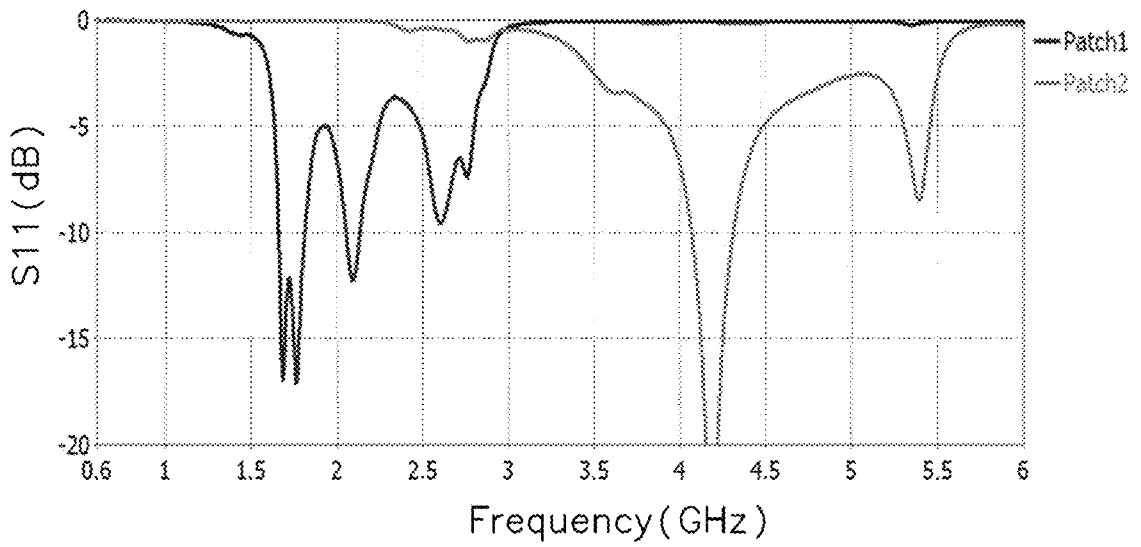
FIGS. 9A, 9B, and 9C are graphs of S parameters (scattering parameters) of the antenna coupled feed module as shown in FIGS. 3A, 3B, and 3C according to the first embodiment of the present disclosure.
Figure 9B:
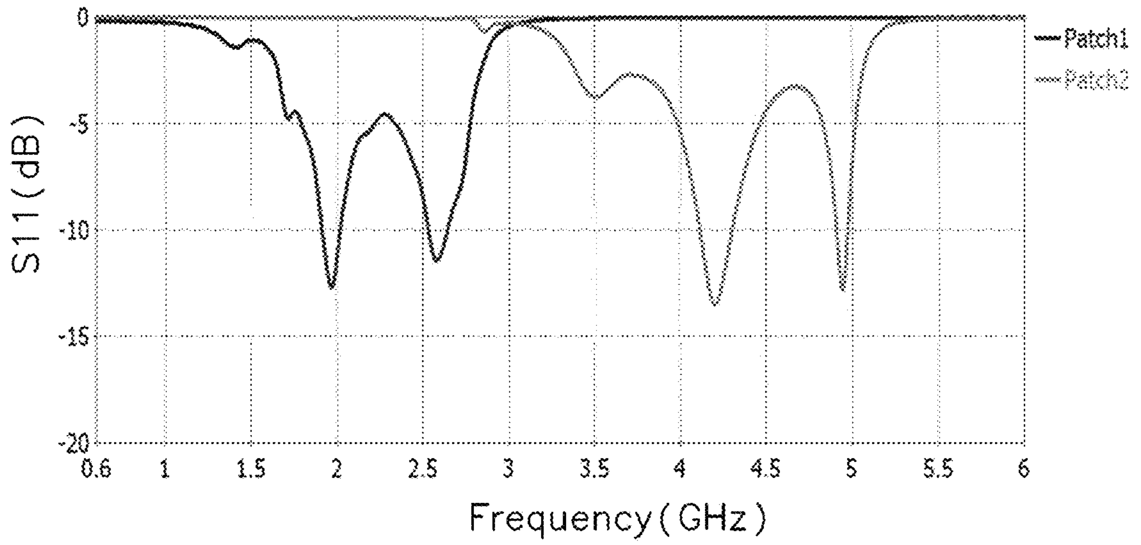
Figure 9C:
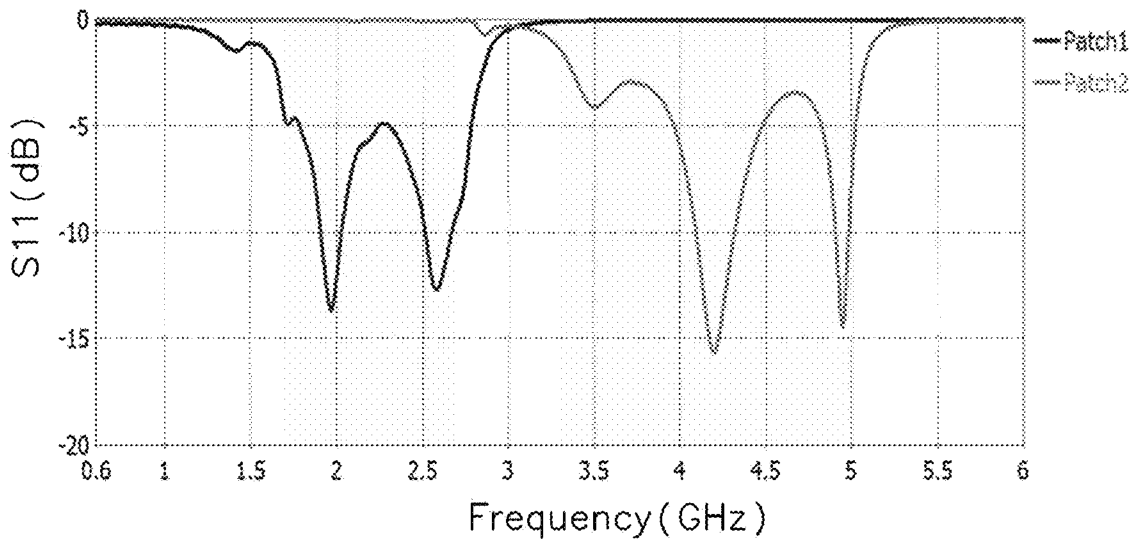

FIGS. 9A to 9C are graphs of S parameters (scattering parameters) when the first coupled feed portion Patch 1 and the second coupled feed portion Patch 2 of the antenna coupled feed module 100 correspond to different metal layers 15 (such as without metal layer in FIG. 3A and the metal layer 15 shown in FIGS. 3B and 3C). As shown in FIG. 9A, the first coupled feed portion Patch 1 and the second coupled feed portion Patch 2 without metal layer, and the switch 131 is used to generate independent modes with adjustability and satisfied antenna efficiency, the first coupled feed portion Patch 1, the metal layer 15, and the metal frame 304 may cover middle frequency band of 1.71 GHz-2.17 GHz and high frequency band of 2.3 GHz-2.69 GHz. The second coupled feed portion Patch 2, the metal layer 15, and the metal frame 304 may cover UHB frequency band 3.3 GHz-5 GHz, and can support 5G Sub N77/N78/N79 frequency bands. As shown in FIG. 9B, the first coupled feed portion Patch 1 and the second coupled feed portion Patch 2 correspond to the metal layer 15 as shown in FIG. 3B, and use the switch 131 to generate independent modes with adjustability and satisfied antenna efficiency, so the first coupled feed portion Patch 1, the metal layer 15, and the metal frame 304 may cover middle frequency band of 1.71 GHz-2.17 GHz and high frequency band of 2.3 GHz-2.69 GHz. The second coupled feed portion Patch 2, the metal layer 15, and the metal frame 304 may cover UHB frequency band 3.3 GHz-5 GHz, and can support 5G Sub 6 N77/N78/N79 frequency bands. As shown in FIG. 9C, the first coupled feed portion Patch 1 and the second coupled feed portion Patch 2 correspond to the metal layer 15 as shown in FIG. 3C, and use the switch 131 to generate independent modes with adjustability and satisfied antenna efficiency, so the first coupled feed portion Patch 1, the metal layer 15, and the metal frame 304 may cover middle frequency band of 1.71 GHz-2.17 GHz and high frequency band of 2.3 GHz-2.69 GHz. The second coupled feed portion Patch 2, the metal layer 15, and the metal frame 304 may cover UHF 3.3 GHz-5 GHz, and can support 5G Sub 6 N77/N78/N79 frequency bands.

The switch 131 can be switched to different signal feed points, the frequency modes can be controlled to cover the middle frequency of 1.71 GHz-2.17 GHz, and the high frequency of 2.3 GHz-2.69 GHz, UHF 3.3 GHz-5 GHz. 5G Sub 6 N77/N78/N79 frequency bands are also supported.

Figure 10A:
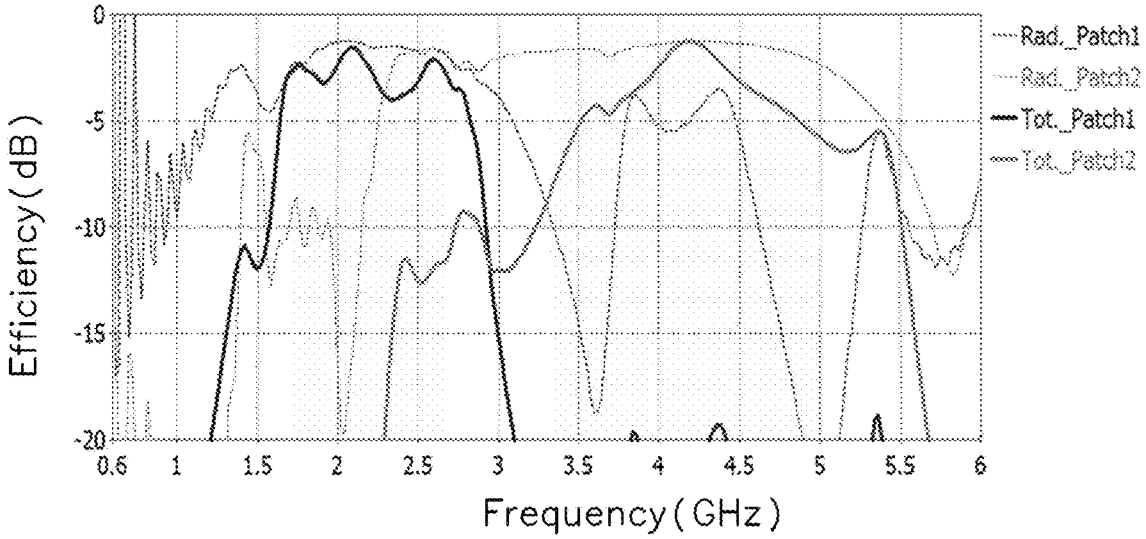
FIGS. 10A, 10B, and 10C are efficiency graphs of the antenna coupled feed module as shown in FIGS. 3A, 3B, and 3C according to the first embodiment of the present disclosure.
Figure 10B:
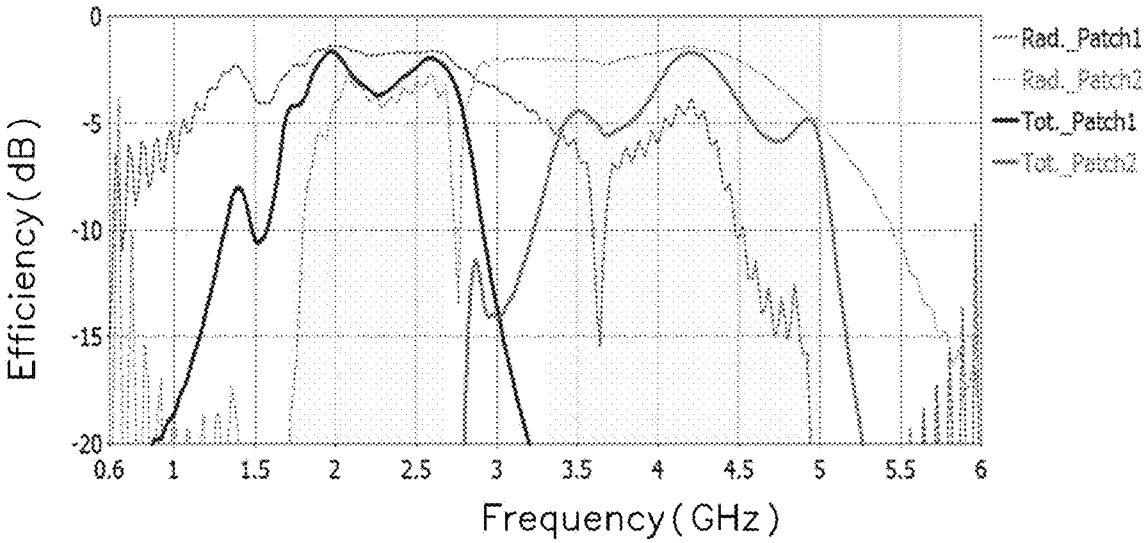
Figure 10C:
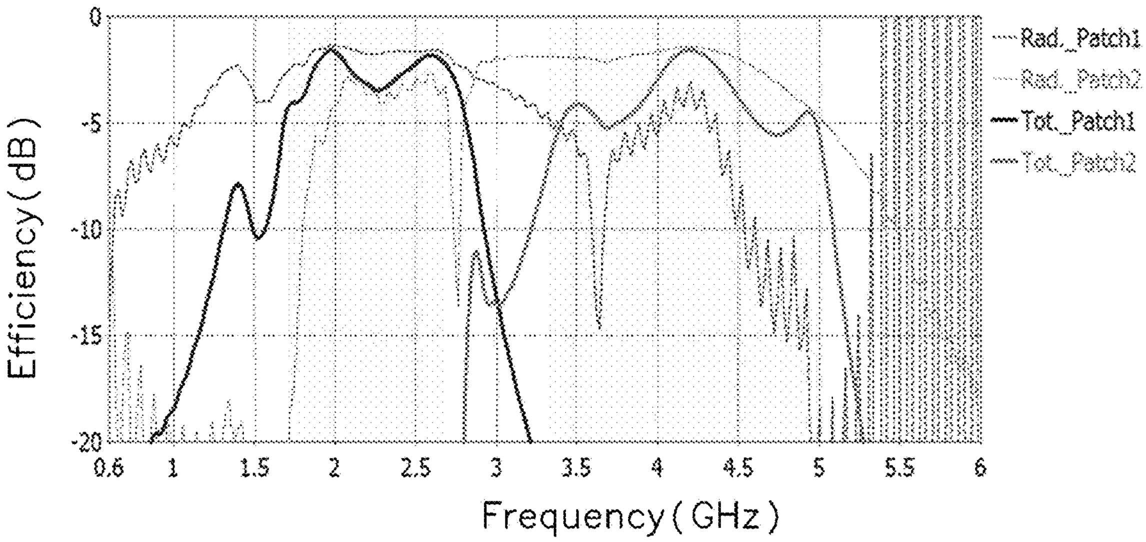

FIGS. 10A to 10C are efficiency graphs when the first coupled feed portion Patch 1 and the second coupled feed portion Patch 2 of the antenna coupled feed module 100 corresponding to different metal layer 15 (such as without metal layer in FIG. 3A and the metal layer 15 in FIGS. 3B and 3C). FIG. 10A shows the radiation efficiency (referred to as Rad. in the figure) and total efficiency (referred to as Tot. in the figure) values of each of the first coupled feed portion Patch 1 and the second coupled feed portion Patch 2 without metal layer, and using the switch 131 to generate independent modes with adjustability and satisfied antenna efficiency. FIG. 10B shows the radiation efficiency (referred to as Rad. in the figure) and total efficiency (referred to as Tot. in the figure) values of each of the first coupled feed portion Patch 1 and the second coupled feed portion Patch 2 corresponding to the metal layer 15 as shown in FIG. 3B, and the switch 131 is used to generate independent modes with adjustability and satisfied antenna efficiency. FIG. 10C shows the radiation efficiency (referred to as Rad. in the figure) and total efficiency (referred to as Tot. in the figure) values of each of the first coupled feed portion Patch 1 and the second coupled feed portion Patch 2 corresponding to the metal layer 15 as shown in FIG. 3C, and the switch 131 is used to generate independent modes with adjustability and satisfied antenna efficiency.

The antenna coupled feed module 100 sets the switch 131 and switches the switch 131 to different signal feed points, to control the frequency mode, and to cover the middle frequency band (1.71 GHz-2.17 GHz), the high frequency band (2.3 GHz-2.69 GHz), UHB (3.3 GHz-5 GHz), and can support 5G Sub 6 N77/N78/N79 frequency bands.

A Second Embodiment

Figure 11:
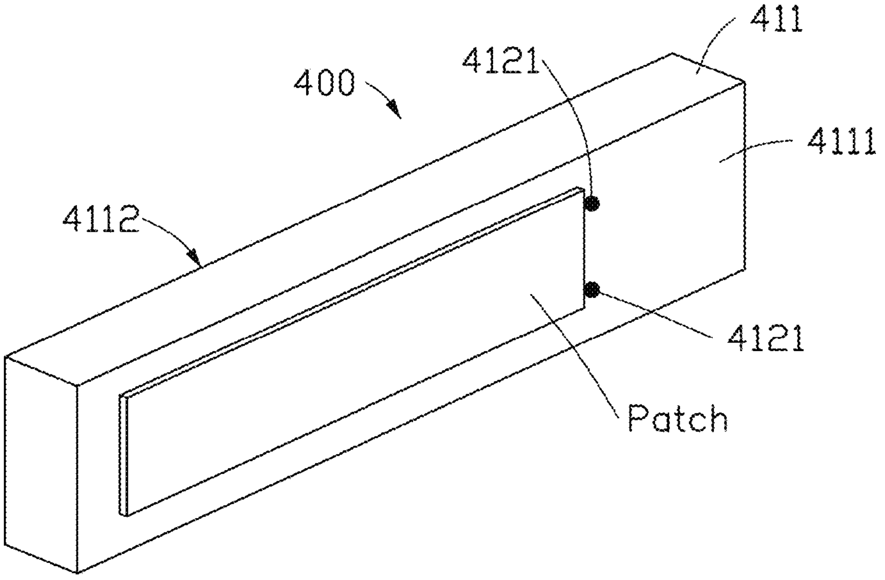
FIG. 11 is a schematic diagram of a microminiaturized antenna feed module of a second embodiment of the present disclosure.
Figure 12:
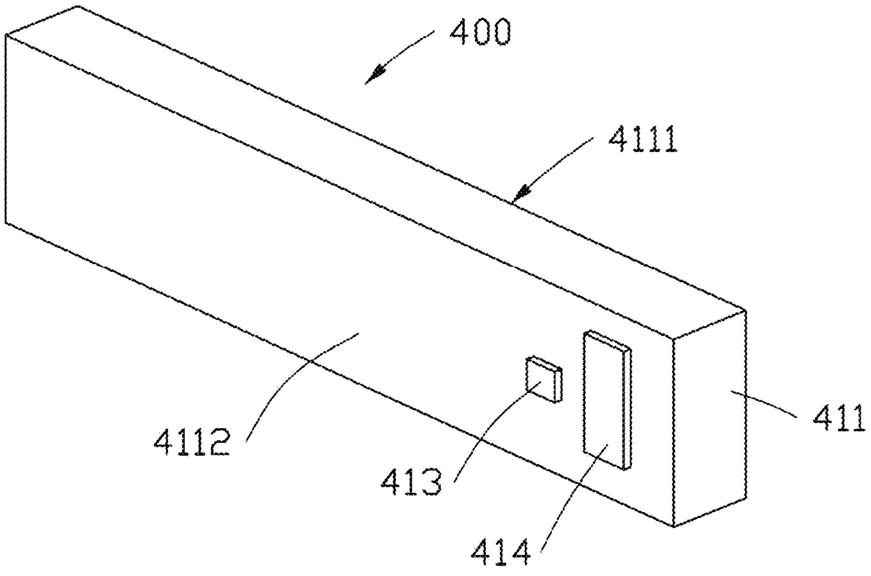
FIG. 12 is a schematic diagram of the microminiaturized antenna feed module shown in FIG. 11 from another angle.

FIGS. 11 and 12 illustrate a microminiaturized antenna feed module 400 in accordance with an embodiment of the present disclosure. The microminiaturized antenna feed module 400 includes a substrate 411, a plurality of coupled feed portions Patch, an active circuit 413 (shown in FIG. 12), and a connector 414 (shown in FIG. 12).

The substrate 411 may be a dielectric substrate, for example, a printed circuit board (PCB), a ceramic substrate or other dielectric substrate, which is not specifically limited herein. The substrate 411 includes a first surface 4111 and a second surface 4112, and the second surface 4112 is disposed opposite to the first surface 4111.

Figure 13A:
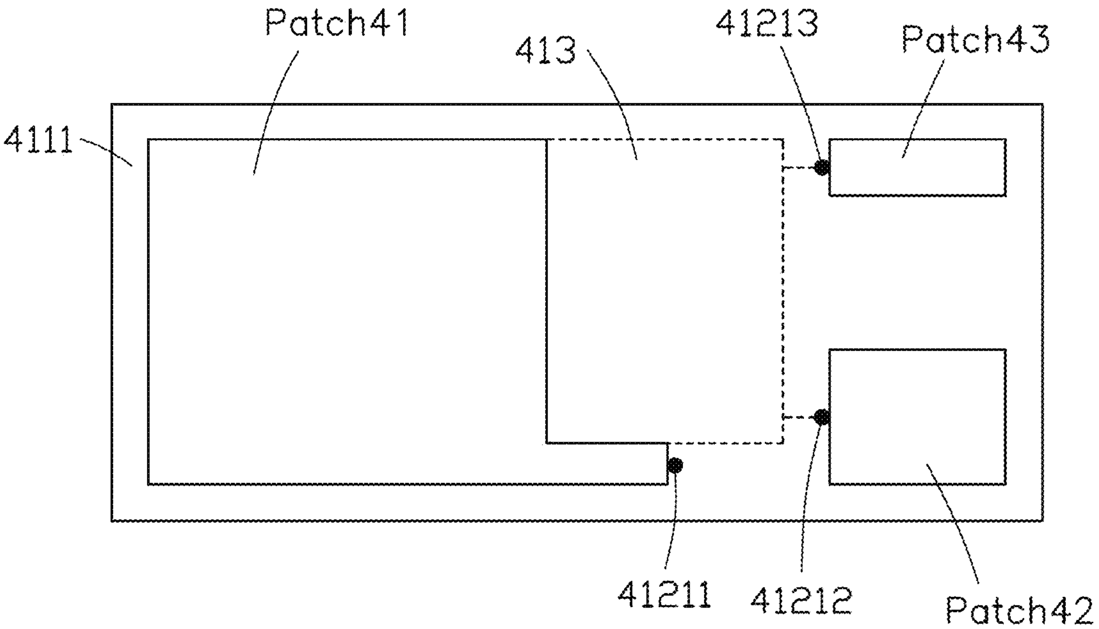
FIGS. 13A and 13B are schematic diagrams of the microminiaturized antenna feed module from another angle.
Figure 13B:
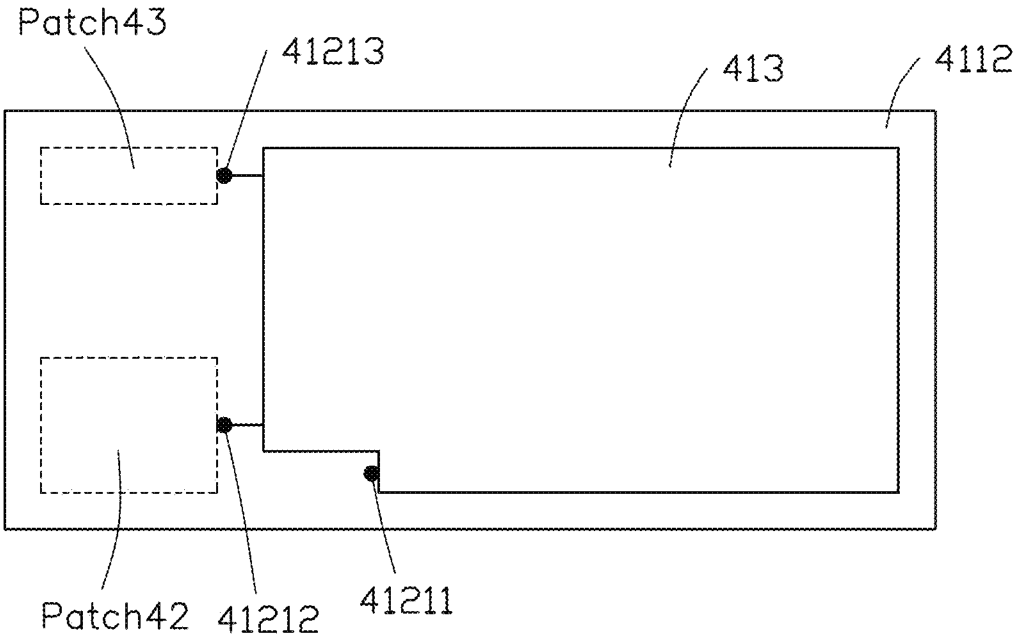

FIGS. 13A and 13B, in the embodiment of the present disclosure, show that the microminiaturized antenna feed module 400 includes a first coupled feed portion Patch 41, a second coupled feed portion Patch 42, and a third coupled feed portion Patch 43. The first coupled feed portion Patch 41, the second coupled feed portion Patch 42, and the third coupled feed portion Patch 43 are each in a form of a metal sheet. The first coupled feed portion Patch 41, the second coupled feed portion Patch 42, and the third coupled feed portion Patch 43 are disposed on the first surface 4111 of the substrate 411. The first coupled feed portion Patch 41, the second coupled feed portion Patch 42, and the third coupled feed portion Patch 43 may be connected to the second surface 4112 of the substrate 411 through a through hole or a via.

In one of the embodiments, the first coupled feed portion Patch 41, the second coupled feed portion Patch 42, and the third coupled feed portion Patch 43 are coplanar in the first surface 4111. The first coupled feed portion Patch 41, the second coupled feed portion Patch 42, and the third coupled feed portion Patch 43 are spaced apart from each other and not overlapped. The first coupled feed portion Patch 41 is generally L-shaped, and the second coupled feed portion Patch 42 and the third coupled feed portion Patch 43 are generally rectangular, their surfaces have no gaps, slots, or breakpoints, etc. Signal feed points 41211, 41212, and 41213 are respectively provided on one side of the corresponding coupled feed portions Patch 41, Patch 42, Patch 43. The signal feed points 41211, 41212, 41213 are used to electrically connect to feeding sources (not shown in the figures) through matching circuits (not shown in the figures), and electrical signals are thus fed to the coupled feed portions Patch 41, Patch 42, Patch 43.

The embodiment of the present disclosure does not limit the specific shape and structure of the coupled feed portions Patch 41, Patch 42, Patch 43.

The first coupled feed portion Patch 41, the second coupled feed portion Patch 42, and the third coupled feed portion Patch 43 are spaced apart from each other. Area and area allocations of the first coupled feed portion Patch 41, the second coupled feed portion Patch 42, and the third coupled feed portion Patch 43 are different and adjustable according to bandwidth requirement, so as to provide extended bandwidths with greater or smaller areas. For example, the first coupled feed portion Patch 41, the second coupled feed portion Patch 42, and the third coupled feed portion Patch 43 are close to a radiator (the radiator can be a metal frame of the electronic device, any conductor, such as iron, copper foil on a PCB soft board, a conductor in a laser direct structuring (LDS) process, etc., which are not specifically limited here), and configured to couple electrical signals to the radiator to transmit and receive wireless signals through the radiator. Obviously, the greater the area of the coupled feed portion, the greater will be the frequency width, so as to provide wider frequency coupling effect through greater areas. In the embodiment of the present disclosure, an area of the first coupled feed portion Patch 41 is greater than an area of the second coupled feed portion Patch 42, and the area of the second coupled feed portion Patch 42 is greater than an area of the third coupled feed portion Patch 43. A projection area of the first coupled feed portion Patch 41 on the substrate 411 occupies over 40% of the area of the substrate 411, a projection area of the second coupled feed portion Patch 42 on the substrate 411 occupies less than 10% of the area of the substrate 411, and a projection area of the third coupled feed portion Patch 43 on the substrate 411 occupies less than 10% of the area of the substrate 411.

FIGS. 11, 12, 13A, and 13B, in the embodiment of the present disclosure, show that the active circuit 413 is disposed on the second surface 4112 of the substrate 411. The second surface 4112 of the substrate 411 is provided with connection lines (not shown). The connection lines are connected to the active circuit 413. The active circuit 413 may include a switch, and/or other adjustable elements that can change impedances (not shown in the figures). The active circuit 413 can be electrically connected to the first coupled feed portion Patch 41, the second coupled feed portion Patch 42, and the third coupled feed portion Patch 43 and the connector 414 through the connection lines. For example, in one of the embodiments, the substrate 411 is further provided with a via (not shown), and the first coupled feed portion Patch 41, the second coupled feed portion Patch 42, and the third coupled feed portion Patch 43 can be connected to the second surface 4112 of the substrate 411 through the via, and connected to the active circuit 413 through the connection lines on the second surface 4112.

The connector 414 is arranged on the second surface 4112 of the substrate 411, where the active circuit 413 is located. In some embodiments, the connector 414 and the active circuit 413 may be spaced apart and electrically connected to each other. In the embodiment of the present disclosure, the specific positional relationship and connection relationship between the connector 414 and the active circuit 413 are not limited. For example, in one of the embodiments, the active circuit 413 can be disposed in the connector 414, the connector 414 can be used to accommodate the active circuit 413. The connector 414 is electrically connected to the active circuit 413 and connected to a transmission line, to realize signal sending or receiving.

It can be understood that the transmission line can be, but is not limited to, a coaxial cable, a flexible printed circuit board (FPCB) or other transmission lines.

Embodiment of First Arrangement

Figure 14A:
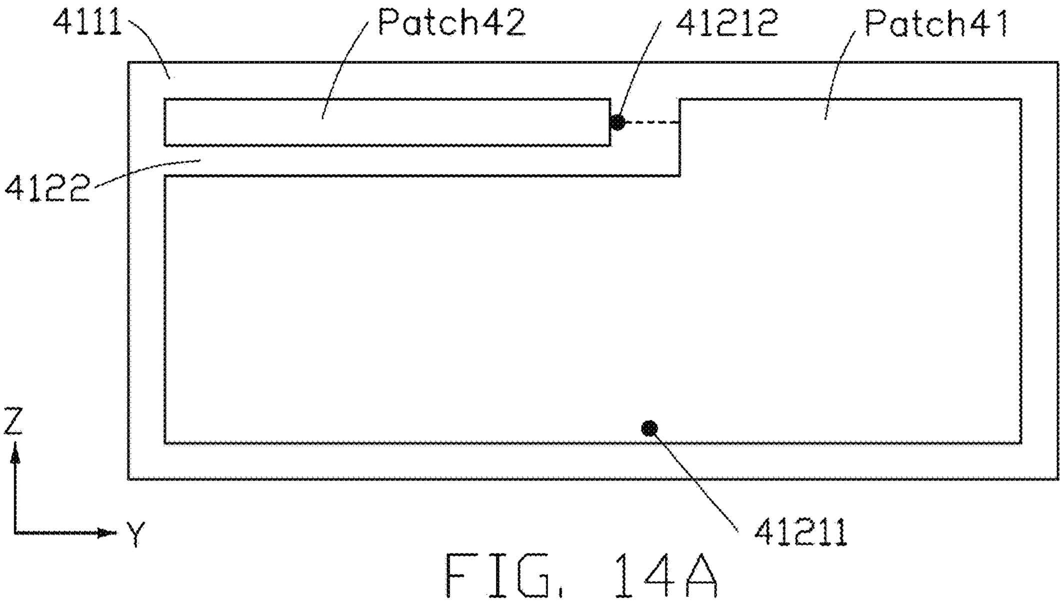
FIGS. 14A to 14C are schematic diagrams of the microminiaturized antenna feed module according to the second embodiment of first arrangement of the present disclosure.
Figure 14B:
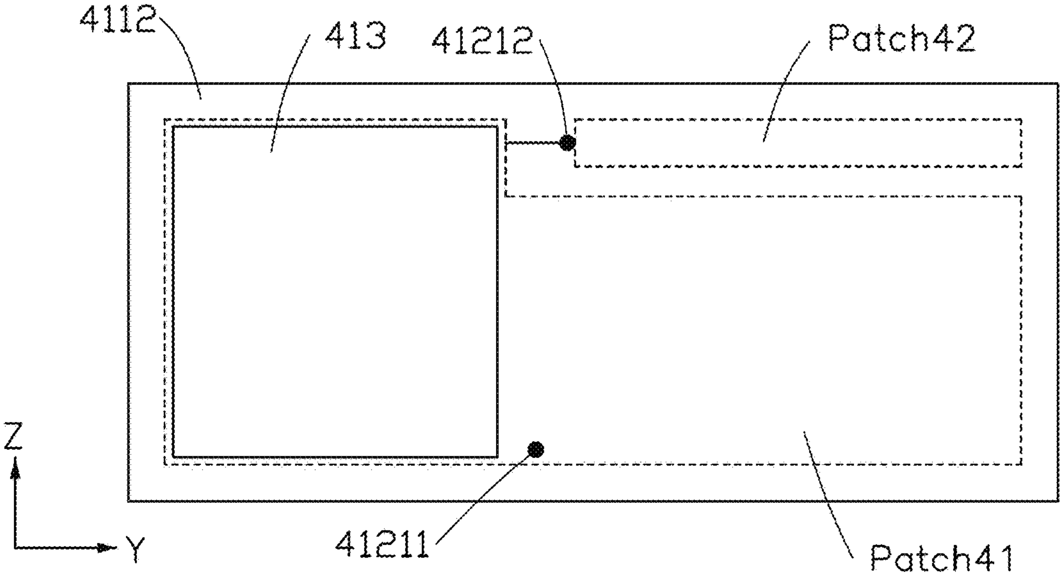
Figure 14C:
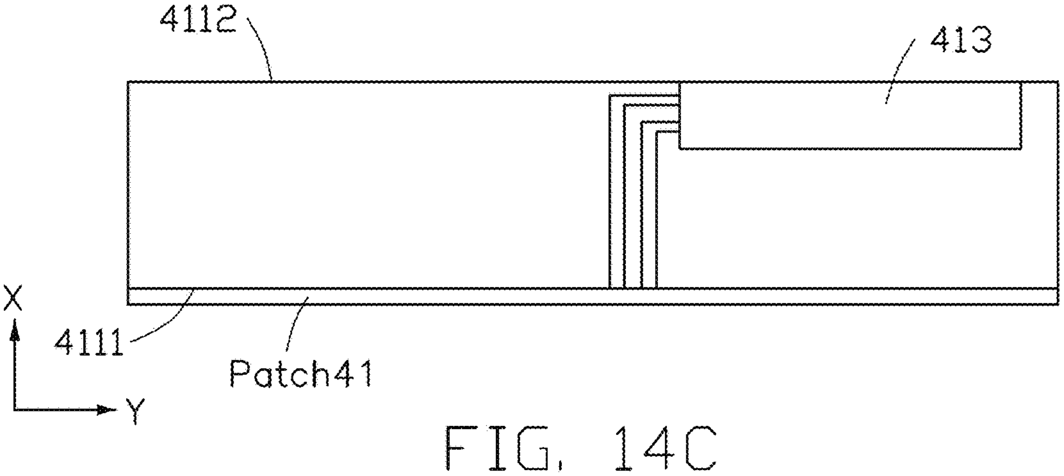

FIG. 14A to FIG. 14C, in another embodiment of the present disclosure, show that the microminiaturized antenna feed module 400 includes the first coupled feed portion Patch 41 and the second coupled feed portion Patch 42. The first coupled feed portion Patch 41 and the second coupled feed portion Patch 42 may be divided by a slot 4122 in a single metal piece. For instance, as shown in FIG. 14A, the slot 4122 is substantially L-shaped. In the embodiment, one of the coupled feed portions (such as the first coupled feed portion Patch 41) is substantially L-shaped, another coupled feed portion (such as the second coupled feed portion Patch 42) is substantially rectangular. The first coupled feed portion Patch 41 and the second coupled feed portion Patch 42 respectively have signal feed points 41211, 41212 for feeding electrical signals for the coupled feed portions. As shown in FIGS. 14A to 14C, the first coupled feed portion Patch 41 and the second coupled feed portion Patch 42 are arranged on the first surface 4111 of the substrate 411, that is, the first coupled feed portion Patch 41 and the second coupled feed portion Patch 42 are coplanar but not overlapped, these can be connected to the second surface 4112 of the substrate 411 through the through holes or vias.

Referring to FIGS. 14A to 14C, projections of the first coupled feed portion Patch 41 and the second coupled feed portion Patch 42 along a first direction are not overlapped, and are coplanar on a plane formed by a second direction and a third direction. The first direction may be a direction of the first coupled feed portion Patch 41 and the second coupled feed portion Patch 42 facing the second surface 4112 of the substrate 411, or a direction along a thickness of the substrate 411, which may be an X-axis direction, as shown in FIG. 14C. The second direction may be an extending direction along or parallel to the first surface 4111 of the substrate 411, or a length direction of the first surface 4111 of the substrate 411, which may be a Y-axis direction, as shown in FIGS. 14A to 14C. The first direction is substantially perpendicular to the second direction. The third direction may be an extending direction along or parallel to the first surface 4111 of the substrate 411, or a width direction of the first surface 4111 of the substrate 411, which may be a Z-axis direction, as shown in FIGS. 14A to 14B. The third direction is substantially perpendicular to the first direction and the second direction.

The embodiment of the present disclosure does not limit the specific shape and structure of the coupled feed portions Patch 41, Patch 42.

The first coupled feed portion Patch 41 and the second coupled feed portion Patch 42 are coplanar and spaced apart from each other. Areas ratios of the first coupled feed portion Patch 41 and the second coupled feed portion Patch 42 are different and adjustable according to bandwidth requirement, so as to provide greater bandwidth coupling effect. For example, the first coupled feed portion Patch 41 and the second coupled feed portion Patch 42 are close to, but not contacting, the radiator (the radiator can be a metal frame of the electronic device, any conductor, such as iron, copper foil on a PCB soft board, a conductor in a laser direct structuring (LDS) process, etc., which are not specifically limited here), and configured to couple electrical signals to the radiator to transmit and receive wireless signals through the radiator. Obviously, the greater the area of the coupled feed portion, the greater will be the frequency width, so as to provide wide frequency coupling effect through greater areas. In the embodiment of the present disclosure, an area of the first coupled feed portion Patch 41 is greater than an area of the second coupled feed portion Patch 42. A projection area of the first coupled feed portion Patch 41 on the substrate 411 occupies over 40% of the area of the substrate 411, a projection area of the second coupled feed portion Patch 42 on the substrate 411 occupies less than 10% of the area of the substrate 411.

In the embodiment of the present disclosure, the active circuit 413 is disposed on the second surface 4112 of the substrate 411. The second surface 4112 of the substrate 411 is provided with connection lines (not shown). The connection lines are connected to the active circuit 413. The active circuit 413 may include a switch, and/or other adjusting element that can change impedances (not shown in the figures). The active circuit 413 can be electrically connected to the first coupled feed portion Patch 41 and the second coupled feed portion Patch 42 and the connector 414 through the connection lines. For example, in one of the embodiments, the substrate 411 is further provided with a via. An example of the via is the lines connecting the active circuit 413 and the first coupled feed portion Patch 41 as shown in FIG. 14C. The first coupled feed portion Patch 41 and the second coupled feed portion Patch 42 can be connected to the second surface 4112 of the substrate 411 through the via, and connected to the active circuit 413 through the connection lines on the second surface 4112.

FIG. 12 shows the connector 414 arranged on the second surface 4112 of the substrate 411, the connector 414 is arranged on the surface where the active circuit 413 is located. In some embodiments, the connector 414 and the active circuit 413 may be spaced apart and electrically connected to each other. In the embodiment of the present disclosure, the specific positional relationship and connection relationship between the connector 414 and the active circuit 413 are not limited. For example, in one of the embodiments, the active circuit 413 can be disposed in the connector 414, the connector 414 can be used to accommodate the active circuit 413. The connector 414 is electrically connected to the active circuit 413 and connected to a transmission line, and so realize signal sending or receiving.

It can be understood that the transmission line can be, but is not limited to, a coaxial cable, a flexible printed circuit board (FPCB) or other transmission line.

Embodiment of Second Arrangement

Figure 15A:
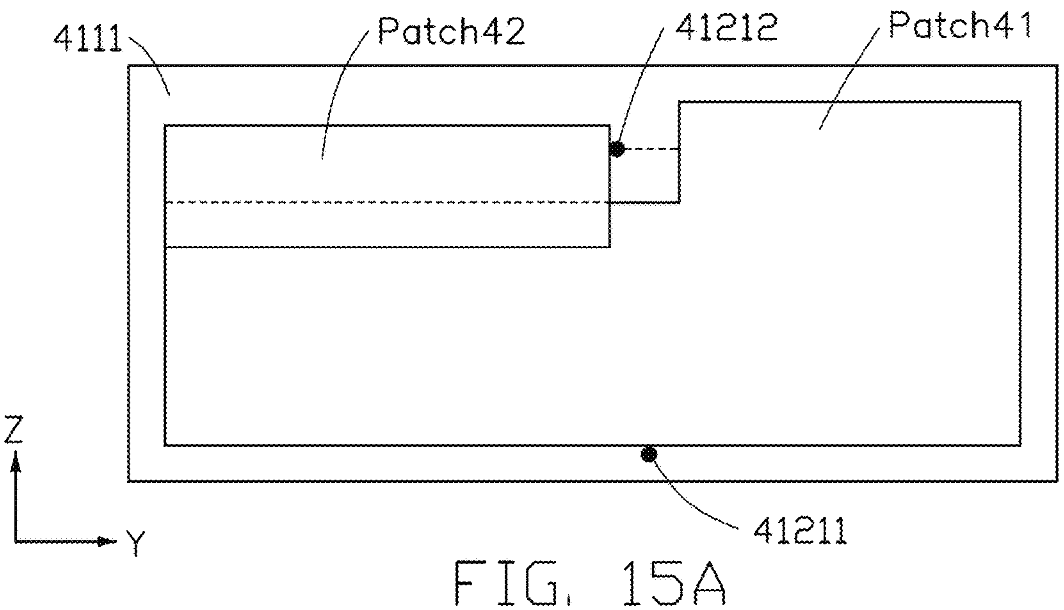
FIGS. 15A to 15C are schematic diagrams of the microminiaturized antenna feed module according to second embodiment of second arrangement of the present disclosure.
Figure 15B:
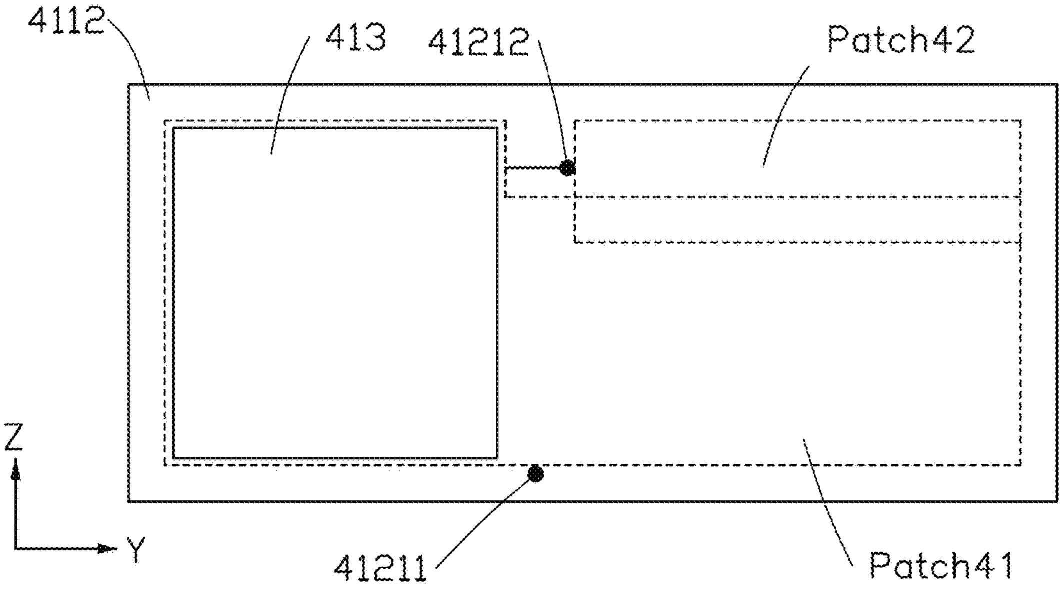
Figure 15C:
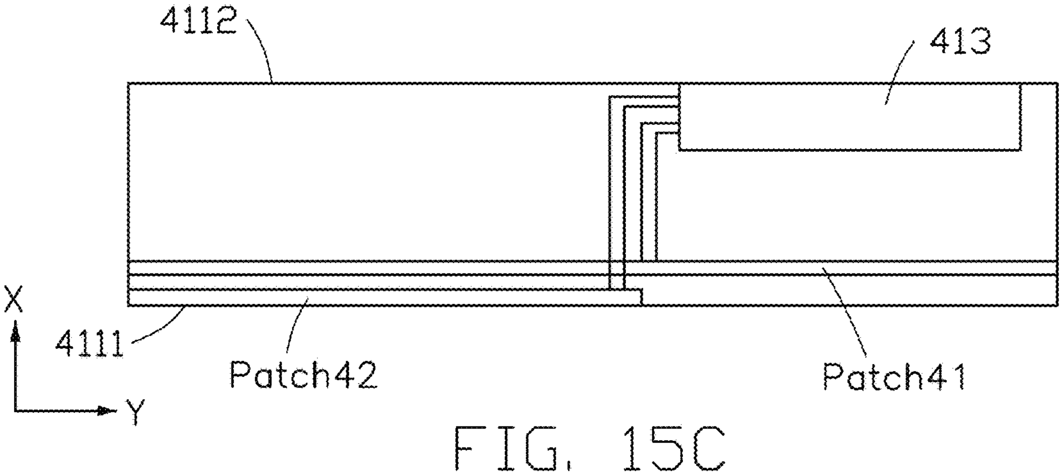

FIGS. 15A to 15C, in another embodiment of the present disclosure, show that the microminiaturized antenna feed module 400 includes the first coupled feed portion Patch 41 and the second coupled feed portion Patch 42. The first coupled feed portion Patch 41 and the second coupled feed portion Patch 42 are not coplanar on the plane orthogonal to the second direction (such as a Y-axis direction as shown in FIG. 15C), projections of the first coupled feed portion Patch 41 and the second coupled feed portion Patch 42 along the first direction (such as the X-axis direction shown in FIG. 15C) are partially overlapped. Description of the first direction and the second direction may be the same as those for FIG. 14C. Specifically, the second coupled feed portion Patch 42 is arranged on the first surface 4111 of the substrate 411, the first coupled feed portion Patch 41 is arranged internally under the first surface 4111, and the first coupled feed portion Patch 41 is close to the first surface 4111. In an embodiment, the first coupled feed portion Patch 41 is not arranged on the first surface 4111 and disposed inside the substrate. In an embodiment, the substrate 411 may be made of a multi-layer substrate, the second coupled feed portion Patch 42 is arranged on a surface (such as the first surface 4111) of the substrate 411, the first coupled feed portion Patch 41 is arranged on an interior portion of the substrate 411. The first coupled feed portion Patch 41 and the second coupled feed portion Patch 42 can be connected to the second surface 4112 of the substrate 411 through the through holes or vias. In the embodiment, one of the coupled feed portions (such as the first coupled feed portion Patch 41) is substantially L-shaped, another coupled feed portion (such as the second coupled feed portion Patch 42) is substantially rectangular. The first coupled feed portion Patch 41 and the second coupled feed portion Patch 42 respectively have corresponding signal feed points 41211, 41212 for feeding electrical signals to the coupled feed portions.

The embodiment of the present disclosure does not limit the specific shapes and structures of the coupled feed portions Patch 41, Patch 42.

The first coupled feed portion Patch 41 and the second coupled feed portion Patch 42 are not coplanar and are partially overlapped along the first direction. Area ratios of the first coupled feed portion Patch 41 and the second coupled feed portion Patch 42 are different and adjustable according to bandwidth requirement. For example, the first coupled feed portion Patch 41 and the second coupled feed portion Patch 42 are close to the radiator, and configured to couple electrical signals to the radiator to transmit and receive wireless signals. In the embodiment of the present disclosure, an area of the first coupled feed portion Patch 41 is greater than an area of the second coupled feed portion Patch 42. A projection area of the first coupled feed portion Patch 41 on the substrate 411 occupies over 40% of the area of the substrate 411, and a projection area of the second coupled feed portion Patch 42 on the substrate 411 occupies less than 10% of the area of the substrate 411.

A structure and a function of the active circuit 413, the connections between the active circuit 413 and the connector 414, and the arrangements of the connector 414 are as previously described.

Embodiment of Third Arrangement

Figure 16A:
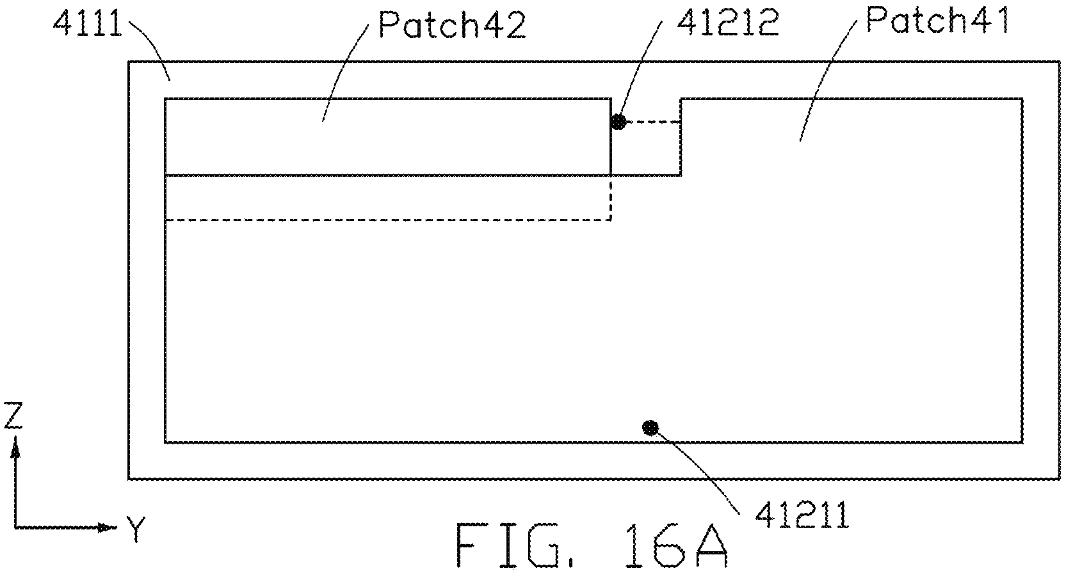
FIGS. 16A to 16C are schematic diagrams of the microminiaturized antenna feed module according to second embodiment of third arrangement of the present disclosure.
Figure 16B:
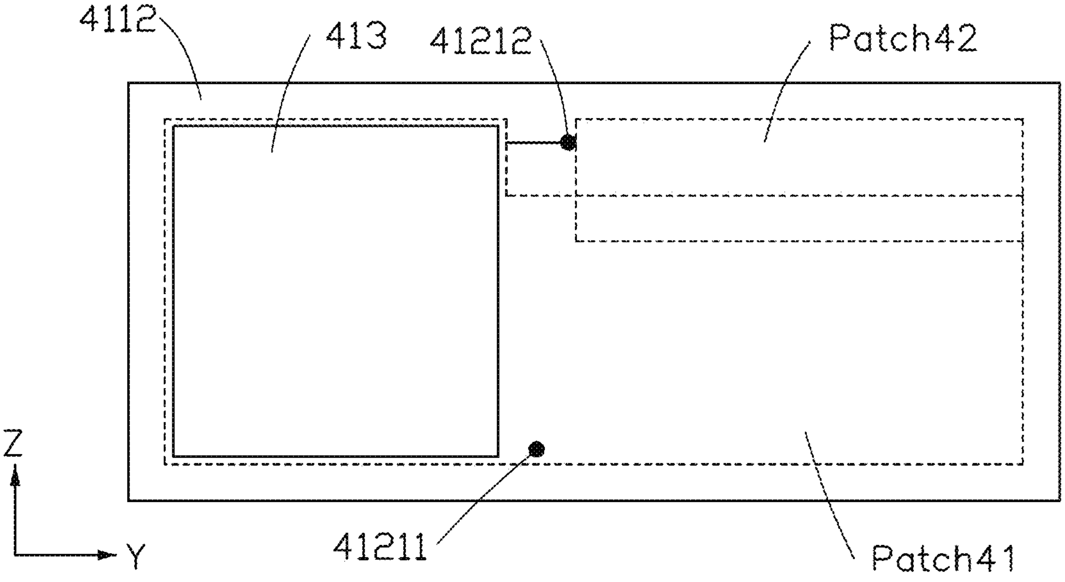
Figure 16C:
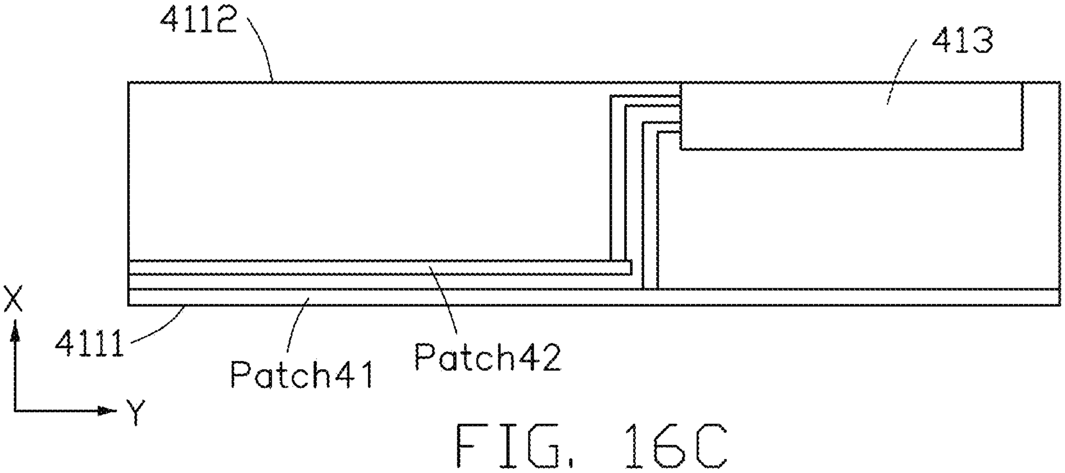

FIGS. 16A to 16C show another embodiment of the present disclosure, the microminiaturized antenna feed module 400 includes the first coupled feed portion Patch 41 and the second coupled feed portion Patch 42. The first coupled feed portion Patch 41 and the second coupled feed portion Patch 42 are not coplanar on a plane orthogonal to the second direction (such as a Y-axis direction as shown in FIG. 16C), projections of the first coupled feed portion Patch 41 and the second coupled feed portion Patch 42 along the first direction (such as an X-axis direction as shown in FIG. 16C) are partially overlapped. The first direction and the second direction are as shown in FIG. 14C. Specifically, the first coupled feed portion Patch 41 is arranged on the first surface 4111 of the substrate 411, the second coupled feed portion Patch 42 is arranged internally under the first surface 4111, and the second coupled feed portion Patch 42 is close to the first surface 4111. In an embodiment, the substrate 411 may be a multi-layer substrate, the first coupled feed portion Patch 41 is arranged on a surface (such as the first surface 4111) of the substrate 411, the second coupled feed portion Patch 42 is arranged on an interior portions of the substrate 411. The first coupled feed portion Patch 41 and the second coupled feed portion Patch 42 can be connected to the second surface 4112 of the substrate 411 through the through holes and vias. In the embodiment, one of the coupled feed portions (such as the first coupled feed portion Patch 41) is substantially L-shaped, another coupled feed portion (such as the second coupled feed portion Patch 42) is substantially rectangular. The first coupled feed portion Patch 41 and the second coupled feed portion Patch 42 respectively have correspondingly signal feed points 41211, 41212 for feeding electrical signals to the coupled feed portions.

The embodiment of the present disclosure does not limit the specific shapes and structures of the coupled feed portions Patch 41, Patch 42.

The first coupled feed portion Patch 41 and the second coupled feed portion Patch 42 are not coplanar and are partially overlapped along the first direction. Area and ratios of the first coupled feed portion Patch 41 and the second coupled feed portion Patch 42 are different and adjustable according to bandwidth requirement, so as to provide greater bandwidth coupling effect with great areas. For example, the first coupled feed portion Patch 41 and the second coupled feed portion Patch 42 are close to the radiator (the radiator can be the metal frame of the electronic device, any conductor, such as iron, copper foil on a PCB soft board, a conductor in a laser direct structuring (LDS) process, etc., which are not specifically limited here), and configured to couple electrical signals to the radiator to transmit and receive wireless signals through the radiator. Obviously, the greater the area of the coupled feed portion, the greater frequency width will be, so as to provide wide frequency coupling effect through greater areas. In the embodiment of the present disclosure, an area of the first coupled feed portion Patch 41 is greater than an area of the second coupled feed portion Patch 42. A projection area of the first coupled feed portion Patch 41 on the substrate 411 occupies over 40% of the area of the substrate 411, a projection area of the second coupled feed portion Patch 42 on the substrate 411 occupies less than 10% of the area of the substrate 411.

The structure and a function of the active circuit 413, a connection between the active circuit 413 and the connector 414, and an arrangement of the connector 414 are as previously described.

Figure 17:
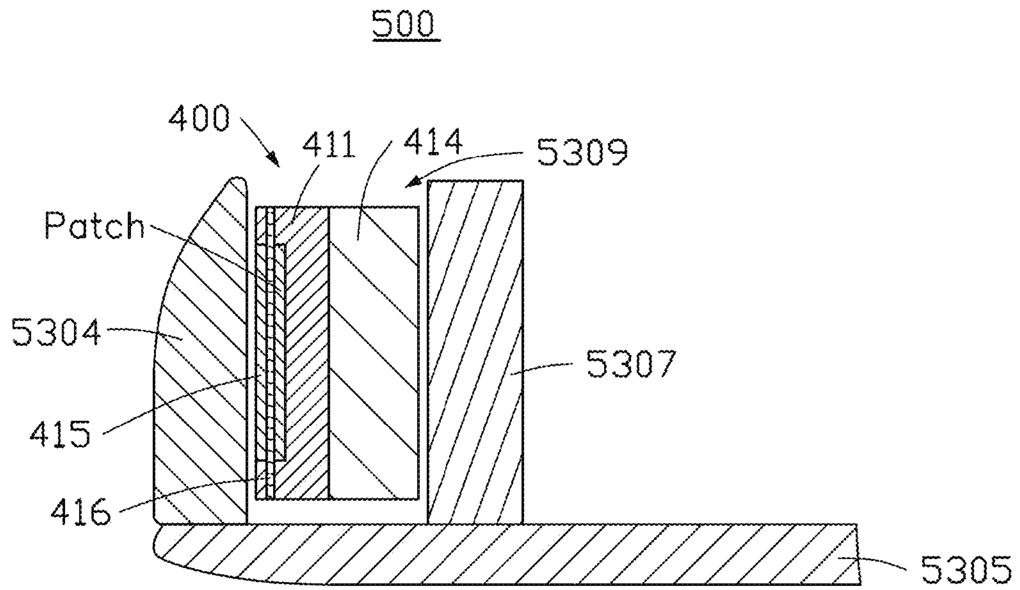
FIG. 17 is a schematic diagram of the microminiaturized antenna feed module and a metal frame of an electronic device, of the second embodiment of the present disclosure.
Figure 18:
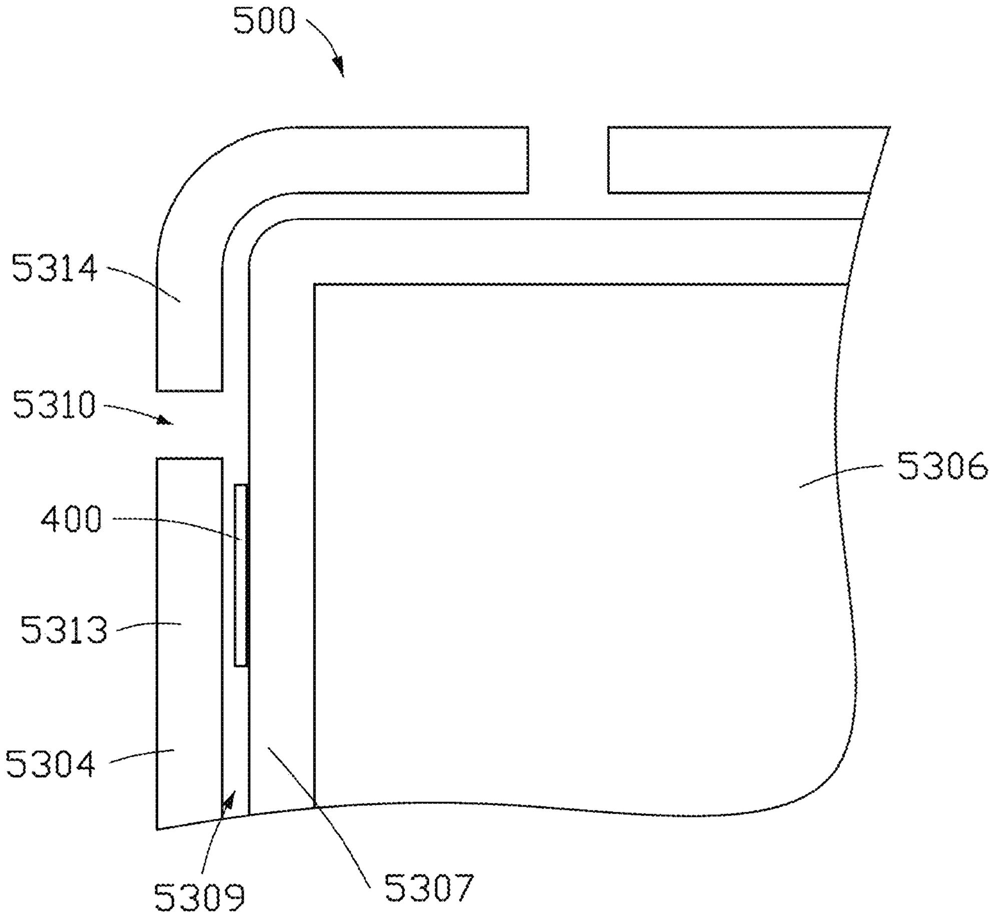
FIG. 18 is a schematic diagram of the microminiaturized antenna feed module applied to the electronic device of the second embodiment of the present disclosure.

Referring to FIGS. 17 and 18, when the microminiaturized antenna feed module 400 is used, the microminiaturized antenna feed module 400 can be arranged on one side of a metal frame 5304 of an electronic device 500. One side of the microminiaturized antenna feed module 400 provided with the first coupled feed portion Patch 41, the second coupled feed portion Patch 42, and the third coupled feed portion Patch 43 faces the metal frame 5304. Therefore, signals can be transmitted and/or received by the metal frame 5304 through the coupling of the first coupled feed portion Patch 41, the second coupled feed portion Patch 42, and the third coupled feed portion Patch 43 and the metal frame 5304. In addition, the microminiaturized antenna feed module 400 can also use the switch of the active circuit 413 to switch between multiple radiation modes, thereby realizing multiple broadband operations.

For example, in one of the embodiments, when the microminiaturized antenna feed module 400 includes three coupled feed portions Patch 41, Patch 42, Patch 43, and the active circuit 413. The three coupled feed portions Patch 41, Patch 42, Patch 43 are arranged at intervals, and are spaced apart from the metal frame 5304, to receive 4G/5G middle frequency signals (frequency range of 1.7 GHz-2.2 GHz), high frequency signals (frequency range of 2.3 GHz-2.7 GHz), ultra high band (UHB) signals (frequency range of 3.3 GHz-5 GHz), GPS signals (frequency range of 1.5 GHz-1.6 GHz), WI-FI signals (frequency range of 2.4 GHz, 5 GHz), 5G-Sub 6 signals (frequency range of 0.45 GHz-6 GHz), and 5G-Sub 7 signals (frequency range of 5.925 GHz-7.125 GHz), Wi-Fi 6E signals (frequency range of 5.925 GHz-7.125 GHz).

In the embodiment of the present disclosure, the range of frequencies of the microminiaturized antenna feed module 400 is not limited. For example, the shape, length, width and other parameters of the microminiaturized antenna feed module 400 can be adjusted to achieve the required frequency. The shape, length, width, area and other parameters of the coupled feed portion Patch can also be adjusted according to the required frequency.

In the embodiment of the present disclosure, the metal frame 5304 may further be any conductor, such as iron, copper foil on a PCB soft board, a conductor in a laser direct structuring (LDS) process, etc., which are not specifically limited here. In one of the embodiments, the metal frame 5304 is a metal frame of an electronic device. The metal frame 5304 is disposed on a backplane 5305 and is spaced apart from an electronic component, such as a middle frame 5307. The microminiaturized antenna feed module 400 is arranged between the metal frame 5304 and the middle frame 5307. The middle frame 5307 is disposed on the backplane 5305.

In the embodiment of the present disclosure, the coupled feed portion Patch and the metal frame 5304 are spaced apart. For example, the coupled feed portion Patch and the metal frame 5304 are arranged in parallel. For another example, the coupled feed portion Patch and the metal frame 5304 are spaced apart, but not parallel to each other. In other embodiments, the coupled feed portion Patch may not be connected to the metal frame 5304. For another example, in another embodiment, the coupled feed portion Patch and the metal frame 5304 are spaced apart, and there is no electrical connection between the coupled feed portion Patch and the metal frame 5304.

In the embodiments of the present disclosure, the specific structure of the metal frame 5304, and/or its connection relationship with other components are not limited. For example, one end of the metal frame 5304 may be connected to ground (the metal frame 5304 is grounded), or not connected to ground. For another example, the metal frame 5304 may be provided with or without gaps breakpoints, or slots.

FIGS. 17 and 18 show that in an embodiment of the present disclosure, the microminiaturized antenna feed module 400 can be applied to the electronic device 500 to transmit and receive radio waves to transmit and exchange wireless signals. The electronic device 500 may be a handheld communication device (such as a mobile phone), a foldable phone, a smart wearable device (such as a watch, earphone, etc.), a tablet computer, a personal digital assistant (personal digital assistant, PDA), which is not specifically limited here.

The electronic device 500 may adopt one or more of the following communication technologies: BLUETOOTH (BT) communication technology, global positioning system (GPS) communication technology, WI-FI communication technology, global system for mobile communications (GSM) communication technology, wideband code division multiple access (WCDMA) communication technology, long term evolution (LTE) communication technology, 5G communication technology, SUB-6G communication technology, and other future communication technologies.

In the embodiment of the present disclosure, the electronic device 500 is a mobile phone as an example for description.

FIGS. 17 and 18 show, in one embodiment, that the electronic device 500 includes the metal frame 5304, a backplane 5305, a ground plane 5306, and the middle frame 5307. The metal frame 5304 is made of metal or other conductive materials. The backplane 5305 may be made of metal or other conductive materials. The metal frame 5304 is disposed on the edge of the backplane 5305 and forms an accommodating space 5308 together with the backplane 5305. An opening (not shown in the figure) is provided on the side of the metal frame 5304 opposite to the backplane 5305 for accommodating a display unit (not shown).

The display unit has a display plane, and the display plane is exposed at the opening. It can be understood that the display unit can be combined with a touch sensor to form a touch screen. The touch sensor can also be called touch panel or touch sensitive panel.

In the embodiment of the present disclosure, the display unit has a high screen-to-body ratio. That is, the area of the display plane of the display unit is greater than 70% of the frontal area of the electronic device, and even a frontal full screen can be achieved. Specifically, in the embodiment of the present disclosure, the full screen means that except for the necessary slots opened on the electronic device 500, the left, right, and lower sides of the display unit can be seamlessly connected to the metal frame 5304.

The ground plane 5306 may be made of metal or other conductive materials. The ground plane 5306 can be disposed in the accommodating space enclosed by the metal frame 5304 and the backplane 5305, and is connected to the backplane 5305.

The middle frame 5307 is made of metal or other conductive materials. The shape and area of the middle frame 5307 may be smaller or larger than the ground plane 5306. The middle frame 5307 is stacked on the ground plane 5306. In this embodiment, the middle frame 5307 is a metal sheet disposed between the display unit and the ground plane 5306. The middle frame 5307 is used to support the display unit, provide electromagnetic shielding, and improve the mechanical strength of the electronic device 500.

In the embodiment, the metal frame 5304, the backplane 5305, the ground plane 5306, and the middle frame 5307 may form an integrally formed metal frame. The backplane 305, the ground plane 5306, and the middle frame 5307 are made of metal with large surface area, so they can jointly form the system ground plane (not shown in the figure) of the electronic device 500.

The middle frame 5307 and the metal frame 5304 are spaced apart, and a slit 5309 is formed between the middle frame 5307 and the metal frame 5304.

In other embodiment, the electronic device 500 may also include one or more of the following electronic components, such as a processor, a circuit board, a memory, an input and output circuit, an audio component (such as a microphone and a speaker), and a multimedia component (such as a front camera and/or a rear camera), sensor components (such as proximity sensors, distance sensors, ambient light sensors, acceleration sensors, gyroscopes, magnetic sensors, pressure sensors, and/or temperature sensors), which will not be repeated here.

When the microminiaturized antenna feed module 400 is applied to the electronic device 500, the microminiaturized antenna feed module 400 can be arranged in the slit 5309 and arranged substantially perpendicular to the plane where the ground plane 5306 is located. A part of the metal frame 5304 constitutes the radiator, and a gap 5310 is defined on the metal frame 5304. The gap 5310 separates the metal frame 5304 to divide the metal frame 5304 into a first part 5313 and a second part 5314 which are arranged at intervals. The first part 5313 and the second part 5314 are able to radiate wireless signals. The second part 5314 may be electrically connected to the system ground plane, such as the ground plane 5306.

The gap 5310 may be connected to the slit 5309 and be filled with insulating materials, such as plastic, rubber, glass, wood, ceramics, not being limited to this.

When the microminiaturized antenna feed module 400 is disposed in the slit 5309, the first coupled feed portion Patch 41, the second coupled feed portion Patch 42, and the third coupled feed portion Patch 43 on the microminiaturized antenna feed module 400 face, but are spaced apart from, the first part 5313. The connector 414 is arranged on the other surface of the substrate 411, that is, it is arranged away from the first part 5313. One end of the connector 414 is electrically connected to the middle frame 5307, and the other end is electrically connected to the substrate 411.

In another embodiment, the microminiaturized antenna feed module 400 may be disposed correspondingly to the first part 5313, the gap 5310, or the second part 5314. The first coupled feed portion Patch 41 may be disposed correspondingly to the first part 5313, the second coupled feed portion Patch 42 and/or the third coupled feed portion Patch 43 may be disposed correspondingly to the second part 5314. Thereby the microminiaturized antenna feed module 400 may feed electrical signals to the first part 5313 and the second part 5314.

Figure 19:
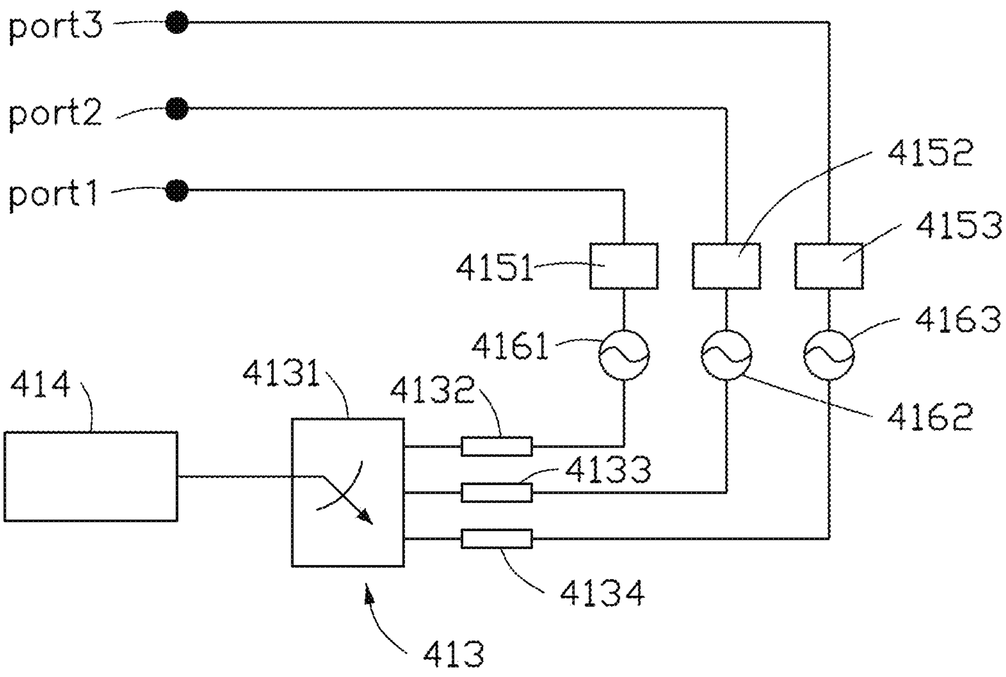
FIG. 19 is a schematic diagram of the circuit connections of an active circuit of the microminiaturized antenna feed module shown in FIG. 8.

FIG. 19 shows that each of the first coupled feed portion Patch 41, the second coupled feed portion Patch 42, and the third coupled feed portion Patch 43 includes a corresponding signal feed point (for example, a first signal feed point port1, a second signal feed point port2, and a third signal feed point port3, and the aforementioned signal feed points 41211, 41212, 41213). Each signal feed point is electrically connected to the feed source through the matching unit. For example, the signal feed point port1 of the first radiation branch Patch 41 is electrically connected to the feeding source 4161 through the first matching unit 4151. The signal feed point port2 of the second radiation branch Patch 42 is electrically connected to the feeding source 4162 through the second matching unit 4152. The signal feed point port3 of the third radiation branch Patch 43 is electrically connected to the feeding source 4163 through the third matching unit 4153.

The active circuit 413 in the microminiaturized antenna feed module 400 is spaced apart from the connector 414. As shown in FIG. 19, the active circuit 413 includes a switch 4131 and adjustable elements 4132, 4133, 4134. One end of the switch 4131 is electrically connected to the connector 414, and the other end of the switch 4131 is electrically connected to a feed source through adjustable elements 4132, 4133, 4134. For example, the switch 4131 is electrically connected to the first feeding source 4161 through the first adjustable element 4132, the switch 4131 is electrically connected to the second feeding source 4162 through the second adjustable element 4133, and the switch 4131 is electrically connected to the third feeding source 4163 through the third adjustable element 4134. That is, the matching circuit includes at least a first matching unit 4151, a second matching unit 4152, and a third matching unit 4153.

The first coupled feed portion Patch 41, the second coupled feed portion Patch 42, and the third coupled feed portion Patch 43 are coupled to the first part 5313 to resonate for various radiation modes. The coupling state between the coupled feed portions can be controlled, and independent modes with tunability and good antenna efficiency can be generated through coupling. The switch 4131 in the active circuit 413 can switch between multiple modes, and use multiple adjustable elements (for example, adjustable elements 4132, 4133, 4134) to achieve multiple frequency bands.

The switch 4131 is a mid-high frequency/UHB and NR/Wi-Fi 2.4Q WI-FI 5G and LAA switch, used to switch in mid-high frequency/UHB and NR/Wi-Fi 2.4Q Wi-Fi 5G and LAA Frequency bands.

The microminiaturized antenna feed module 400 can be applied to the electronic device 500, to increase the antenna efficiency bandwidth and have the best antenna efficiency, and the switching of the switch 4131 can effectively improve the antenna frequency coverage. In one embodiment, the applicable working frequency range of the microminiaturized antenna feed module 400 can cover the middle frequency of 1.71 GHz to 2.17 GHz, the high frequency of 2.3 GHz-2.69 GHz, UHF 3.4 GHz to 3.8 GHz, Wi-Fi 2.4Q WI-FI 5G and LAA, and can support 5G Sub 6 N77/N78/N79, 5G Sub 7, and WI-FI 6E frequency bands.

The microminiaturized antenna feed module 400 can set each of the coupled feed portions Patch 41, Patch 42, Patch 43 as an independent sheet body, and set signal feed points at appropriate positions of the coupled feed portions Patch 41, Patch 42, Patch 43, and the radiator (or the metal frame of the electronic device 500, for example, the first part 5313) is used as a metal radiator, the radiator and the microminiaturized antenna feed module 400 couple the energy to resonate in the slit 5309, to cover modes of middle, high frequency, UHF, 5G Sub 6 N77, 5G Sub6 N78, 5G Sub 6 N79, WI-FI 2.4Q Wi-Fi 5Q 5G Sub 7, WI-FI 6E frequency bands, so as to greatly increase its bandwidth and antenna efficiency, and can also cover the world's commonly used 5G communication frequency bands and Carrier Aggregation (CA) supporting LTE-A (short for LTE-Advanced, which is the subsequent evolution of LTE technology).

Figure 20:
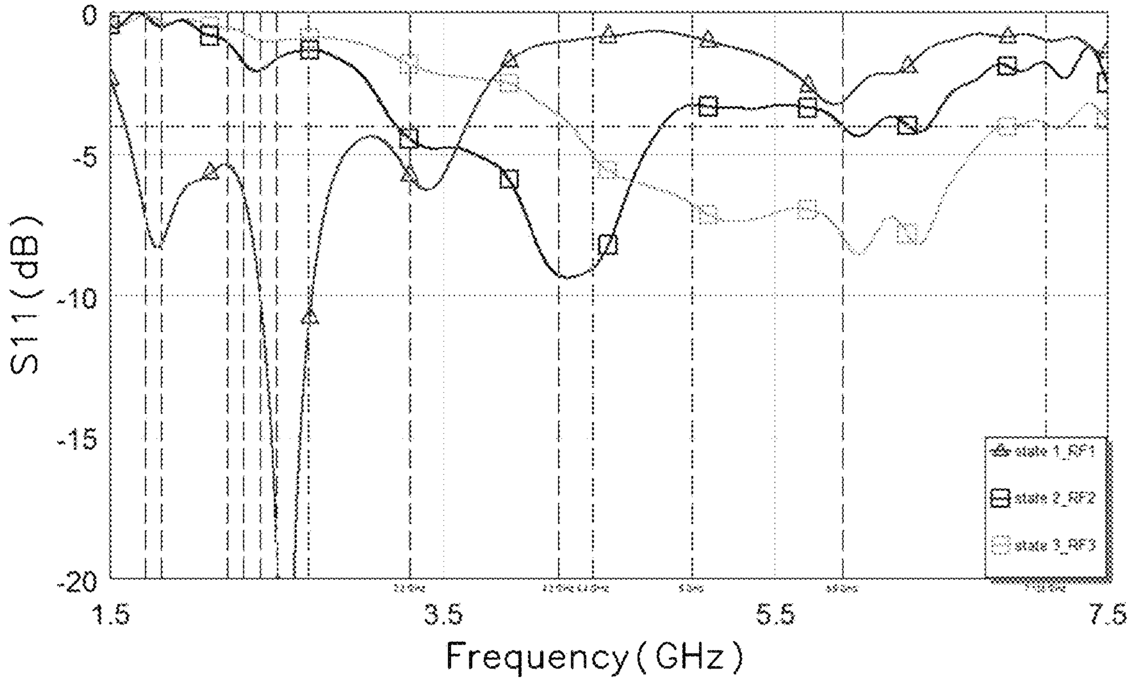
FIG. 20 shows graphs of S parameters (scattering parameters) of the microminiaturized antenna feed module shown in FIGS. 13A and 13B.

FIG. 20 shows a graph of S parameters (scattering parameters) when the microminiaturized antenna feed module 400 uses each of the coupled feed portions Patch 41, Patch 42, Patch 43 coupling to the metal frame 5304 for radiating wireless signals. FIG. 20 shows a graph of S parameters when the microminiaturized antenna feed module 400 uses the first coupled feed portion Patch 41, the second coupled feed portion Patch 42, and the third coupled feed portion Patch 43 as shown in FIGS. 13A and 13B coupling to the metal frame 5304 for radiating wireless signals.

The switch 4131 switches to different signal feed points, the frequency mode can be controlled to cover the middle frequency of 1.71 GHz-2.17 GHz, the high frequency of 2.3 GHz-2.69 GHz, UHF 3.4 GHz-3.8 GHz, GPS, WI-FI 2.4Q WI-FI 5G and LAA frequency bands, and can support 5G Sub 6 N77/N78/N79, 5G Sub 7, WI-FI 6E frequency bands.

Figure 21:
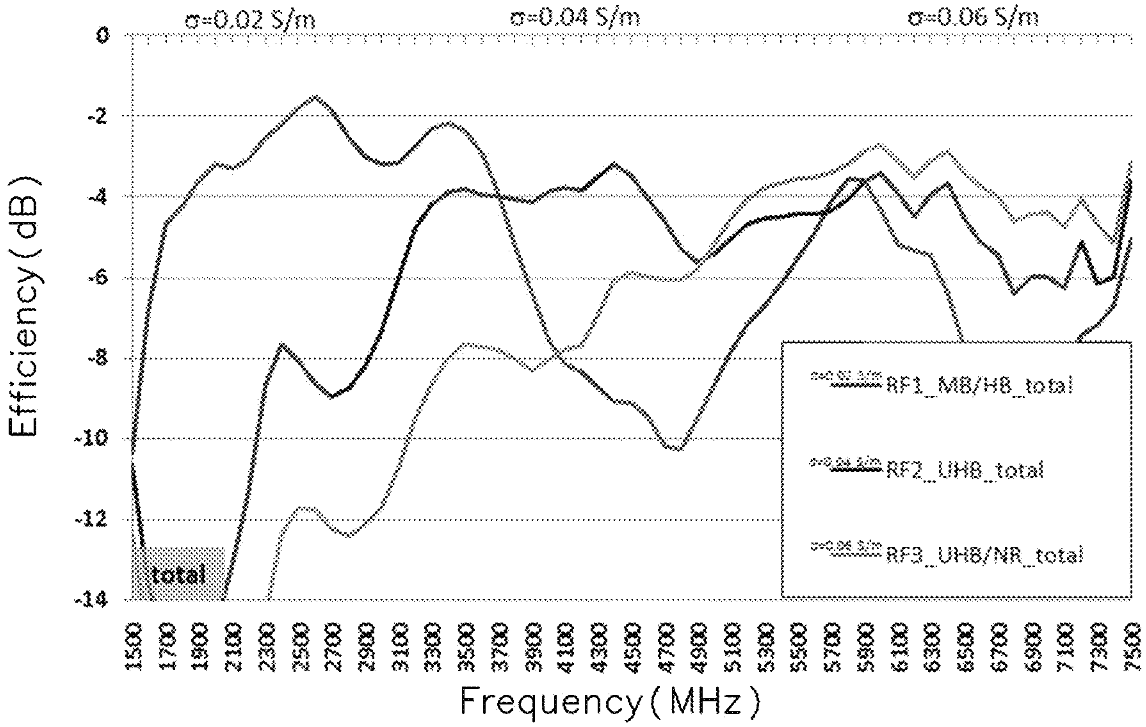
FIG. 21 shows efficiency graphs of the microminiaturized antenna feed module shown in FIGS. 13A and 13B.

FIG. 21 shows an efficiency graph when the microminiaturized antenna feed module 400 uses each of the coupled feed portions Patch 41, Patch 42, Patch 43 coupling to the metal frame 5304 for radiating wireless signals. FIG. 21 shows an efficiency graph when the microminiaturized antenna feed module 400 uses the first coupled feed portion Patch 41, the second coupled feed portion Patch 42, and the third coupled feed portion Patch 43 as shown in FIGS. 13A and 13B, coupling to the metal frame 5304 for radiating wireless signals.

Figure 22A:
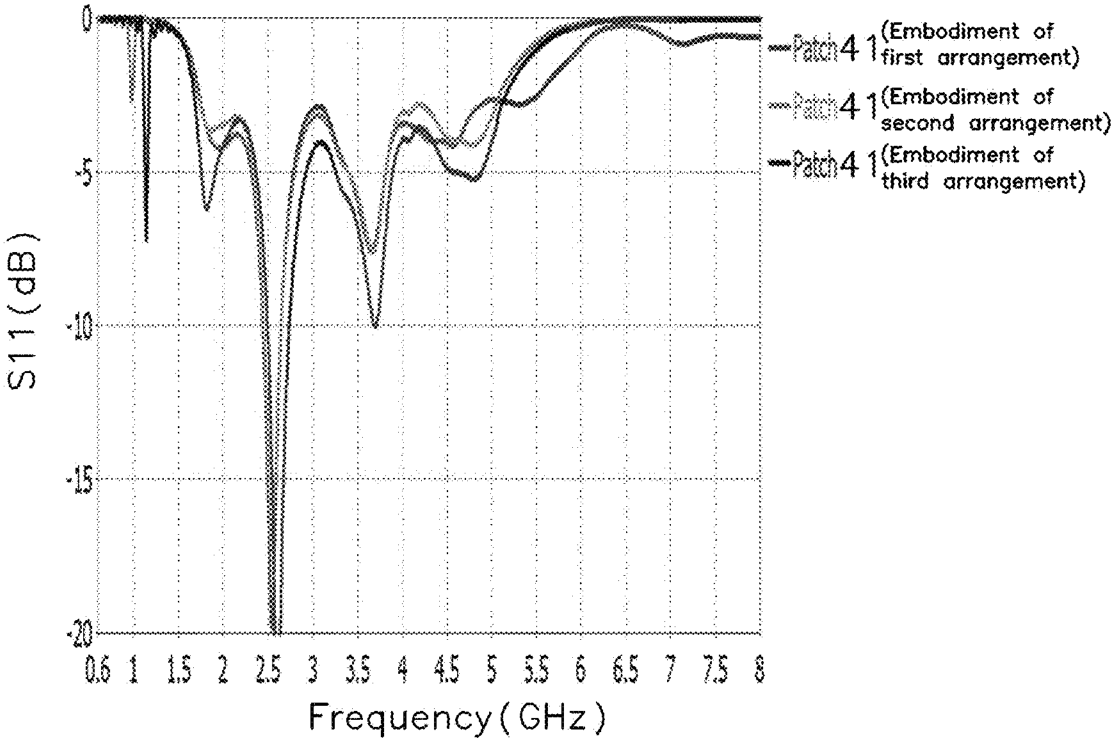
FIGS. 22A and 22B show graphs of S parameters (scattering parameters) of the microminiaturized antenna feed module shown in FIGS. 14A, 15A, and 16A.

FIG. 22A shows a graph of S parameters (scattering parameters) when the microminiaturized antenna feed module 400 uses the first coupled feed portion Patch 41 in the first arrangement embodiment as shown in FIGS. 14A to 14C, in the second arrangement embodiment as shown in FIGS. 15A to 15C, and in the third arrangement embodiment as shown in FIGS. 16A to 16C, coupling to the metal frame 5304 for radiating wireless signals. FIG. 22A shows a graph of S parameters (scattering parameters) when the microminiaturized antenna feed module 400 uses the first coupled feed portion Patch 41 and the second coupled feed portion Patch 42 arranged on the first surface 4111 as shown in FIGS. 14A to 14C; the second coupled feed portion Patch 42 arranged on the first surface 4111, and the first coupled feed portion Patch 41 arranged internally to the first surface 4111 as shown in FIGS. 15A to 15C; the first coupled feed portion Patch 41 arranged on the first surface 4111, and the second coupled feed portion Patch 42 arranged internally to the first surface 4111 as shown in FIGS. 16A to 16C, coupling to the metal frame 5304 for radiating wireless signals.

Figure 22B:
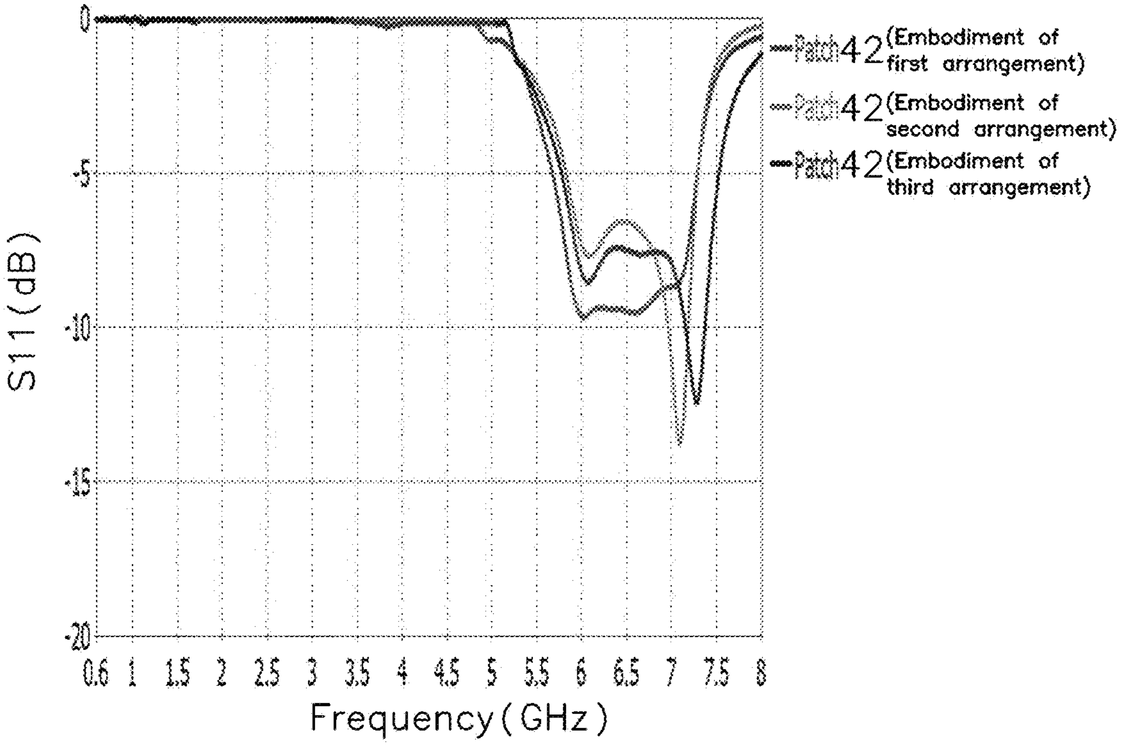

FIG. 22B shows a graph of S parameters (scattering parameters) when the microminiaturized antenna feed module 400 uses the second coupled feed portion Patch 42 in the first arrangement embodiment as shown in FIGS. 14A to 14C, in the second arrangement embodiment as shown in FIGS. 15A to 15C, and in the third arrangement embodiment as shown in FIGS. 16A to 16C, coupling to the metal frame 5304 for radiating wireless signals. FIG. 22B shows a graph of S parameters when the microminiaturized antenna feed module 400 uses the first coupled feed portion Patch 41 and the second coupled feed portion Patch 42 arranged on the first surface 4111 as shown in FIGS. 14A to 14C; the second coupled feed portion Patch 42 arranged on the first surface 4111, and the first coupled feed portion Patch 41 arranged internally to the first surface 4111 as shown in FIGS. 15A to 15C; the first coupled feed portion Patch 41 arranged on the first surface 4111, and the second coupled feed portion Patch 42 arranged internally to the first surface 4111 as shown in FIGS. 16A to 16C, coupling to the metal frame 5304 for radiating wireless signals.

Figure 23A:
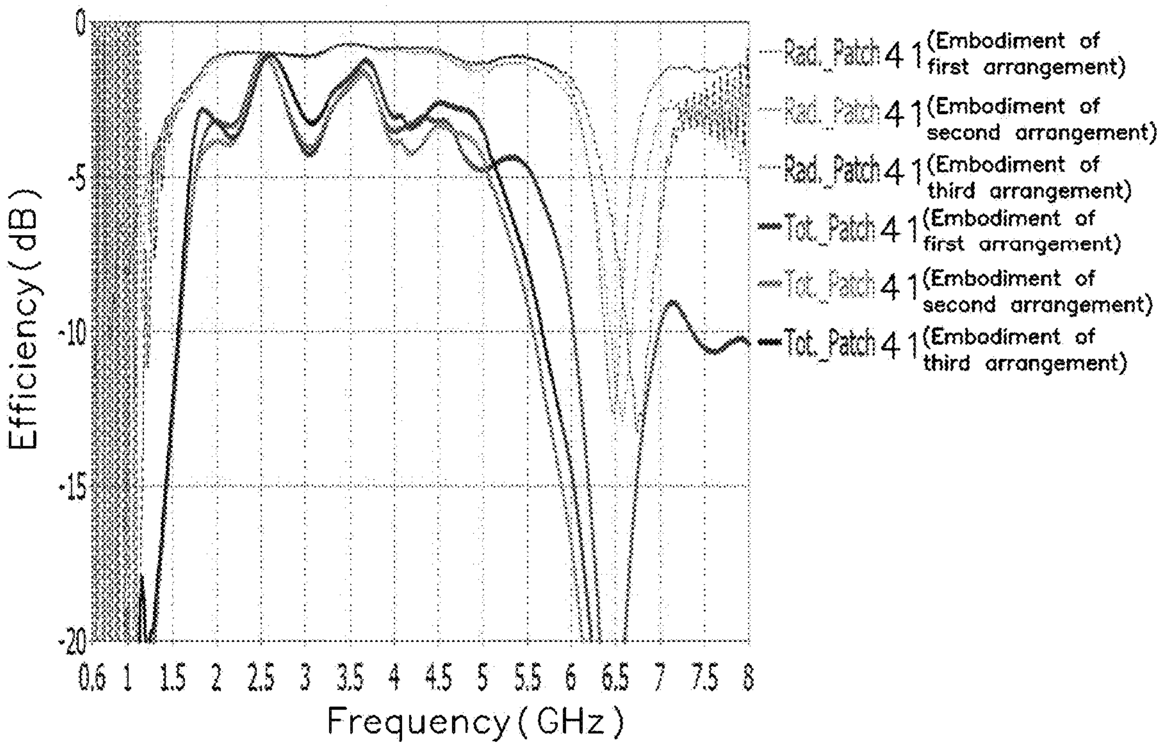
FIGS. 23A and 23B show efficiency graphs of the microminiaturized antenna feed module shown in FIGS. 14A, 15A, and 16A.

FIG. 23A shows efficiency graphs when the microminiaturized antenna feed module 400 uses the uses the first coupled feed portion Patch 41 in the first arrangement embodiment as shown in FIGS. 14A to 14C, and for the second arrangement embodiment as shown in FIGS. 15A to 15C, and for the third arrangement embodiment as shown in FIGS. 16A to 16C, coupling to the metal frame 5304 for radiating wireless signals. FIG. 23A shows the radiation efficiency (Rad. shown in the figure) and total efficiency (Tot. shown in the figure) values when the microminiaturized antenna feed module 400 uses the first coupled feed portion Patch 41 and the second coupled feed portion Patch 42 arranged on the first surface 4111 as shown in FIGS. 14A to 14C; the second coupled feed portion Patch 42 arranged on the first surface 4111, and the first coupled feed portion Patch 41 arranged internally to the first surface 4111 as shown in FIGS. 15A to 15C; the first coupled feed portion Patch 41 arranged on the first surface 4111, and the second coupled feed portion Patch 42 arranged internally to the first surface 4111 as shown in FIGS. 16A to 16C, coupling to the metal frame 5304 for radiating wireless signals.

Figure 23B:
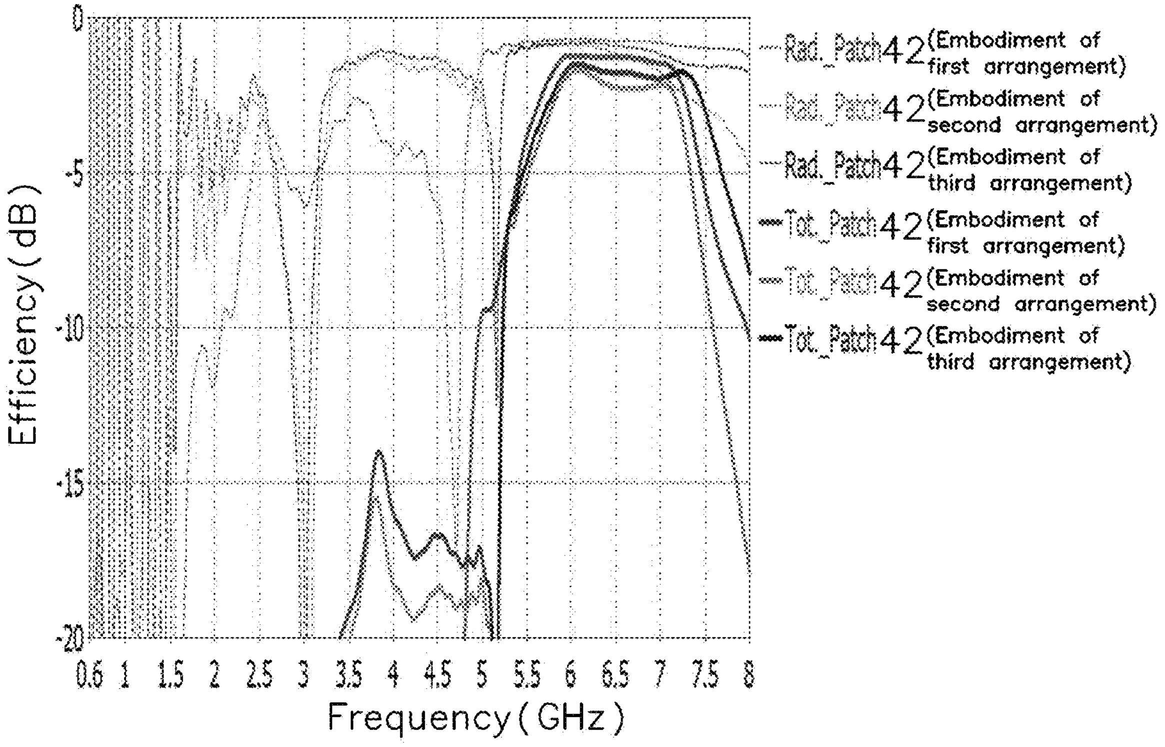

FIG. 23B shows an efficiency graph when the microminiaturized antenna feed module 400 uses the uses the second coupled feed portion Patch 42 in the first arrangement embodiment as shown in FIGS. 14A to 14C, in the second arrangement embodiment as shown in FIGS. 15A to 15C, and in the third arrangement embodiment as shown in FIGS. 16A to 16C, coupling to the metal frame 5304 for radiating wireless signals. FIG. 23B shows the radiation efficiency (Rad. shown in the figure) and total efficiency (Tot. shown in the figure) values when the microminiaturized antenna feed module 400 uses the first coupled feed portion Patch 41 and the second coupled feed portion Patch 42 arranged on the first surface 4111 as shown in FIGS. 14A to 14C; the second coupled feed portion Patch 42 arranged on the first surface 4111, and the first coupled feed portion Patch 41 arranged internally to the first surface 4111 as shown in FIGS. 15A to 15C; the first coupled feed portion Patch 41 arranged on the first surface 4111, and the second coupled feed portion Patch 42 arranged internally to the first surface 4111 as shown in FIGS. 16A to 16C, coupling to the metal frame 5304 for radiating wireless signals.

The microminiaturized antenna feed module 400 sets the switch 4131 and causes the switch 4131 to engage different signal feed points, to control the frequency mode, and cover the middle frequency (1.71 GHz-2.17 GHz), the high frequency (2.3 GHz-2.69 GHz), UHF (3.4 GHz-3.8 GHz), GPS, Wi-Fi 2.4Q Wi-Fi 5Q and can support 5G Sub 6 N77/N78/N79, 5G Sub 7, Wi-Fi 6E frequency bands.

A Third Embodiment

Figure 24:
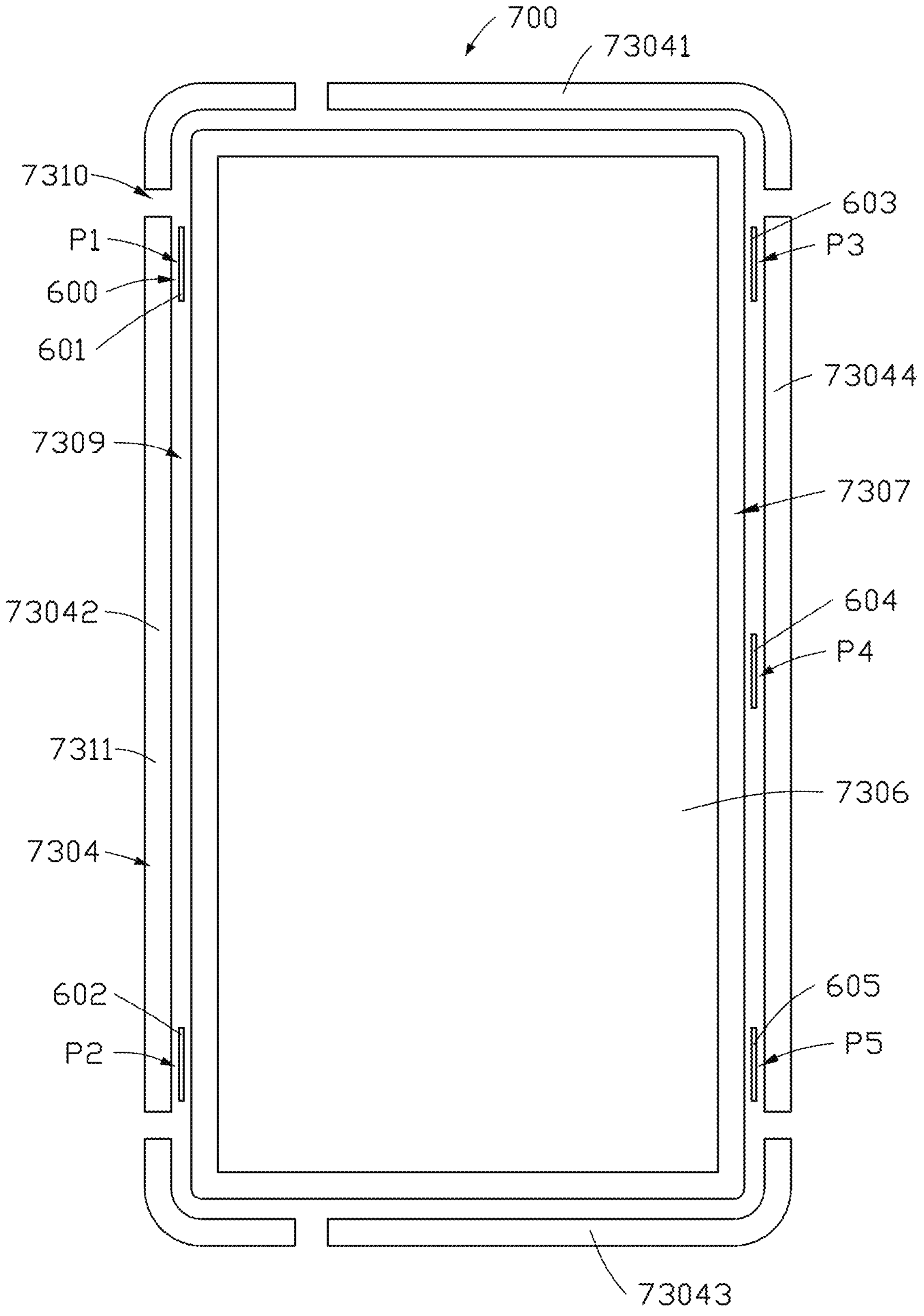
FIG. 24 is a schematic diagram of an electronic device of a third embodiment of the present disclosure.

FIG. 24 shows an electronic device 700 having at least one antenna feed module 600 of a third embodiment of the present disclosure. The at least one antenna feed module 600 may be the antenna coupled feed module 100 of the first embodiment or the microminiaturized antenna feed module 400 of the second embodiment. When the electronic device 700 includes a plurality of antenna feed modules 600, the antenna feed modules 600 may be selected from the antenna coupled feed module 100 of the first embodiment or/and the microminiaturized antenna feed module 400 of the second embodiment.

Referring to FIG. 24, in the third embodiment, when the antenna feed module 600 is applied in the electronic device 700, the antenna feed module 600 is configured to feed electrical signals and conduct and/or couple the electrical signals to a metal frame of the electronic device 700 to transmit and receive wireless signals. The electronic device 700 may be a handheld communication device (such as a mobile phone), a foldable mobile phone, a smart wearable device (such as a watch, earphone, etc.), a tablet computer, a personal digital assistant (personal digital assistant, PDA), not specifically limited here.

The electronic device 700 may adopt one or more of the following communication technologies: BLUETOOTH (BT) communication technology, global positioning system (GPS) communication technology, WI-FI communication technology, global system for mobile communications (GSM) communication technology, wideband code division multiple access (WCDMA) communication technology, long term evolution (LTE) communication technology, 5G communication technology, SUB-6G communication technology, and other future communication technologies.

In the embodiment of the present disclosure, the electronic device 700 is a mobile phone.

Referring to FIG. 24, the electronic device 700 includes the metal frame 7304, a ground plane 7306, and a middle frame 7307.

The metal frame 7304 is made of metal or other conductive material. A backplane may be made of metal or other conductive material. The metal frame 7304 is disposed on the edge of the backplane and forms an accommodating space (not shown) together with the backplane. An opening (not shown in the figures) is provided on the side of the metal frame 7304 opposite to the backplane, for accommodating a display unit (not shown). The display unit has a display plane, and the display plane is exposed at the opening. It can be understood that the display unit can be combined with a touch sensor to form a touch screen. The touch sensor can also be called touch panel or touch sensitive panel.

Referring to FIG. 24, in the third embodiment, the metal frame 7304 is substantially rectangular. The metal frame 7304 includes an upper metal frame 73041, a first side metal frame 73042, a bottom metal frame 73043, and a second metal frame 73044 connected one by one.

In the embodiment of the present disclosure, the display unit has a high screen-to-body ratio. That is, the area of the display plane of the display unit is greater than 70% of the frontal area of the electronic device, and even a full frontal screen can be achieved. Specifically, in the embodiment of the present disclosure, full screen means that, except for the necessary slots opened on the electronic device 700, the left, right, and lower sides of the display unit are seamlessly connected to the metal frame 7304.

The ground plane 7306 may be made of metal or other conductive material. The ground plane 7306 can be disposed in the accommodating space enclosed by the metal frame 7304 and the backplane, and is connected to the backplane.

The middle frame 7307 is made of metal or other conductive material. The shape and size of the middle frame 7307 can be smaller or greater than those of the ground plane 7306. The middle frame 7307 is stacked on the ground plane 7306. In this embodiment, the middle frame 7307 is a metal sheet disposed between the display unit and the ground plane 7306. The middle frame 7307 is used to support the display unit, provide electromagnetic shielding, and improve the mechanical strength of the electronic device 700.

In the embodiment, the metal frame 7304, the backplane, the ground plane 7306, and the middle frame 7307 may be integrally formed. The backplane, the ground plane 7306, and the middle frame 7307 are made of metal with large surface areas, so they can jointly form the system ground plane (not shown in the figures) of the electronic device 700.

The middle frame 7307 and the metal frame 7304 are spaced apart, and a slit 7309 is formed between the first side metal frame 73042 and the middle frame 7307 and/or between the second side metal frame 73044 and the middle frame 7307.

The electronic device 700 includes a plurality of antenna feed modules 600 arranged at intervals and disposed correspondingly to the first side metal frame 73042 and/or the second side metal frame 73044.

When the plurality of antenna feed modules 600 are the antenna coupled feed module 100 of the first embodiment, the plurality of antenna feed modules 600 contact the first side metal frame 73042 and/or the second side metal frame 73044, and conduct electrical signals to the first side metal frame 73042 and/or the second side metal frame 73044.

When the plurality of antenna feed modules 600 are the microminiaturized antenna feed module 400 of the second embodiment, the antenna feed modules 600 are arranged apart from the first side metal frame 73042 and/or the second side metal frame 73044, and then couple electrical signals to the first side metal frame 73042 and/or the second side metal frame 73044.

When the plurality of antenna feed modules 600 are the antenna coupled feed module 100 of the first embodiment and the microminiaturized antenna feed module 400 of the second embodiment, a number of the antenna feed modules 600, that is, the antenna coupled feed module 100 of the first embodiment, make contact with the first side metal frame 73042 and/or the second side metal frame 73044, and conduct electrical signals to the first side metal frame 73042 and/or the second side metal frame 73044. The remaining antenna feed modules 600, that is, the microminiaturized antenna feed module 400 of the second embodiment, are arranged apart from the first side metal frame 73042 and/or the second side metal frame 73044, and couple electrical signals to the first side metal frame 73042 and/or the second side metal frame 73044.

In the embodiment, a number of antenna feed modules 600 disposed correspondingly to the first side metal frame 73042 may be same or different from a number antenna feed modules 600 disposed correspondingly to the second side metal frame 73044.

Referring to FIG. 24, in the third embodiment, the electronic device 700 includes five antenna feed modules 600, such as a first antenna feed module 601, a second antenna feed module 602, a third antenna feed module 603, a fourth antenna feed module, and a fifth antenna feed module 605, which are disposed correspondingly to five positions of the first side metal frame 73042 and/or the second side metal frame 73044. The first antenna feed module 601 is disposed correspondingly to a side of first side metal frame 73042 close to the upper metal frame 73041, marked as position P1. The second antenna feed module 602 is disposed correspondingly to a side of first side metal frame 73042 close to the bottom metal frame 73043, marked as position P2. The third antenna feed module 603, the fourth antenna feed module 604, and the fifth antenna feed module 605 are arranged along the second side metal frame 73044, respectively marked as positions P3, P4, and P5.

Referring to FIG. 24, in the embodiment, the first side metal frame 73042 and the second side metal frame 73044 define a plurality of gaps 7310, at intervals. The plurality of gaps 7310 partition the first side metal frame 73042 and the second side metal frame 73044, and divide the first side metal frame 73042 and the second side metal frame 73044 into a plurality of radiators 7311.

In the embodiment, the gaps 7310 may be connected to the slit 7309 and be filled with insulating materials, such as, but not limited to, plastic, rubber, glass, wood and ceramics.

When the electronic device 700 includes at least one antenna feed module 600, the at least one antenna feed module 600 may be disposed correspondingly to one of the plurality of radiators 7311 between the gaps 7310 and configured to conduct or couple electrical signals to the radiator 7311, so the radiator 7311 may radiate wireless signals.

The at least one antenna feed module 600 may be disposed correspondingly to one of the gaps 7310 and configured to conduct or couple electrical signals to the radiators 7311 adjacent to the gap 7310, so the radiators 7311 may radiate wireless signals.

When the electronic device 700 includes a number of antenna feed modules 600, the number thereof is variable, there may be two, three, four antenna feed modules 600 disposed correspondingly to the first side metal frame 73042 and the second metal frame 73044, so as to improve antenna bandwidth and antenna efficiency and achieve improved antenna frequency coverage.

Figure 25:
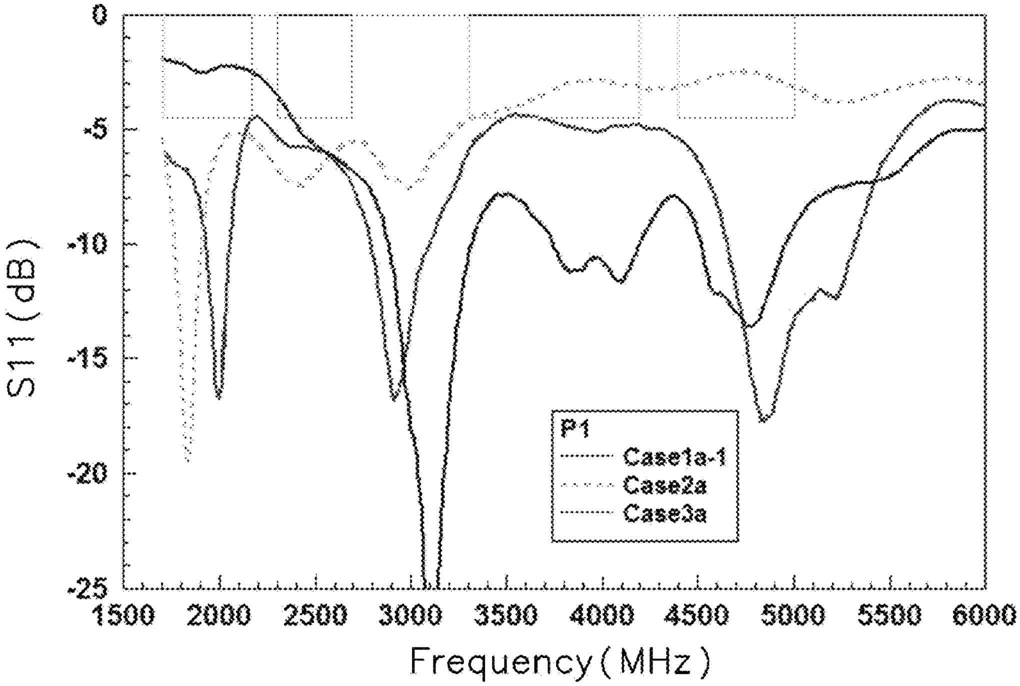
FIG. 25 shows graphs of S parameters (scattering parameters) of the electronic device arranging an antenna feed module in a position P1 according to the third embodiment of the present disclosure.

FIG. 25 shows graphs of S parameters (scattering parameters) when the antenna feed module 600 is configured as the first antenna feed module 601 arranged in the position P1 as shown in FIG. 24. FIG. 25 shows a graph of S parameters when the antenna feed module 600 is configured as the first antenna feed module 601 arranged in the position P1 and switched to different configurations (denoted as Case1a-1, Case2a, Case3a in the figure) through the active circuit 13, active circuit 413, and covers middle frequency band, high frequency band, 5G Sub 6 N77/N78 and UHB frequency band, 5G Sub 6 N79, and CA frequency band.

Thus, when the antenna feed module 600 is configured as the first antenna feed module 601 arranged in the position P1, it covers middle frequency band, high frequency band, 5G Sub 6 N77/N78 and UHB frequency band, 5G Sub 6 N79, and CA frequency band.

Figure 26:
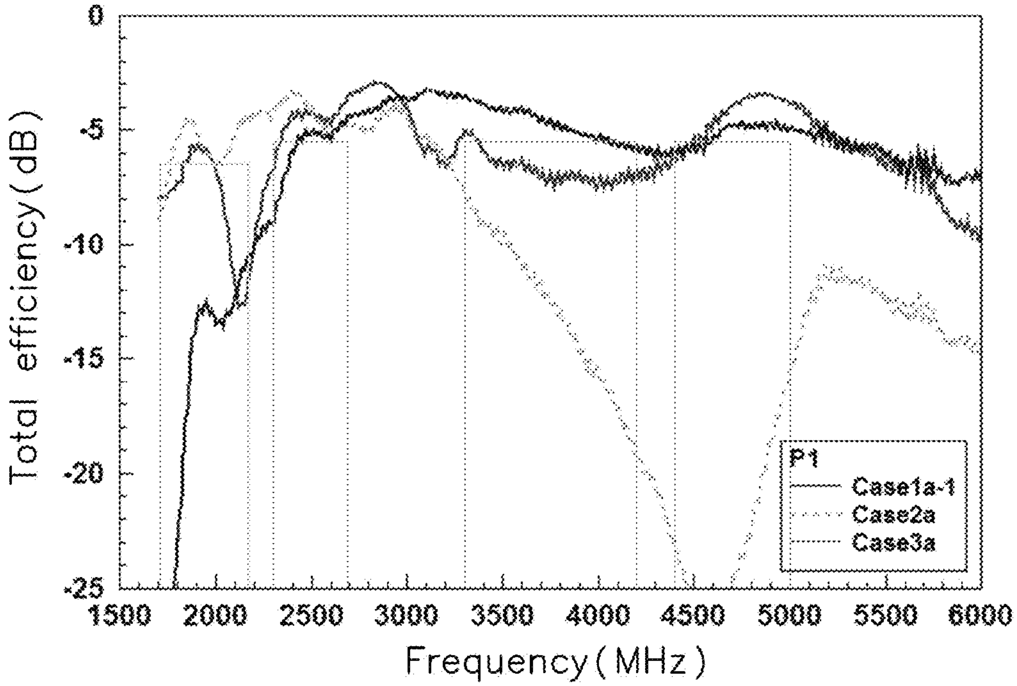
FIG. 26 shows efficiency graphs of the electronic device with the antenna feed module arranged in the position P1 according to the third embodiment of the present disclosure.

FIG. 26 shows efficiency graphs when the antenna feed module 600 is configured as the first antenna feed module 601 arranged in the position P1 as shown in FIG. 24. FIG. 26 shows an efficiency graph when antenna feed module 600 is configured as the first antenna feed module 601 arranged in the position P1 and switched to different configurations (denoted as Case1a-1, Case2a, Case3a in the figure) through the active circuit 13, active circuit 413, and covers middle frequency band, high frequency band, 5G Sub 6 N77/N78 and UHB frequency band, 5G Sub 6 N79, and CA frequency band.

Figure 27A:
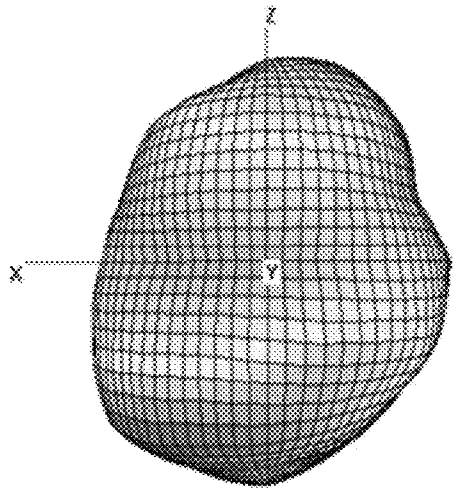
FIGS. 27A to 27E show 3D gain patterns of the electronic device with the antenna feed module arranged in the position P1 according to the third embodiment of the present disclosure.
Figure 27B:
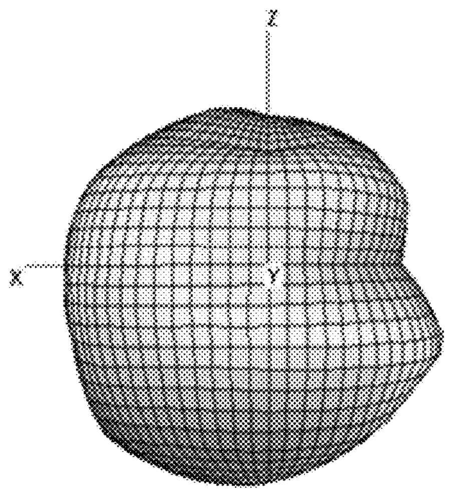
Figure 27C:
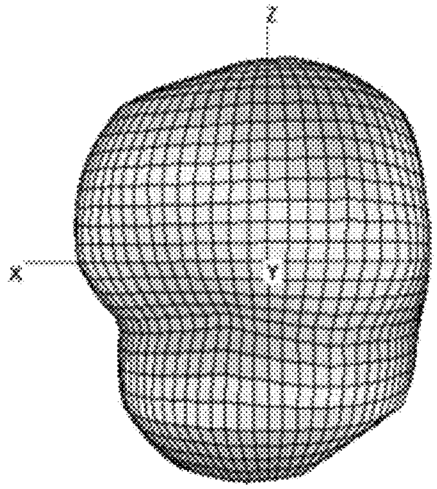
Figure 27D:
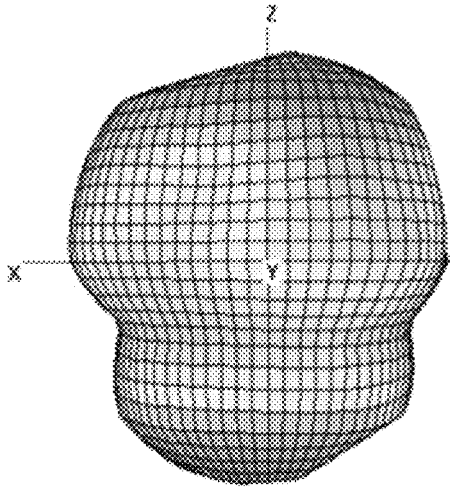
Figure 27E:
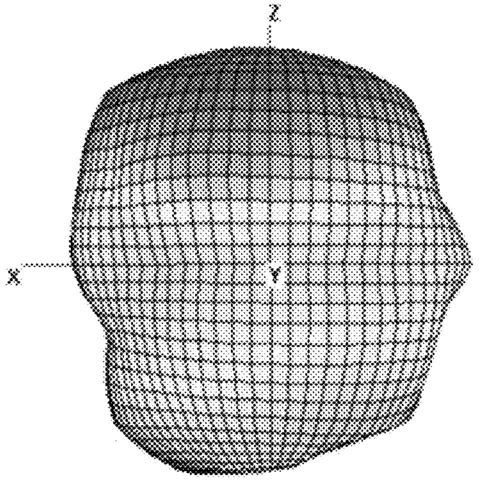

FIGS. 27A to 27E show 3D gain patterns when the antenna feed module 600 is configured as the first antenna feed module 601 arranged in the position P1 as shown in FIG. 24. FIG. 27A shows a 3D gain pattern when the first antenna feed module 601 covers a middle frequency band (1.9 GHz). FIG. 27B shows a 3D gain pattern when the first antenna feed module 601 covers a high frequency band (2.5 GHz). FIG. 27C shows a 3D gain pattern when the first antenna feed module 601 covers a UHB and 5G Sub 6 N78 frequency band (3.5 GHz). FIG. 27D shows a 3D gain pattern when the first antenna feed module 601 covers a 5G Sub 6 N77 frequency band (3.7 GHz). FIG. 27E shows a 3D gain pattern when the first antenna feed module 601 covers a 5G Sub 6 N79 frequency band (4.7 GHz).

Table 1 shows predetermined target values of S parameters, S parameters, predetermined target values of efficiency, and efficiency when the antenna feed module 600 is configured as the first antenna feed module 601 arranged in the position P1 as shown in FIG. 24.

TABLE 1

| S parameters and efficiency (dB) | Middle frequency | High frequency | 5G Sub 6 N77 | UHB and Sub 6 N78 | 5G Sub 6 N79 |
|---|---|---|---|---|---|
| predetermined target values of S11 | <−4.5 | <−4.5 | <−4.5 | <−4.5 | <−4.5 |
| S11 | −8.7 | −6.6 | −9.8 | −8.9 | −11.5 |
| predetermined target values of efficiency | >−6.5 | >−5.5 | >−5.5 | >−5.5 | >−5.5 |
| Total efficiency of Case1a-1 | −14.2 | −5.6 | −4.7 | −4.2 | −5.2 |
| Total efficiency of Case2a | −5.6 | −4.2 | −11.8 | −10.2 | −21.3 |
| Total efficiency of Case3a | −7.6 | −4.5 | −6.7 | −6.4 | −4.3 |

Table 1 shows that when the antenna feed module 600 is configured as the first antenna feed module 601 arranged in the position P1 as shown in FIG. 24, Case1a-1 is suitable for 5G Sub 6 N77/N78 and UHB frequency bands, Case2a is suitable for middle and high frequency bands, Case3a is suitable for 5G Sub 6 N79 and wideband CA frequency bands. The antenna efficiencies of the first antenna feed module 601 in the middle frequency/high frequency/5G Sub 6 N77/N78/UHB/N79 frequency bands may be −5.6 dB/−4.2 dB/−4.7 dB/−4.2 dB/−4.3 dB.

Figure 28:
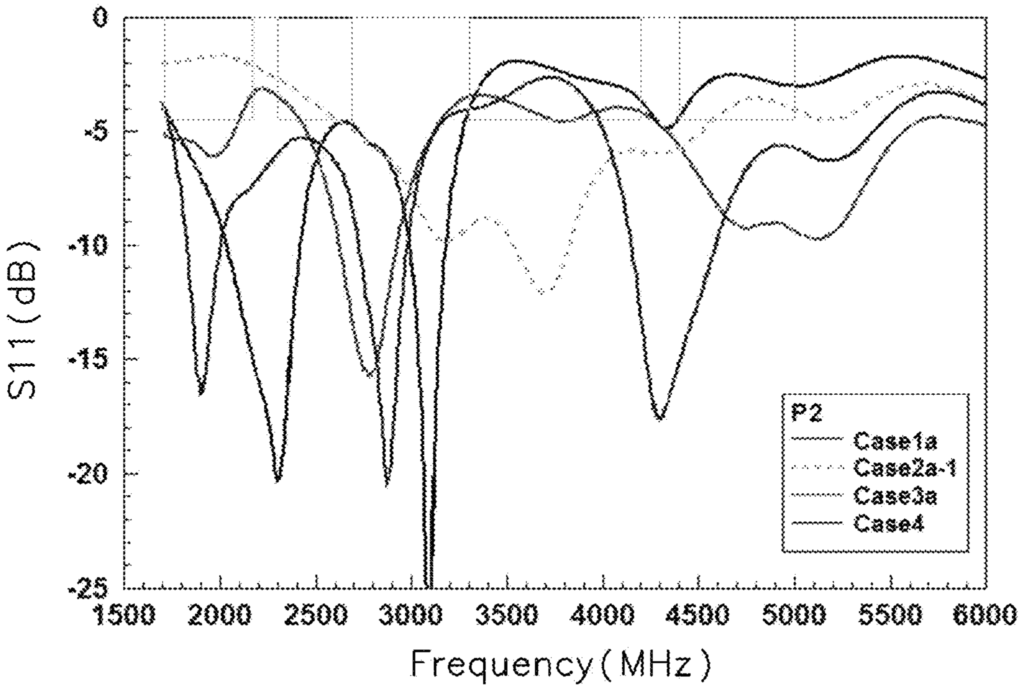
FIG. 28 shows graphs of S parameters (scattering parameters) of the electronic device with the antenna feed module arranged in a position P2 according to the third embodiment of the present disclosure.

FIG. 28 shows a graph of S parameters (scattering parameters) when the antenna feed module 600 is configured as the second antenna feed module 602 arranged in the position P2 as shown in FIG. 24. FIG. 28 shows a graph of S parameters when the antenna feed module 600 is configured as the second antenna feed module 602 arranged in the position P2 and switched to different configurations (denoted as Case1a, Case2a-1, Case3a, Case4 in the figure) through the active circuit 13, active circuit 413, and covers middle frequency band, high frequency band, 5G Sub 6 N77/N78 and UHB frequency bands, 5G Sub 6 N79, and CA frequency bands.

Figure 29:
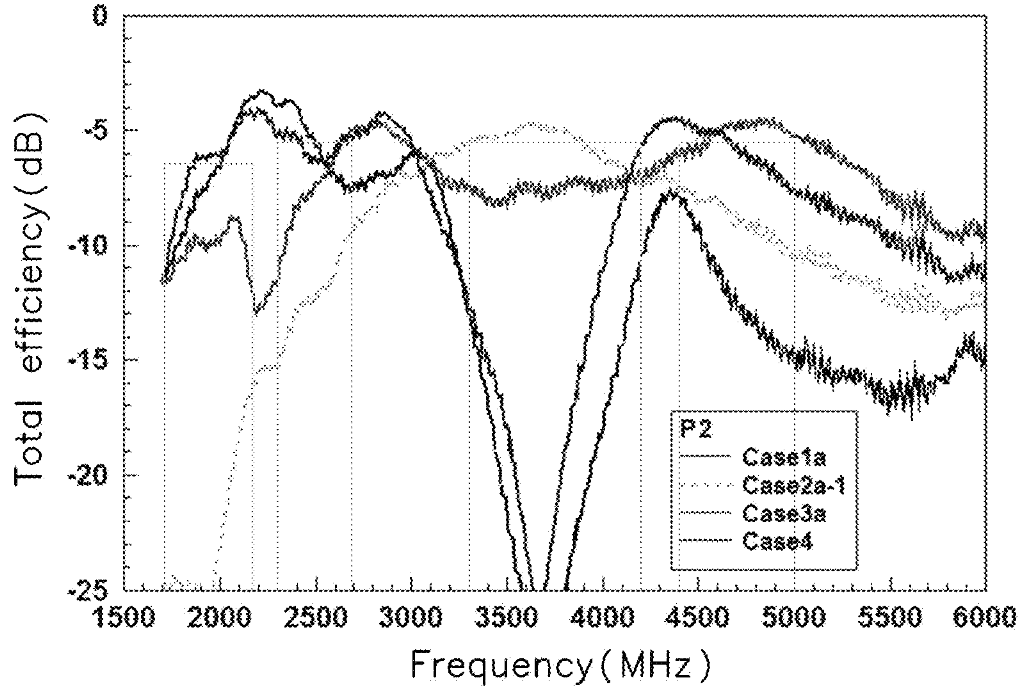
FIG. 29 shows efficiency graphs of the electronic device with the antenna feed module arranged in the position P2 according to the third embodiment of the present disclosure.

FIG. 29 shows an efficiency graph when the antenna feed module 600 is configured as the second antenna feed module 602 arranged in the position P2 as shown in FIG. 24. FIG. 29 shows an efficiency graph when antenna feed module 600 is configured as the second antenna feed module 602 arranged in the position P2 and switched to different configurations (denoted as Case1a, Case2a-1, Case3a, Case4 in the figure) through the active circuit 13, active circuit 413, and covers middle frequency band, high frequency band, 5G Sub 6 N77/N78 and UHB frequency band, 5G Sub 6 N79, and CA frequency band.

Figure 30A:
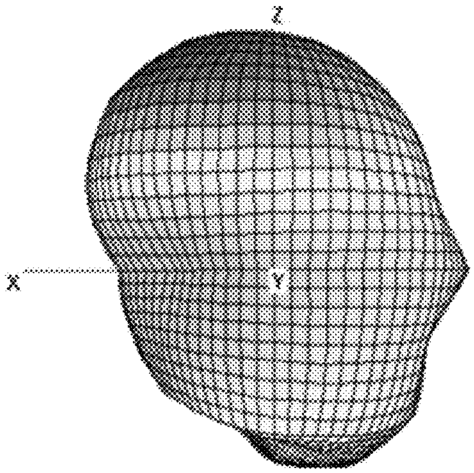
FIGS. 30A to 30E show 3D gain patterns of the electronic device with the antenna feed module arranged in the position P2 according to the third embodiment of the present disclosure.
Figure 30B:
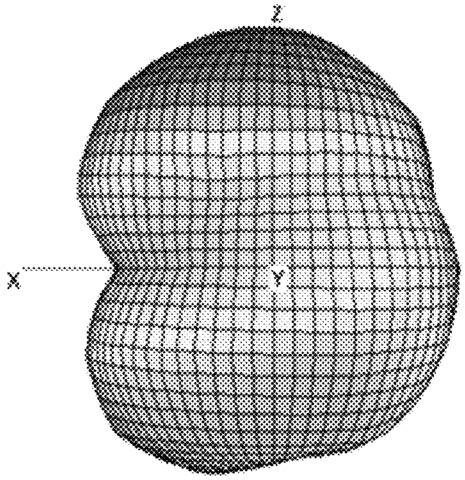
Figure 30C:
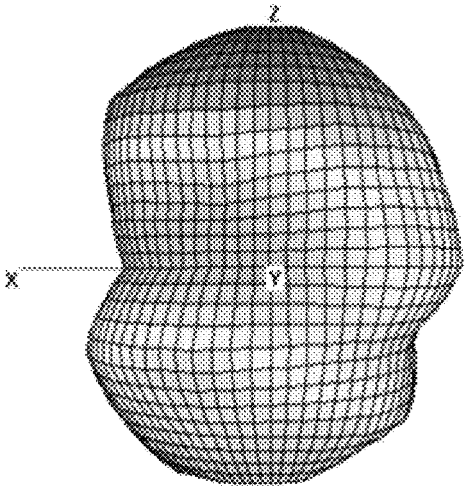
Figure 30D:
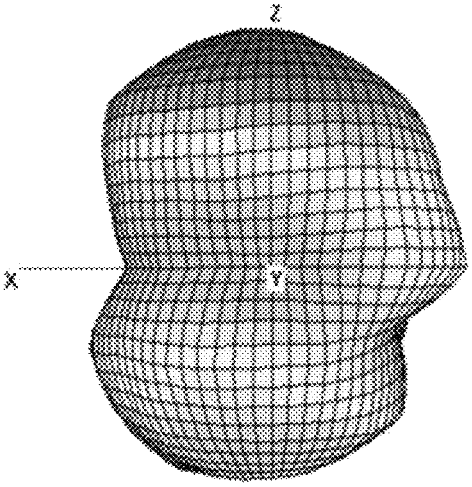
Figure 30E:
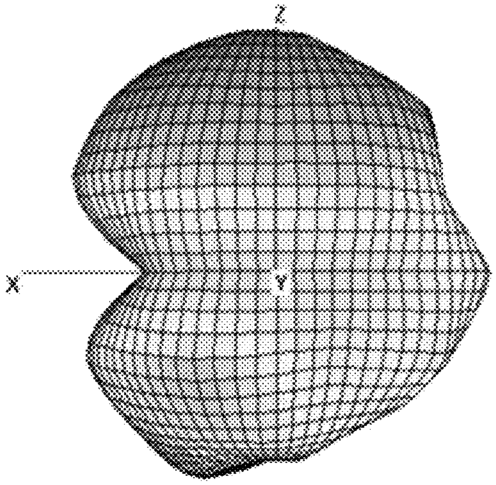

FIGS. 30A to 30E show 3D gain patterns when the antenna feed module 600 is configured as the second antenna feed module 602 arranged in the position P2 as shown in FIG. 24. FIG. 30A shows a 3D gain pattern when the second antenna feed module 602 covers a middle frequency band (1.9 GHz). FIG. 30B shows a 3D gain pattern when the second antenna feed module 602 covers a high frequency band (2.5 GHz). FIG. 30C shows a 3D gain pattern when the second antenna feed module 602 covers a UHB and 5G Sub 6 N78 frequency band (3.5 GHz). FIG. 30D shows a 3D gain pattern when the second antenna feed module 602 covers a 5G Sub 6 N77 frequency band (3.7 GHz). FIG. 30E shows a 3D gain pattern when the second antenna feed module 602 covers a 5G Sub 6 N79 frequency band (4.7 GHz).

Table 2 shows predetermined target values of S parameters, S parameters, predetermined target values of efficiency, and efficiency when the antenna feed module 600 is configured as the second antenna feed module 602 arranged in the position P2 as shown in FIG. 24.

TABLE 2

| S parameters and efficiency (dB) | Middle fre-quency | High fre-quency | 5G Sub 6 N77 | UHB and Sub 6 N78 | 5G Sub 6 N79 |
|---|---|---|---|---|---|
| predetermined target values of S11 | <−4.5 | <−4.5 | <−4.5 | <−4.5 | <−4.5 |
| S11 | −9.6 | −8.9 | −8.9 | −10.3 | −8.3 |
| predetermined target values of efficiency | >−6.5 | >−5.5 | >−5.5 | >−5.5 | >−5.5 |
| Total efficiency of Case1a | −6.2 | −5.7 | −12.6 | −17.6 | −5.8 |
| Total efficiency of Case2a-1 | −21.3 | −11.9 | −5.4 | −5.1 | −8.7 |
| Total efficiency of Case3a | −9.9 | −7.2 | −7.5 | −7.7 | −5.1 |
| Total efficiency of Case4 | −6.6 | −5.3 | −17.5 | −19.6 | −11.5 |

Table 2 shows that when the antenna feed module 600 is configured as the second antenna feed module 602 arranged in the position P2 as shown in FIG. 24, Case1a is suitable for middle frequency band, Case2a-1 is suitable for 5G Sub 6 N77/N78 and UHB frequency bands, Case3a is suitable for 5G Sub 6 N79 and wideband CA frequency bands, and Case4 is suitable for high frequency band. The antenna efficiencies of the second antenna feed module 602 in the middle frequency/high frequency/5G Sub 6 N77/N78/UHB/N79 frequency bands may be −6.2 dB/−5.3 dB/−5.4 dB/−5.1 dB/−5.1 dB.

Figure 31:
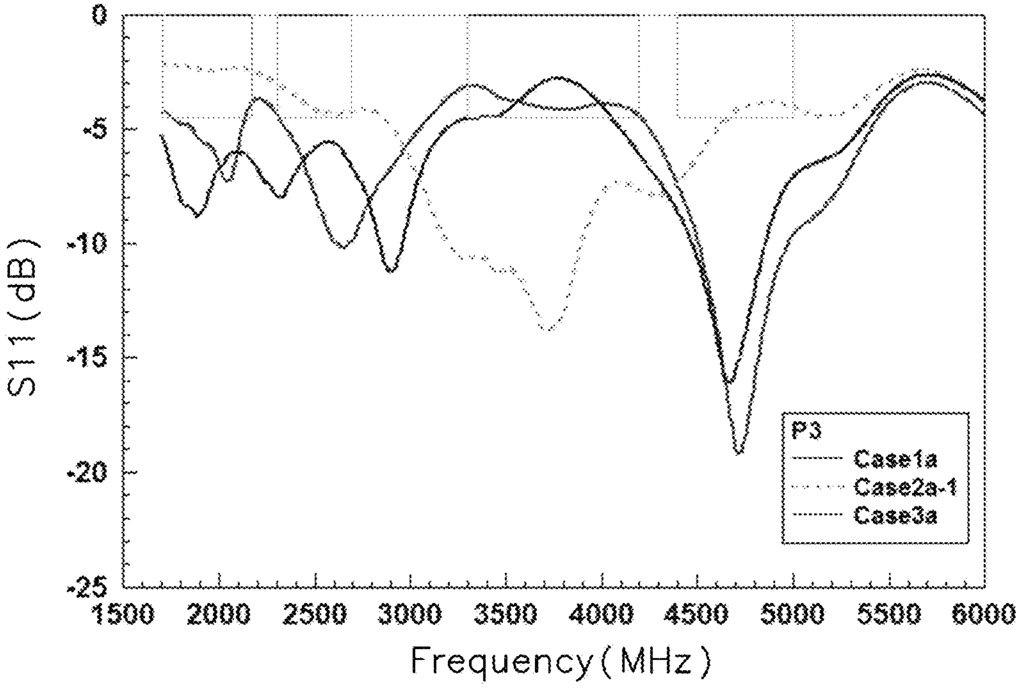
FIG. 31 shows graphs of S parameters (scattering parameters) of the electronic device with the antenna feed module arranged in a position P3 according to the third embodiment of the present disclosure.

FIG. 31 shows a graph of S parameters (scattering parameters) when the antenna feed module 600 is configured as the third antenna feed module 603 arranged in the position P3 as shown in FIG. 24. FIG. 31 shows a graph of S parameters when the antenna feed module 600 is configured as the third antenna feed module 603 arranged in the position P3 and switched to different configurations (denoted as Case1a, Case2a-1, Case3a in the figure) through the active circuit 13, active circuit 413, and covers middle frequency band, high frequency band, 5G Sub 6 N77/N78 and UHB frequency bands, 5G Sub 6 N79, and CA frequency bands.

Figure 32:
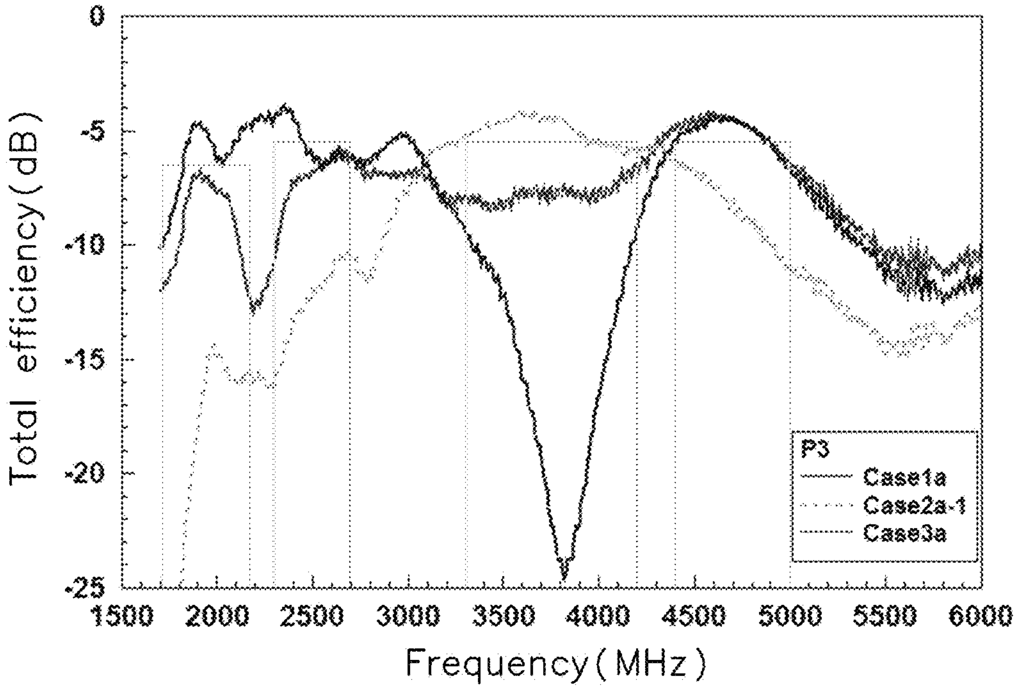
FIG. 32 shows efficiency graphs of the electronic device with the antenna feed module arranged in the position P3 according to the third embodiment of the present disclosure.

FIG. 32 shows an efficiency graph when the antenna feed module 600 is configured as the third antenna feed module 603 arranged in the position P3 as shown in FIG. 24. FIG. 32 shows an efficiency graph when antenna feed module 600 is configured as the third antenna feed module 603 arranged in the position P3 and switched to different configurations (such as Case1a, Case2a-1, Case3a as shown in the figure) through the active circuit 13, active circuit 413, and covers middle frequency band, high frequency band, 5G Sub 6 N77/N78 and UHB frequency bands, 5G Sub 6 N79, and CA frequency bands.

Figure 33A:
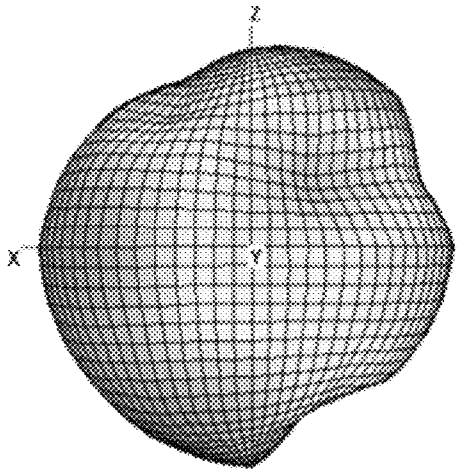
FIGS. 33A to 33E show 3D gain patterns of the electronic device with the antenna feed module arranged in the position P3 according to the third embodiment of the present disclosure.
Figure 33B:
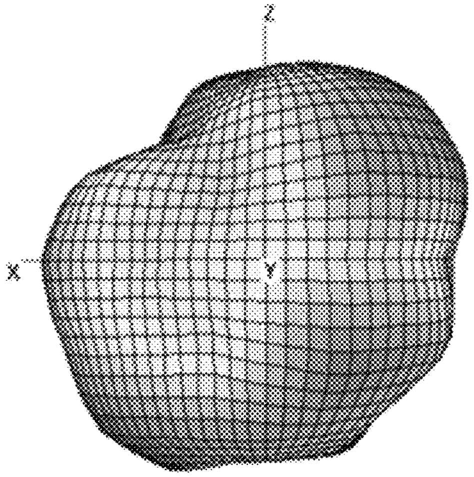
Figure 33C:
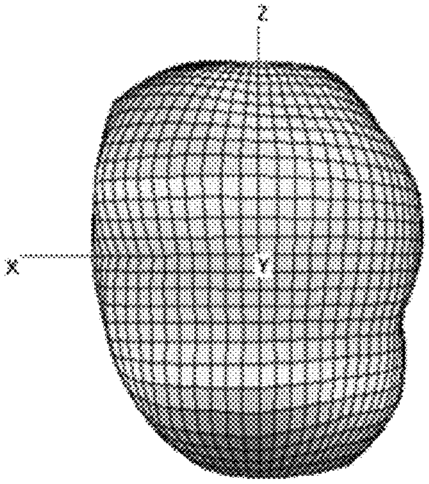
Figure 33D:
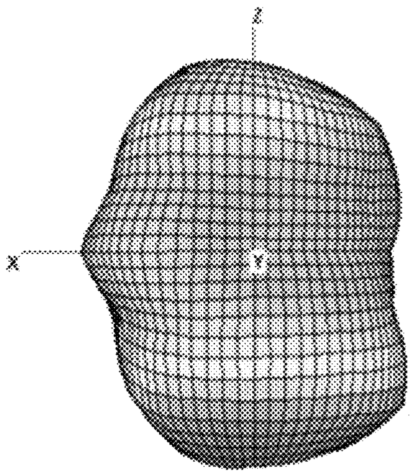
Figure 33E:
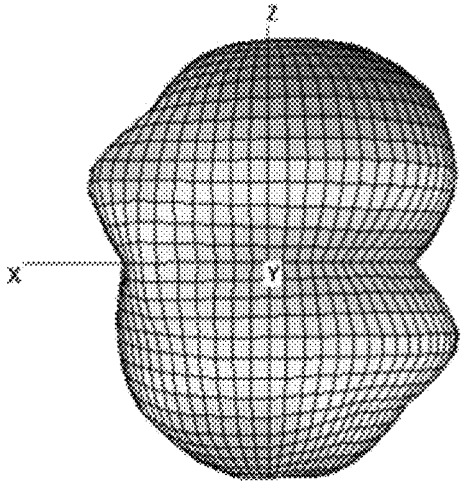

FIGS. 33A to 33E show 3D gain patterns when the antenna feed module 600 is configured as the third antenna feed module 603 arranged in the position P3 as shown in FIG. 24. FIG. 33A shows a 3D gain pattern when the third antenna feed module 603 covers a middle frequency band (1.9 GHz). FIG. 33B shows a 3D gain pattern when the third antenna feed module 603 covers a high frequency band (2.5 GHz). FIG. 33C shows a 3D gain pattern when the third antenna feed module 603 covers a UHB and 5G Sub 6 N78 frequency band (3.5 GHz). FIG. 33D shows a 3D gain pattern when the third antenna feed module 603 covers a 5G Sub 6 N77 frequency band (3.7 GHz). FIG. 33E shows a 3D gain pattern when the third antenna feed module 603 covers a 5G Sub 6 N79 frequency band (4.7 GHz).

Table 3 shows predetermined target values of S parameters, S parameters, predetermined target values of efficiency, and efficiency when the antenna feed module 600 is configured as the third antenna feed module 603 arranged in the position P3 as shown in FIG. 24.

TABLE 3

| S parameters and efficiency (dB) | Middle fre-quency | High fre-quency | 5G Sub 6 N77 | UHB and Sub 6 N78 | 5G Sub 6 N79 |
|---|---|---|---|---|---|
| predetermined target value of S11 | <−4.5 | <−4.5 | <−4.5 | <−4.5 | <−4.5 |
| S11 | −7.1 | −6.4 | −10.5 | −11.9 | −13.0 |
| predetermined target values of efficiency | >−6.5 | >−5.5 | >−5.5 | >−5.5 | >−5.5 |
| Total efficiency of Case1a | −6 | −5.4 | −13.7 | −13.2 | −5.1 |
| Total efficiency of Case2a-1 | −17.3 | −12.2 | −4.9 | −4.6 | −8.1 |
| Total efficiency of Case3a | −8.7 | −6.9 | −7.7 | −7.9 | −4.9 |

Table 3 shows that when the antenna feed module 600 is configured as the third antenna feed module 603 arranged in the position P3 as shown in FIG. 24, Case1a is suitable for middle and high frequency band, Case2a-1 is suitable for 5G Sub 6 N77/N78 and UHB frequency bands, Case3a is suitable for 5G Sub 6 N79 and wideband CA frequency bands. The antenna efficiencies of the third antenna feed module 603 in the middle frequency/high frequency/5G Sub 6 N77/N78/UHB/N79 frequency bands may be −6 dB/−5.4 dB/−4.9 dB/−4.6 dB/−4.9 dB.

Figure 34:
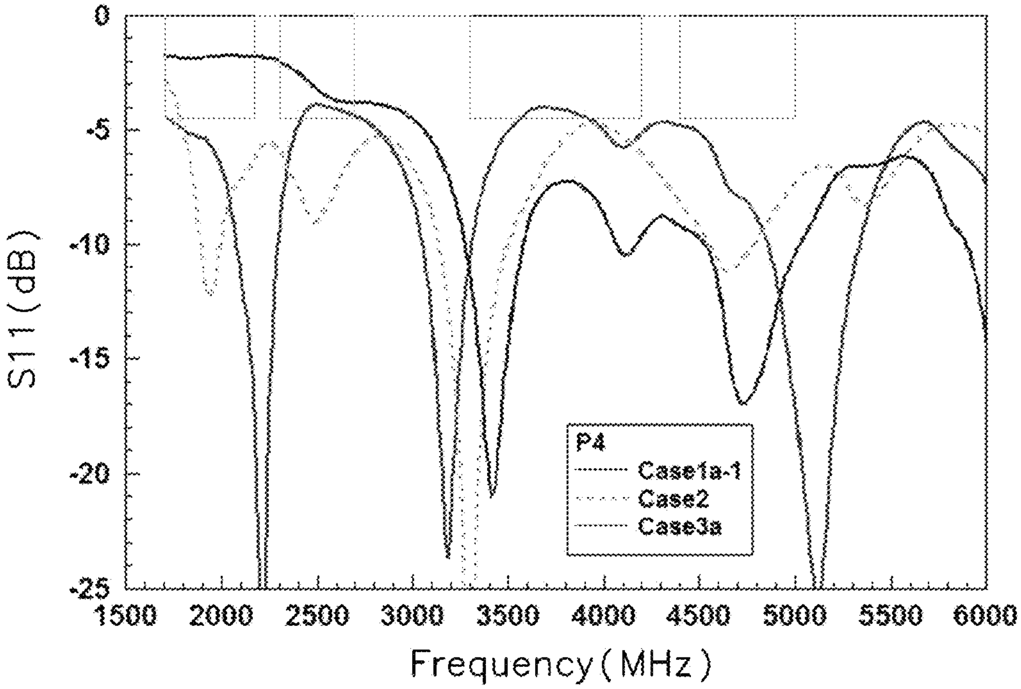
FIG. 34 shows graphs of S parameters (scattering parameters) of the electronic device with the antenna feed module arranged in a position P4 according to the third embodiment of the present disclosure.

FIG. 34 shows a graph of S parameters (scattering parameters) when the antenna feed module 600 is configured as the fourth antenna feed module 604 arranged in the position P4 as shown in FIG. 24. FIG. 34 shows a graph of S parameters when the antenna feed module 600 is configured as the fourth antenna feed module 604 arranged in the position P4 and switched to different configurations (denoted as Case1a-1, Case2, Case3 as in the figure) through the active circuit 13, active circuit 413, and covers middle frequency band, high frequency band, 5G Sub 6 N77/N78 and UHB frequency band, 5G Sub 6 N79, and CA frequency band.

Figure 35:
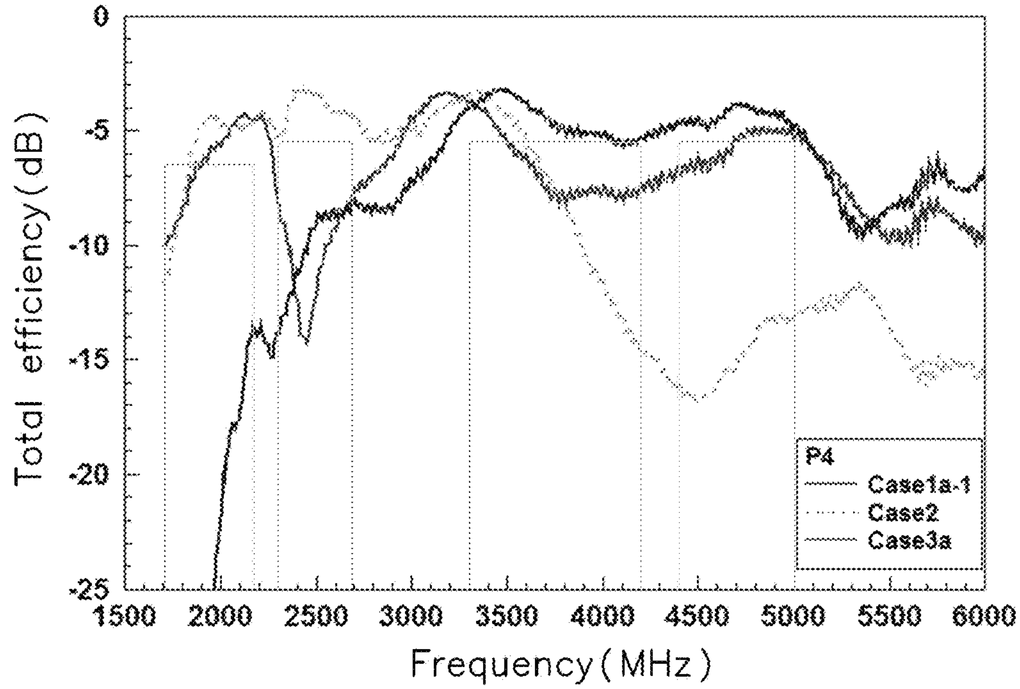
FIG. 35 shows efficiency graphs of the electronic device with the antenna feed module arranged in the position P4 according to the third embodiment of the present disclosure.

FIG. 35 shows an efficiency graph when the antenna feed module 600 is configured as the fourth antenna feed module 604 arranged in the position P4 as shown in FIG. 24. FIG. 35 shows an efficiency graph when antenna feed module 600 is configured as the fourth antenna feed module 604 arranged in the position P4 and switched to different configurations (denoted as Case1a-1, Case2, Case3a in the figure) through the active circuit 13, active circuit 413, and covers middle frequency band, high frequency band, 5G Sub 6 N77/N78 and UHB frequency bands, 5G Sub 6 N79, and CA frequency bands.

Figure 36A:
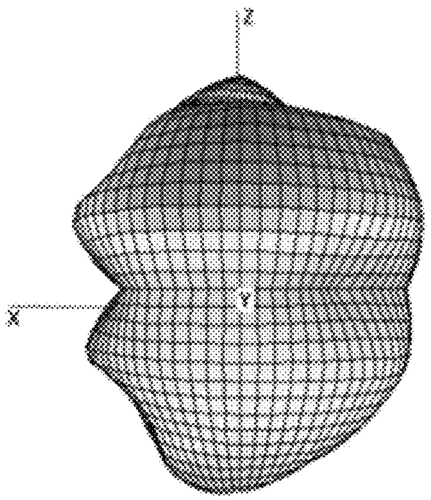
FIGS. 36A to 36E show 3D gain patterns of the electronic device with the antenna feed module arranged in the position P4 according to the third embodiment of the present disclosure.
Figure 36B:
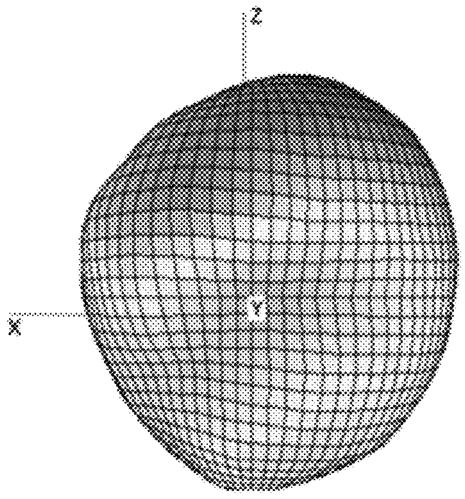
Figure 36C:
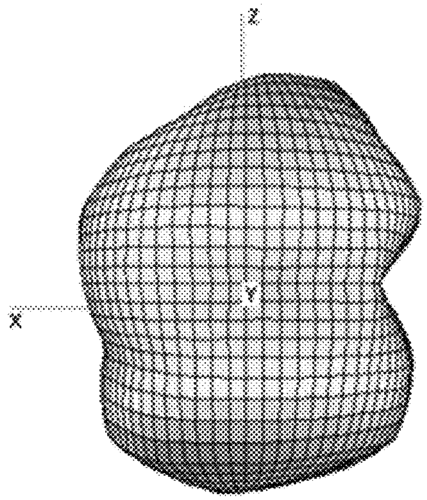
Figure 36D:
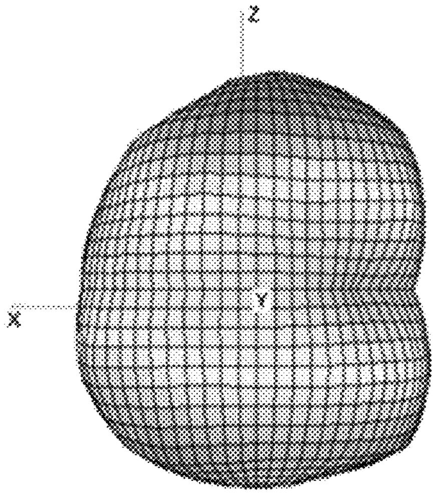
Figure 36E:
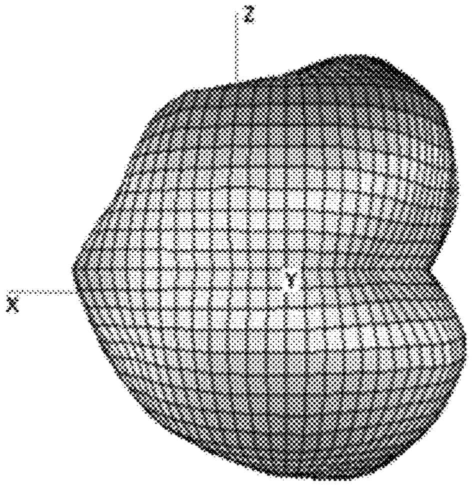

FIGS. 36A to 36E show 3D gain patterns when the antenna feed module 600 is configured as the fourth antenna feed module 604 arranged in the position P4 as shown in FIG. 24. FIG. 36A shows a 3D gain pattern when the fourth antenna feed module 604 covers a middle frequency band (1.9 GHz). FIG. 36B shows a 3D gain pattern when the fourth antenna feed module 604 covers a high frequency band (2.5 GHz). FIG. 36C shows a 3D gain pattern when the fourth antenna feed module 604 covers a UHB and 5G Sub 6 N78 frequency band (3.5 GHz). FIG. 36D shows a 3D gain pattern when the fourth antenna feed module 604 covers a 5G Sub 6 N77 frequency band (3.7 GHz). FIG. 36E shows a 3D gain pattern when the fourth antenna feed module 604 covers a 5G Sub 6 N79 frequency band (4.7 GHz).

Table 4 shows predetermined target values of S parameters, S parameters, predetermined target values of efficiency, and efficiency when the antenna feed module 600 is configured as the fourth antenna feed module 604 arranged in the position P4 as shown in FIG. 24.

TABLE 4

| S parameters and efficiency (dB) | Middle frequency | High frequency | 5G Sub 6 N77 | UHB and Sub 6 N78 | 5G Sub 6 N79 |
|---|---|---|---|---|---|
| predetermined target values of S11 | <−4.5 | <−4.5 | <−4.5 | <−4.5 | <−4.5 |
| S11 | −7.4 | −7.6 | −10.7 | −12.2 | −12.8 |
| predetermined target values of efficiency | >−6.5 | >−5.5 | >−5.5 | >−5.5 | >−5.5 |
| Total efficiency of Case1a-1 | −20.2 | −9.7 | −4.4 | −3.9 | −4.4 |
| Total efficiency of Case2 | −5.6 | −3.9 | −6.7 | −4.9 | −14.8 |
| Total efficiency of Case3a | −6.1 | −10.2 | −5.7 | −6.5 | −5.7 |

Table 4 shows that when the antenna feed module 600 is configured as the fourth antenna feed module 604 arranged in the position P4 as shown in FIG. 24, Case1a-1 is suitable for 5G Sub 6 N77/N78/N79 and UHB frequency bands, Case2 is suitable for middle and high frequency bands, Case3a is suitable for wideband CA frequency band. The antenna efficiencies of the forth antenna feed module 604 in the middle frequency/high frequency/5G Sub 6 N77/N78/UHB/N79 frequency bands may be −5.6 dB/−3.9 dB/−4.4 dB/−3.9 dB/−4.4 dB.

Figure 37:
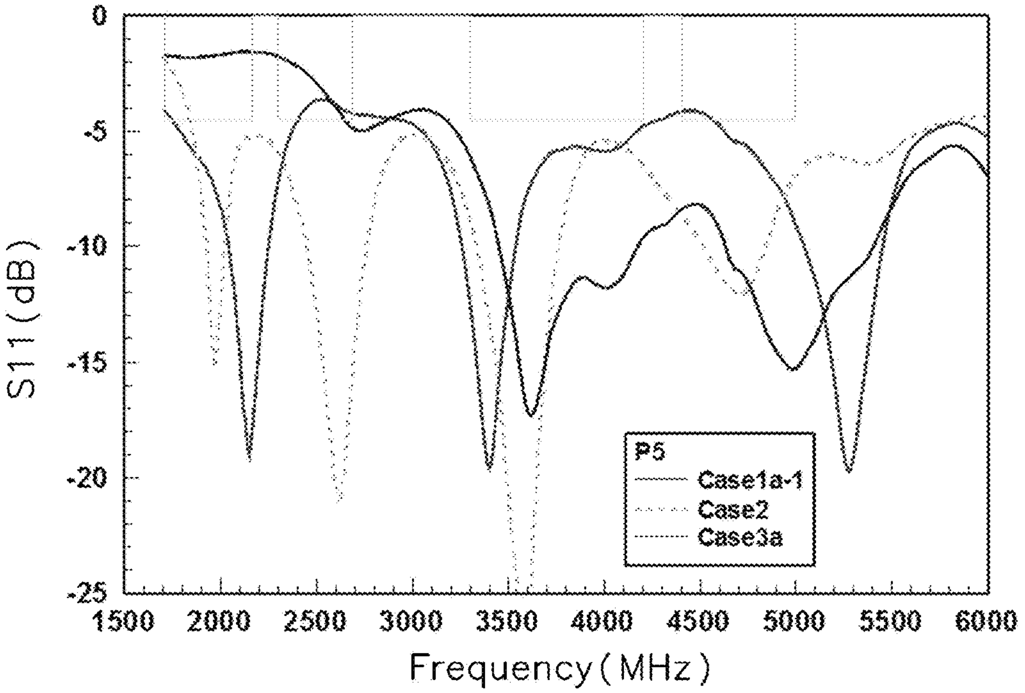
FIG. 37 shows graphs of S parameters (scattering parameters) of the electronic device with the antenna feed module arranged in a position P5 according to the third embodiment of the present disclosure.

FIG. 37 shows a graph of S parameters (scattering parameters) when the antenna feed module 600 is configured as the fifth antenna feed module 605 arranged in the position P5 as shown in FIG. 24. FIG. 37 shows a graph of S parameters when the antenna feed module 600 is configured as the fifth antenna feed module 605 arranged in the position P5 and switched to different configurations (denoted as Case1a-1, Case2, Case3a in the figure) through the active circuit 13, active circuit 413, and covers middle frequency band, high frequency band, 5G Sub 6 N77/N78 and UHB frequency bands, 5G Sub 6 N79, and CA frequency bands.

Figure 38:
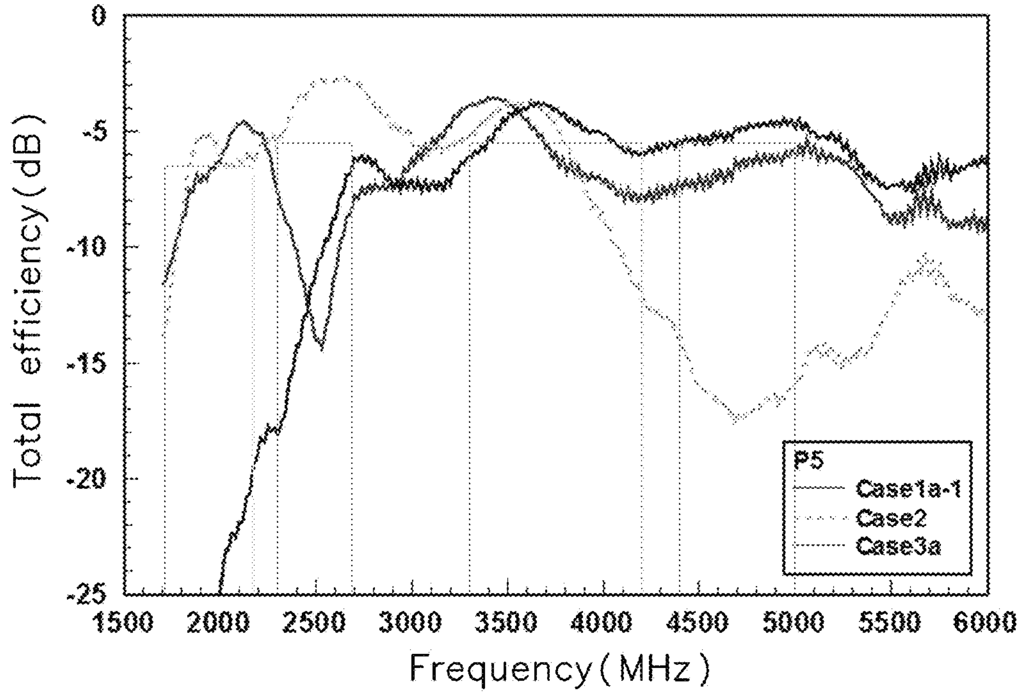
FIG. 38 shows efficiency graphs of the electronic device with the antenna feed module arranged in the position P5 according to the third embodiment of the present disclosure.

FIG. 38 shows an efficiency graph when the antenna feed module 600 is configured as the fifth antenna feed module 605 arranged in the position P5 as shown in FIG. 24. FIG. 38 shows an efficiency graph when antenna feed module 600 is configured as the fifth antenna feed module 605 arranged in the position P5 and switched to different configurations (such as Case1a-1, Case2, Case3a as shown in the figure) through the active circuit 13, active circuit 413, and covers middle frequency band, high frequency band, 5G Sub 6 N77/N78 and UHB frequency bands, 5G Sub 6 N79 and CA frequency bands.

Figure 39A:
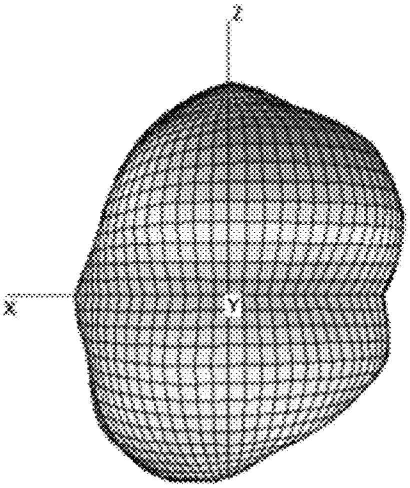
FIGS. 39A to 39E show 3D gain patterns of the electronic device with the antenna feed module arranged in the position P5 according to the third embodiment of the present disclosure.
Figure 39B:
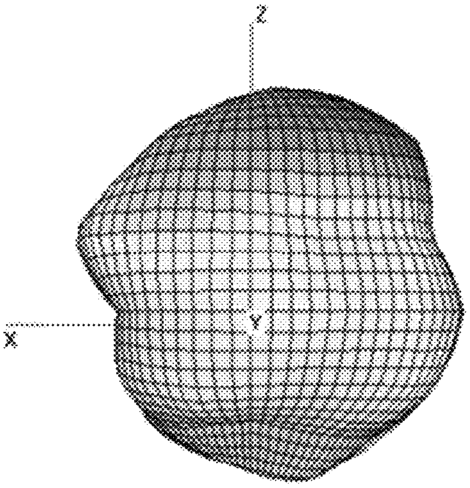
Figure 39C:
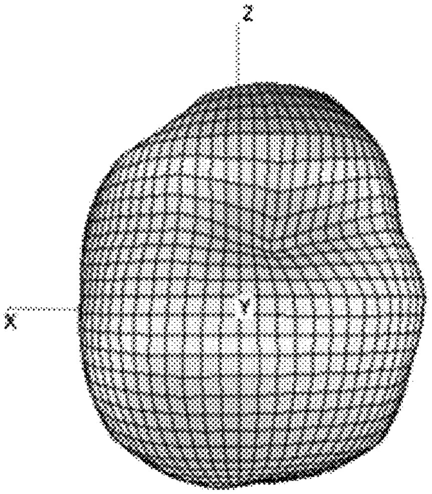
Figure 39D:
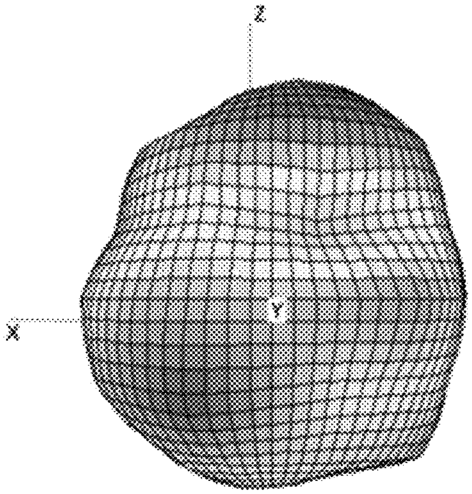
Figure 39E:
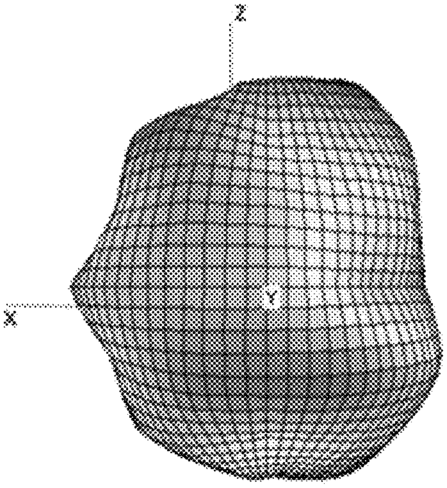

FIGS. 39A to 39E show 3D gain patterns when the antenna feed module 600 is configured as the fifth antenna feed module 605 arranged in the position P5 as shown in FIG. 24. FIG. 39A shows a 3D gain pattern when the fifth antenna feed module 605 covers a middle frequency band (1.9 GHz). FIG. 39B shows a 3D gain pattern when the fifth antenna feed module 605 covers a high frequency band (2.5 GHz). FIG. 39C shows a 3D gain pattern when the fifth antenna feed module 605 covers a UHB and 5G Sub 6 N78 frequency band (3.5 GHz). FIG. 39D shows a 3D gain pattern when the fifth antenna feed module 605 covers a 5G Sub 6 N77 frequency band (3.7 GHz). FIG. 39E shows a 3D gain pattern when the fifth antenna feed module 605 covers a 5G Sub 6 N79 frequency band (4.7 GHz).

Table 5 shows predetermined target values of S parameters, S parameters, predetermined target values of efficiency, and efficiency when the antenna feed module 600 is configured as the fifth antenna feed module 605 arranged in the position P5 as shown in FIG. 24.

TABLE 5

| S parameters and efficiency (dB) | Middle frequency | High frequency | 5G Sub 6 N77 | UHB and Sub 6 N78 | 5G Sub 6 N79 |
|---|---|---|---|---|---|
| S11 predetermined target value | <−4.5 | <−4.5 | <−4.5 | <−4.5 | <−4.5 |
| S11 | −8.7 | −13 1 | −8.2 | −9.5 | −9.6 |
| predetermined target values of efficiency | >−6.5 | >−5.5 | >−5.5 | >−5.5 | >−5.5 |
| Total efficiency of Case1a-1 | −25.0 | −10.5 | −4.8 | −4.5 | −5.0 |
| Total efficiency of Case2 | −6.5 | −3.3 | −5.7 | −4.3 | −16.4 |
| Total efficiency of Case3a | −6.5 | −10.5 | −5.5 | −4.4 | −6.6 |

Table 5 shows that when the antenna feed module 600 is configured as the fifth antenna feed module 605 arranged in the position P5 as shown in FIG. 24, Case1a-1 is suitable for 5G Sub 6 N77/N78/N79 and UHB frequency bands, Case2 is suitable for high frequency band, Case3a is suitable for middle frequency band and wideband CA frequency bands. The antenna efficiencies of the third antenna feed module 603 in the middle frequency/high frequency/5G Sub 6 N77/N78/UHB/N79 frequency bands may be −6.5 dB/−3.3 dB/−4.8 dB/−4.5 dB/−5 dB.

Figure 40:
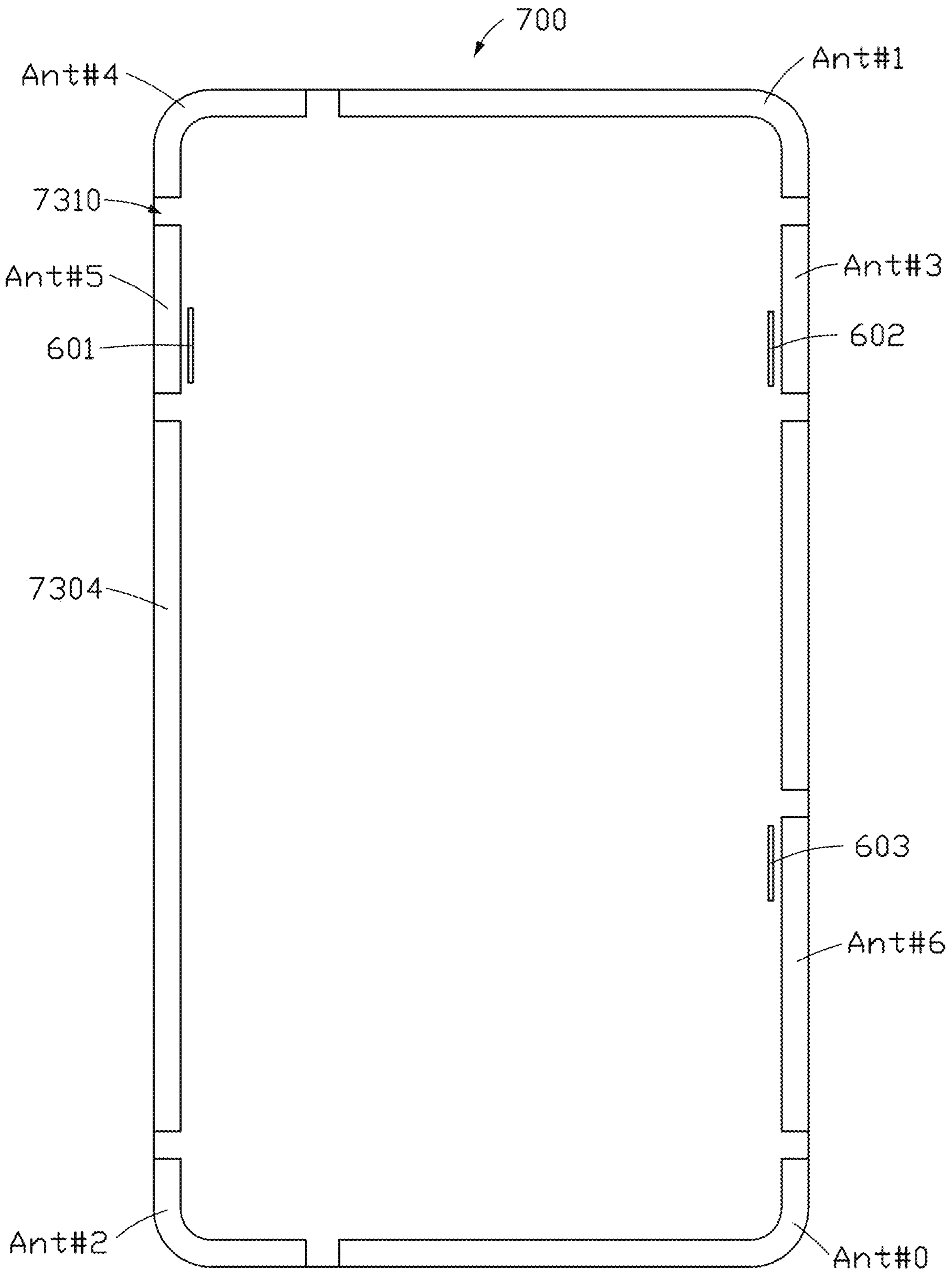
FIG. 40 is a schematic diagram of another electronic device having the antenna feed module of the third embodiment of the present disclosure.

FIG. 40 shows another electronic device 700 having the antenna feed module 600 of the third embodiment of the present disclosure. The electronic device 700 includes a first antenna feed module 601, a second antenna feed module 602, and a third antenna feed module 603. The first antenna feed module 601, the second feed module 602 and third antenna feed module 603 may be the antenna coupled feed module 100 of the first embodiment or the microminiaturized antenna feed module 400 of the second embodiment.

The electronic device 700 at least includes a metal frame 7304, which may be made of metal or other conductive materials. The metal frame 7304 defines a plurality of gaps 7310 at intervals to partition the metal frame 7304, and divides the metal frame 7304 into a plurality of radiators.

In the embodiment, the electronic device 700 at least includes a plurality of module antennas and a plurality of non-module antennas. The module antennas may be antennas formed by antenna feed modules and radiators. In one embodiment, the antenna feed modules may be of one or both of antenna coupled feed module 100 of the first embodiment and the microminiaturized antenna feed module 400 of the second embodiment. The radiators may be, but are not limited to, a part of the metal frame or other conductive metal. The non-module antennas may be any kinds of antennas except the aforesaid module antennas. For example, the non-module antennas may be, but are not limited to, antennas formed by the metal frame. In the embodiment, the electronic device 700 includes a non-module antenna ANT #0, a non-module antenna ANT #1, a non-module antenna ANT #2, a non-module antenna ANT #4, a module antenna ANT #3, a module antenna ANT #5, and a module antenna ANT #6. The first antenna feed module 601 is disposed correspondingly to one of the radiators to form the module antenna ANT #5, the second antenna feed module 602 is disposed correspondingly to one of the radiators to form the module antenna ANT #3, and the third second antenna feed module 603 is disposed correspondingly to one of the radiators to form the module antenna ANT #6. The first antenna feed module 601, the second antenna feed module 602, and the third antenna feed module 603 may couple electrical signals for the corresponding radiators to radiate wireless signals and form the module antennas. Furthermore, the non-module antenna ANT #0, the non-module antenna ANT #2, and the module antenna ANT #6 cooperatively form a lower antenna of the electronic device 700, and the non-module antenna ANT #1, the non-module antenna ANT #4, the module antenna ANT #3, and the module antenna ANT #5 cooperatively form an upper antenna of the electronic device 700.

Figure 41A:
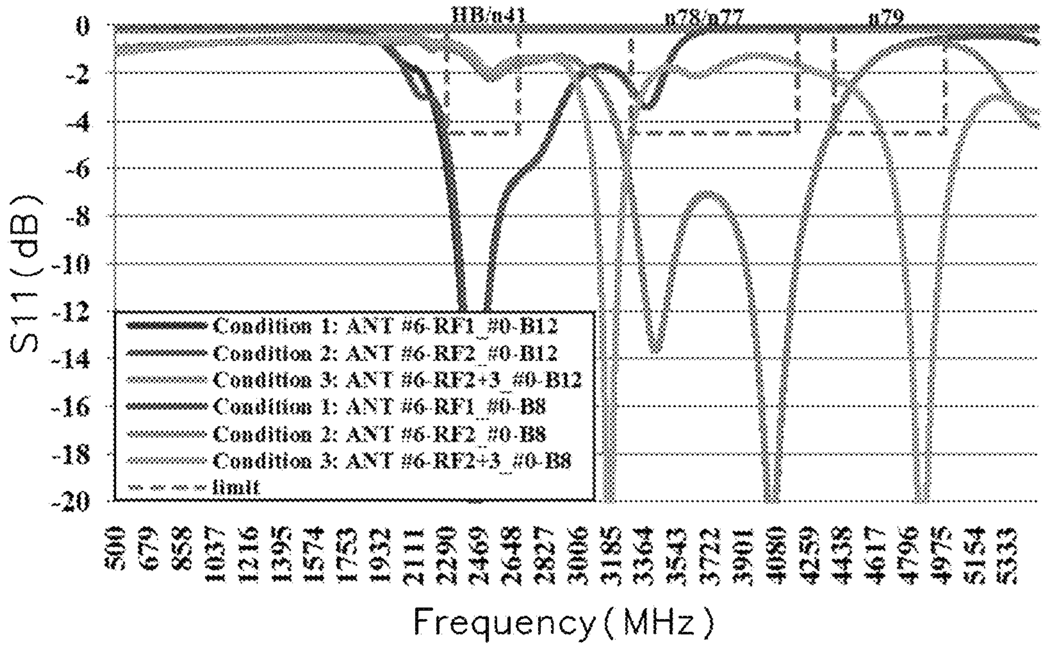
FIG. 41A shows graphs of S parameters (scattering parameters) of a lower antenna of the electronic device shown in FIG. 40.

FIG. 41A shows a graph of S parameters (scattering parameters) of the lower antenna of the electronic device 700, that is, the module antenna ANT #6 formed by the third antenna feed module 603. FIG. 41A shows a graph of S parameters of the module antenna ANT #6 formed by the third antenna feed module 603 and switched to different configurations (denoted as RF1_#0-B12, RF2_#0-B12, RF2+3_#0-B12, RF1_#0-B8, RF2_#0-B8, RF2+3_#0-B8 in the figure) through the active circuit 13, active circuit 413, and covers high frequency band and 5G Sub 6 N41/N77/N78/N79 frequency bands.

Figure 41B:
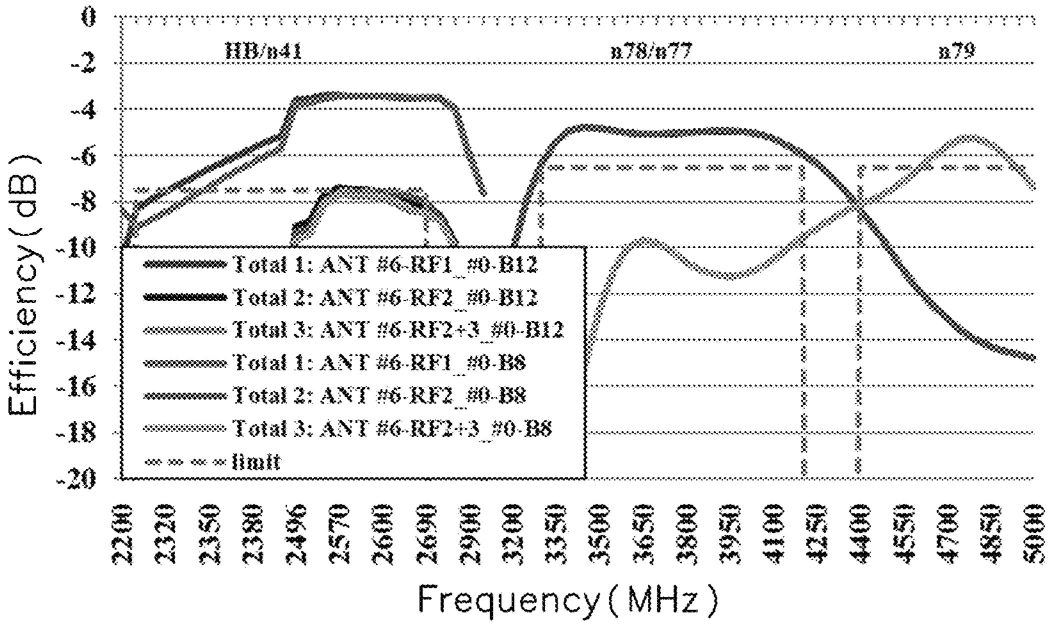
FIG. 41B shows efficiency graphs of the lower antenna of the electronic device shown in FIG. 40.

FIG. 41B shows an efficiency graph of the lower antenna of the electronic device 700, that is, the module antenna ANT #6 with the third antenna feed module 603. FIG. 41B shows an efficiency graph of the module antenna ANT #6 formed by the third antenna feed module 603 and switched to different configurations (denoted as RF1_#0-B12, RF2_#0-B12, RF2+3_#0-B12, RF1_#0-B8, RF2_#0-B8, RF2+3_#0-B8 in the figure) through the active circuit 13, active circuit 413, and covers high frequency band and 5G Sub 6 N41/N77/N78/N79 frequency bands.

Figure 41C:
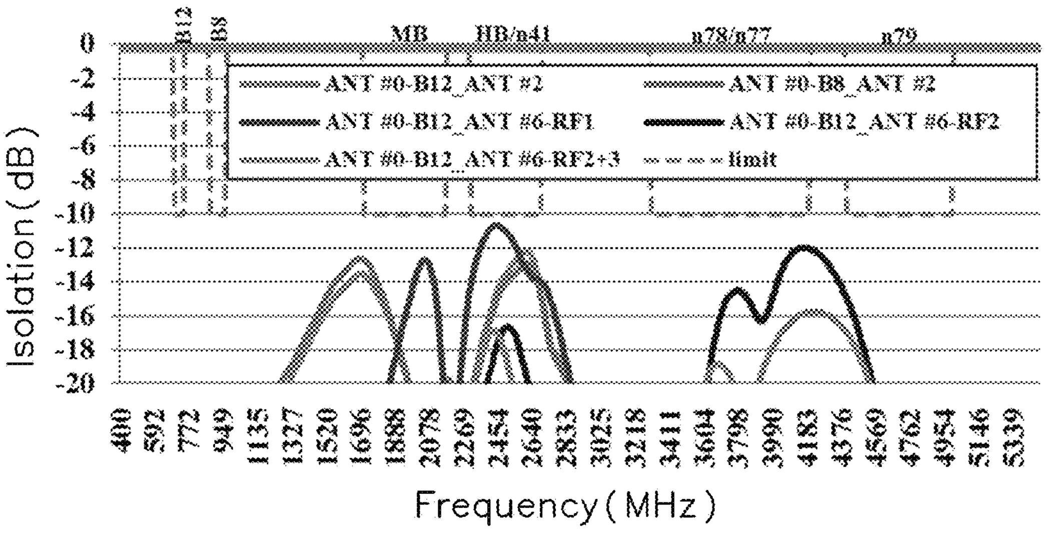
FIG. 41C shows isolation graphs of the lower antenna of the electronic device and adjacent radiators shown in FIG. 40.

FIG. 41C shows an isolation graph of the lower antenna of the electronic device 700, that is, the module antenna ANT #6 formed by the third antenna feed module 603, and adjacent antennas. FIG. 41C shows an isolation graph of the module antenna ANT #6 formed by the third antenna feed module 603 and the non-module antenna ANT #0, the non-module antenna ANT #2 (denoted as ANT_#0-B12_ANT #2, ANT_#0-B8_ANT #2, ANT_#0-B12_ANT #6-RF1, ANT_#0-B12_ANT #6-RF2, ANT_#0-B12_ANT #6-RF2+3 in the figure), and covers middle frequency band, high frequency band, and 5G Sub 6 N41/N77/N78/N79 frequency bands.

Figure 42A:
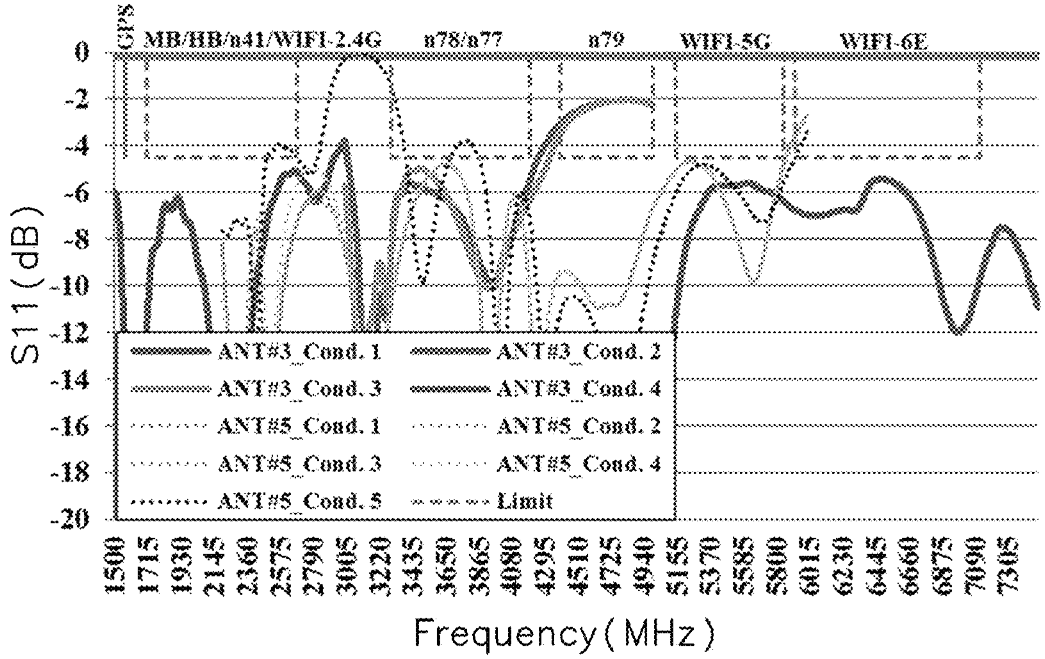
FIG. 42A shows graphs of S parameters (scattering parameters) of an upper antenna of the electronic device shown in FIG. 40.

FIG. 42A shows graphs of S parameters (scattering parameters) of the upper antenna of the electronic device 700, that is, the module antenna ANT #3 formed by the second antenna feed module 602, and the module antenna ANT #5 formed by the first antenna feed module 601. FIG. 42A shows a graph of S parameters of the module antenna ANT #3 formed by the second antenna feed module 602, and the module antenna ANT #5 formed by the first antenna feed module 601 and switched to different configurations (denoted as ANT #3_Cond.1, ANT #3_Cond.2, ANT #3_Cond.3, ANT #3_Cond.4, ANT #5_Cond.1, ANT #5_Cond.2, ANT #5_Cond.3, ANT #5_Cond.4, ANT #5_Cond.5 in the figure) through the active circuit 13, active circuit 413, and covers GPS frequency band, middle frequency band, high frequency band, 5G Sub 6 N41 frequency band, WIFI 2.4G frequency band, 5G Sub 6 N77/N78/N79 frequency bands, WIFI 5G frequency band, and WIFI 6E frequency band.

Figure 42B:
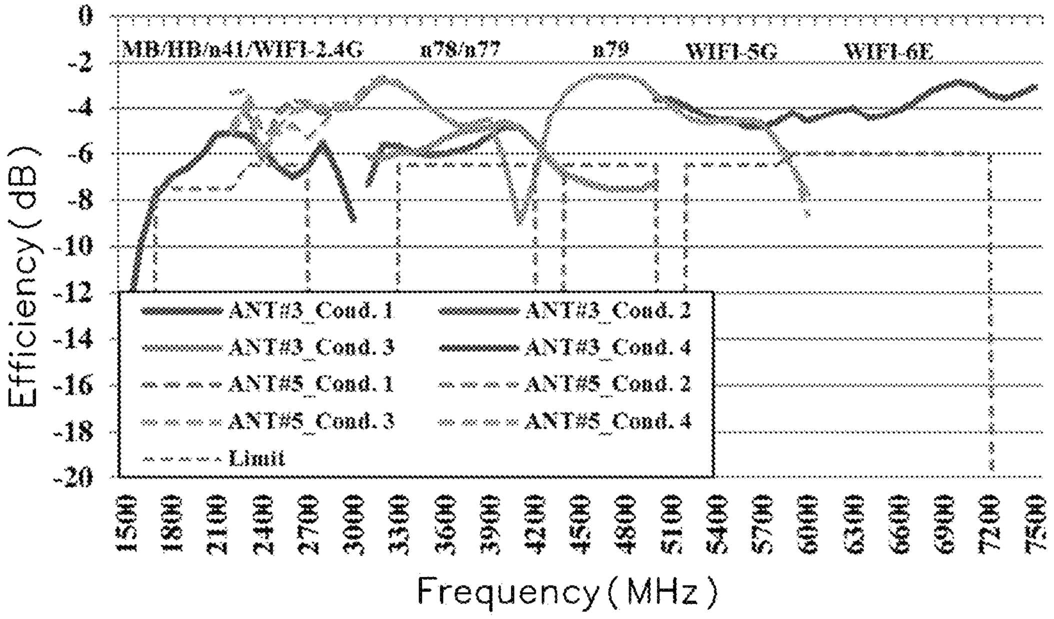
FIG. 42B shows efficiency graphs of the upper antenna of the electronic device shown in FIG. 40.

FIG. 42B shows an efficiency graph of the upper antenna of the electronic device 700, that is, the module antenna ANT #3 formed by the second antenna feed module 602, and the module antenna ANT #5 formed by the first antenna feed module 601. FIG. 42B shows an efficiency graph of the module antenna ANT #3 formed by the second antenna feed module 602, and the module antenna ANT #5 formed by the first antenna feed module 601 and switched to different configurations (denoted as ANT #3_Cond.1, ANT #3_Cond.2, ANT #3_Cond.3, ANT #3_Cond.4, ANT #5_Cond.1, ANT #5_Cond.2, ANT #5_Cond.3, ANT #5_Cond.4, ANT #5_Cond.5 in the figure) through the active circuit 13, active circuit 413, and covers GPS frequency band, middle frequency band, high frequency band, 5G Sub 6 N41 frequency band, WIFI 2.4G frequency band, 5G Sub 6 N77/N78/N79 frequency bands, WIFI 5G frequency band, and WIFI 6E frequency band.

Figure 42C:
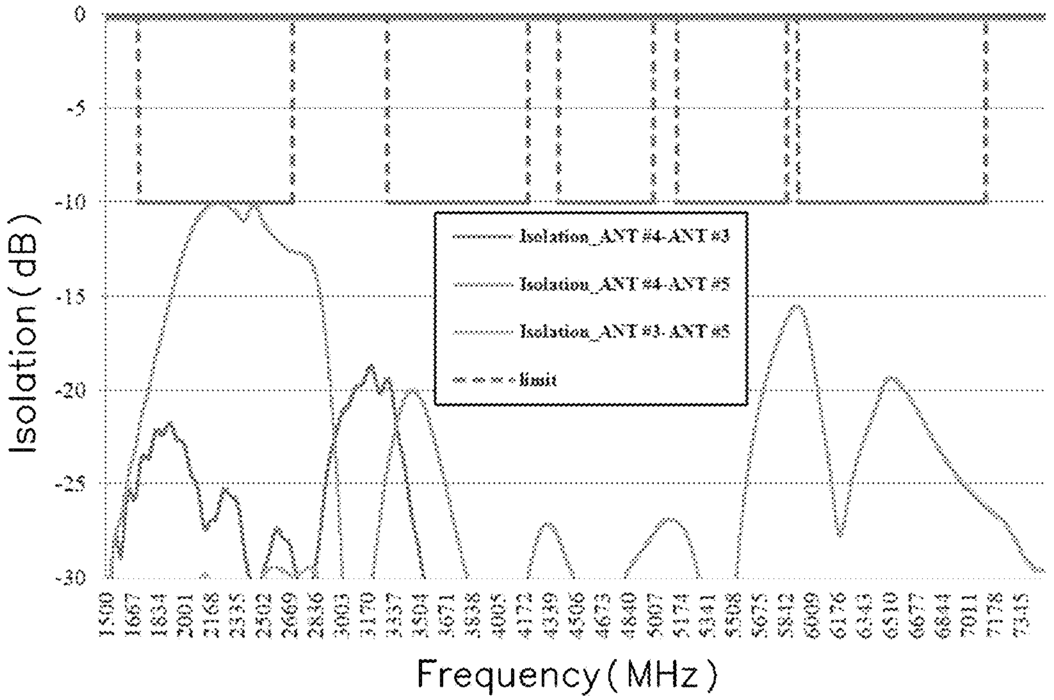
FIG. 42C shows isolation graphs of the upper antenna of the electronic device and adjacent radiators shown in FIG. 40.

FIG. 42C shows an isolation graph of the upper antenna of the electronic device 700, that is, the module antenna ANT #3 formed by the second antenna feed module 602, and the module antenna ANT #5 formed by the first antenna feed module 601, and adjacent antennas. FIG. 42C shows an isolation graphs of the upper antenna of the electronic device 700, that is, the module antenna ANT #3 formed by the second antenna feed module 602, the module antenna ANT #5 formed by the first antenna feed module 601, and the non-module antenna ANT #4 (denoted as ANT #4-ANT #3, ANT #4-ANT #5, ANT #3-ANT #5 in the figure), and covers GPS frequency band, middle frequency band, high frequency band, 5G Sub 6 N41 frequency band, WIFI 2.4G frequency band, 5G Sub 6 N77/N78/N79 frequency bands, WIFI 5G frequency band, and WIFI 6E frequency band.

Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. An electronic device having a middle frame, comprising:

a metal frame comprising an upper metal frame, a first side metal frame, a bottom metal frame, and a second side metal frame sequentially connected;

a slit formed by the middle frame spaced apart from the first side metal frame and the second side metal frame; and at least one antenna feed module received in the slit, the at least one antenna feed module comprising a substrate and at least one coupled feed portion, the substrate comprising a first surface and a second surface, the second surface disposed opposite to the first surface, the first surface facing the metal frame, the at least one coupled feed portion disposed on the first surface, the at least one coupled feed portion configured to couple electrical signals to the metal frame for transmitting and receiving wireless signals.

2. The electronic device having antenna feed module according to claim 1, wherein the at least one antenna feed module contacts the first side metal frame or the second side metal frame.

3. The electronic device having antenna feed module according to claim 1, wherein the at least one antenna feed module is spaced apart from the first side metal frame or the second side metal frame.

4. The electronic device having antenna feed module according to claim 1, wherein the at least one antenna feed module further comprises a plurality of antenna feed modules, the plurality of antenna feed modules is arranged correspondingly to the first side metal frame or the second side metal frame at intervals.

5. The electronic device having antenna feed module according to claim 4, wherein a quantity of the plurality of antenna feed modules arranged correspondingly to the first side metal frame is different to a quantity of the plurality of antenna feed modules arranged correspondingly to the second side metal frame.

6. The electronic device having antenna feed module according to claim 1, wherein the first side metal frame and the second side metal frame define a plurality of gaps, the plurality of gaps divides the first side metal frame and the second side metal frame into a plurality of radiators.

7. The electronic device having antenna feed module according to claim 6, wherein the at least one antenna feed module is arranged correspondingly to one of the plurality of radiators and configured to feed electrical signals to the corresponding radiator to radiate wireless signals through the corresponding radiator.

8. The electronic device having antenna feed module according to claim 7, wherein the at least one antenna feed module is configured to conduct or couple the electrical signals to the corresponding radiator to radiate wireless signals through the corresponding radiator to generate a middle frequency band, a high frequency band, an ultra-high frequency band (UHF), a GPS frequency band, a Wi-Fi 2.4G frequency band, a Wi-Fi 5G frequency band, a 5G Sub 6 NR frequency band, and a Wi-Fi 6E frequency band.

9. The electronic device having antenna feed module according to claim 6, wherein the at least one antenna feed module comprises a plurality of antenna feed modules, the plurality of antenna feed modules is arranged correspondingly to the plurality of radiators and configured to feed electrical signals to the corresponding radiators to radiate wireless signals through the corresponding radiators.

10. The electronic device having antenna feed module according to claim 6, wherein the at least one antenna feed module is arranged correspondingly to one of the plurality of gaps and configured to feed electrical signals to the radiators adjacent to the corresponding gap to radiate wireless signals through the radiators.

11. An electronic device having a middle frame, comprising:

a metal frame defining a plurality of gaps, the plurality of gaps dividing the metal frame into a plurality of radiators;

a slit formed by the middle frame spaced apart from the metal frame;

a plurality of antenna feed modules received in the slit, one of the plurality antenna feed modules is arranged correspondingly to one of the plurality of radiators to form a plurality of module antennas to radiate wireless signals, the at least one antenna feed module comprising a substrate and at least one coupled feed portion, the substrate comprising a first surface and a second surface, the second surface disposed opposite to the first surface, the first surface facing the metal frame, the at least one coupled feed portion disposed on the first surface, the at least one coupled feed portion configured to couple electrical signals to the one of the plurality of radiators for transmitting and receiving the wireless signals.

12. The electronic device having antenna feed module according to claim 11, wherein at least one of the plurality of antenna feed modules contacts the radiators.

13. The electronic device having antenna feed module according to claim 11, wherein at least one of the plurality of antenna feed modules is spaced apart from the radiators.

14. The electronic device having antenna feed module according to claim 11, further comprising at least one non-module antenna arranged at one of the plurality of radiators.

15. The electronic device having antenna feed module according to claim 14, wherein a quantity of the module antennas is different from a quantity of the non-module antennas.

16. The electronic device having antenna feed module according to claim 11, wherein the plurality of antenna feed modules is configured to conduct or couple electrical signals to the corresponding radiators to radiate wireless signals through the corresponding radiators to generate a middle frequency band, a high frequency band, an ultra-high frequency band (UHF), a GPS frequency band, a Wi-Fi 2.4G frequency band, a Wi-Fi 5G frequency band, a 5G Sub 6 NR frequency band, and a Wi-Fi 6E frequency band.

17. The electronic device having antenna feed module according to claim 11, wherein the metal frame comprises an upper metal frame, a first side metal frame, a bottom metal frame, and a second side metal frame sequentially connected.

18. The electronic device having antenna feed module according to claim 17, wherein at least one of the upper metal frame, the first side metal frame, the bottom metal frame, and the second side metal frame defines at least one of the plurality of gap, the plurality of gaps divides at least one of the upper metal frame, the first side metal frame, the bottom metal frame, and the second side metal frame to form the plurality of radiators.

19. The electronic device having antenna feed module according to claim 18, wherein the plurality of antenna feed modules is arranged correspondingly to the radiators formed by the first side metal frame or the second side metal frame.

20. The electronic device having antenna feed module according to claim 19, wherein a quantity of the antenna feed modules arranged correspondingly to the radiators formed by the first side metal frame is different to a quantity of the antenna feed modules arranged correspondingly to the radiators formed by the second side metal frame.

* * * * *